US012763090B2

(12) United States Patent
Port et al.

(10) Patent No.: US 12,763,090 B2
(45) Date of Patent: Oct. 13, 2026

(54) ADJUSTING AUDIO AND NON-AUDIO FEATURES BASED ON NOISE METRICS AND SPEECH INTELLIGIBILITY METRICS

(71) Applicant: Dolby Laboratories Licensing Corporation, San Francisco, CA (US)

(72) Inventors: Timothy Alan Port, Drummoyne (AU); Daniel Steven Templeton, San Francisco, CA (US); Jack Gregory Hays, San Francisco, CA (US); David Matthew Cooper, Carlton (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/782,113

(22) PCT Filed: Dec. 9, 2020

(86) PCT No.: PCT/US2020/063957
§ 371 (c)(1),
(2) Date: Jun. 2, 2022

(87) PCT Pub. No.: WO2021/119094
PCT Pub. Date: Jun. 17, 2021

(65) Prior Publication Data

US 2023/0010466 A1 Jan. 12, 2023

Related U.S. Application Data

(60) Provisional application No. 63/198,160, filed on Sep. 30, 2020, provisional application No. 63/198,158,
(Continued)

(51) Int. Cl.
*G10L 13/033* (2013.01)
*G06F 3/16* (2006.01)
(Continued)

(52) U.S. Cl.
CPC .......... *G10L 21/0364* (2013.01); *G06F 3/165* (2013.01); *G10L 19/167* (2013.01);
(Continued)

(58) Field of Classification Search
CPC ....... G10L 15/26; G10L 13/033; G10L 25/57; G10L 19/167; G10L 25/60;
(Continued)

(56) References Cited

U.S. PATENT DOCUMENTS 2,338,551 A 1/1944 Stanko
4,476,571 A 10/1984 Tokumo
(Continued)

FOREIGN PATENT DOCUMENTS

CN 1325189 A 12/2001
CN 105792086 A 7/2016
(Continued)

OTHER PUBLICATIONS

Spore et al, "Wave field synthesis-generation and reproduction of natural sound environments", 2004 In 7th International Conference on Digital Audio Effects (DAFx-04), Naples, Italy, pp. 133-138 (Year: 2004).*
(Continued)

*Primary Examiner* — Olujimi A Adesanya

(57) ABSTRACT

Some implementations involve determining a noise metric and/or a speech intelligibility metric and determining a compensation process corresponding to the noise metric and/or the speech intelligibility metric. The compensation process may involve altering a processing of audio data and/or applying a non-audio-based compensation method. In some examples, altering the processing of the audio data does not involve applying a broadband gain increase to the audio signals. Some examples involve applying the compensation process in an audio environment. Other examples
(Continued)

involve determining compensation metadata corresponding to the compensation process and transmitting an encoded content stream that includes encoded compensation metadata, encoded video data and encoded audio data from a first device to one or more other devices.

26 Claims, 21 Drawing Sheets

Related U.S. Application Data filed on Sep. 30, 2020, provisional application No. 62/945,299, filed on Dec. 9, 2019.

(51) Int. Cl.
*G10L 19/16* (2013.01)
*G10L 21/034* (2013.01)
*G10L 21/0364* (2013.01)
*G10L 25/57* (2013.01)
*G10L 25/60* (2013.01)
*G10L 25/81* (2013.01)
*H04N 5/278* (2006.01)
*H04N 21/439* (2011.01)
*H04N 21/488* (2011.01)

(52) U.S. Cl.
CPC ............ *G10L 21/034* (2013.01); *G10L 25/57* (2013.01); *G10L 25/60* (2013.01); *G10L 25/81* (2013.01); *H04N 5/278* (2013.01); *H04N 21/4394* (2013.01); *H04N 21/4884* (2013.01)

(58) Field of Classification Search
CPC ........... H04N 21/4884; H04N 21/4394; H04N 21/4316; H04N 21/439
See application file for complete search history.

(56) References Cited

U.S. PATENT DOCUMENTS 4,553,257 A 11/1985 Mori
4,628,526 A 12/1986 Germer
5,081,682 A 1/1992 Kato
5,666,426 A 9/1997 Helms
5,907,622 A 5/1999 Dougherty
7,760,893 B1 7/2010 Felber
7,968,786 B2 6/2011 Kemmochi
8,908,884 B2 12/2014 Mantegna
8,977,974 B2 3/2015 Kraut
9,398,335 B2 * 7/2016 Hough ............. H04N 21/42203
9,456,170 B1 * 9/2016 Miller .................... G11B 27/10
9,589,556 B2 3/2017 Gao
9,596,429 B2 3/2017 Garcia Navarro
9,852,773 B1 12/2017 Salvador
11,290,786 B2 * 3/2022 Marten ............ H04N 21/42203
2001/0044726 A1 11/2001 Li
2002/0007371 A1 1/2002 Bray
2005/0038661 A1 * 2/2005 Momosaki ............. H04N 5/775 348/E5.122
2005/0086058 A1 4/2005 Lemelson
2005/0114127 A1 5/2005 Rankovic
2007/0005795 A1 * 1/2007 Gonzalez ........... H04N 21/6131 375/E7.006
2008/0189104 A1 8/2008 Zong
2008/0232603 A1 * 9/2008 Soulodre ................. H04S 7/305 381/63
2008/0269926 A1 10/2008 Xiang
2009/0276213 A1 11/2009 Hetherington
2009/0278986 A1 11/2009 Ikegami
2010/0014692 A1 * 1/2010 Schreiner ................ H04S 3/008 381/119
2010/0146445 A1 * 6/2010 Kraut ...................... G06F 3/162 700/94
2011/0268293 A1 11/2011 Mantegna
2011/0289412 A1 * 11/2011 Sokol ................... H04N 21/431 715/720
2012/0221328 A1 * 8/2012 Muesch .................. G10L 25/93 704/E21.002
2013/0019263 A1 1/2013 Ferren
2013/0096912 A1 4/2013 Resch
2013/0278824 A1 * 10/2013 Einarsson ........ H04N 21/42202 348/468
2013/0279308 A1 * 10/2013 Helm ..................... H04H 60/27 381/86
2013/0297306 A1 11/2013 Hetherington
2013/0302008 A1 * 11/2013 Kwon ................ H04N 21/4884 386/230
2014/0150002 A1 * 5/2014 Hough ............... H04N 21/4532 725/9
2014/0314261 A1 * 10/2014 Selig .................... A61B 5/6898 381/314
2015/0106088 A1 4/2015 Järvinen
2015/0149169 A1 * 5/2015 Chang ..................... G10L 15/26 704/235
2016/0071526 A1 3/2016 Wingate
2016/0080886 A1 * 3/2016 De Bruijn ................ H04R 5/02 381/17
2016/0320840 A1 * 11/2016 Hwang ................ H04R 1/1041
2016/0330396 A1 * 11/2016 Garcia Navarro ....... H04N 5/60
2017/0086008 A1 * 3/2017 Robinson .................. H04S 7/30
2017/0127145 A1 * 5/2017 Rajapakse ............ H04R 29/006
2017/0134821 A1 * 5/2017 D'Amelio ........ H04N 21/42203
2017/0186463 A1 * 6/2017 Prins ...................... G11B 20/22
2017/0243599 A1 8/2017 Hu
2017/0270965 A1 9/2017 Bao
2018/0034961 A1 * 2/2018 Engelke .............. H04M 1/2475
2018/0115850 A1 4/2018 De Burgh
2018/0199113 A1 * 7/2018 Chou ................ H04N 21/4394
2018/0286375 A1 10/2018 Cattell
2018/0302687 A1 * 10/2018 Bhattacharjee .... H04N 21/4884
2019/0028803 A1 * 1/2019 Benattar ................. H04S 7/304
2019/0087870 A1 * 3/2019 Gardyne ............ H04N 21/2743
2019/0089951 A1 3/2019 Jones
2019/0132687 A1 * 5/2019 Santos .................... G10L 25/48
2019/0222943 A1 * 7/2019 Andersen ............ G10L 21/0364
2019/0306563 A1 10/2019 Chen
2019/0362732 A1 11/2019 Port
2019/0392852 A1 12/2019 Hijazi
2020/0236440 A1 7/2020 Hines
2020/0412772 A1 * 12/2020 Nesta ....................... G06F 3/013
2021/0084381 A1 * 3/2021 Marten .............. H04N 21/4856
2021/0225389 A1 * 7/2021 Proença .................. G10L 17/24
2021/0249029 A1 8/2021 Hines
2021/0265966 A1 8/2021 Port
2021/0273623 A1 9/2021 Port
2021/0314626 A1 * 10/2021 Kammachi Sreedhar ................... H04N 21/85406

FOREIGN PATENT DOCUMENTS

CN 105900169 A 8/2016
CN 106101909 A 11/2016
CN 107193841 A 9/2017
CN 107566912 A 1/2018
CN 108141692 A 6/2018
CN 108702580 A 10/2018
CN 110083846 A 8/2019
EP 1816860 A1 8/2007
JP 2014140135 A 7/2014
KR 20060067196 A 6/2006
WO 2018112789 A1 6/2018
WO 2018172111 A1 9/2018

OTHER PUBLICATIONS

Plogsties J, Baum O, Grill B. Conveying spatial sound using MPEG-4. InAudio Engineering Society Conference: 24th International Conference: Multichannel Audio, The New Reality Jun. 1, 2003. Audio Engineering Society, pp. 1-8 (Year: 2003).*

(56) References Cited

OTHER PUBLICATIONS

Seo J, Jang DY, Park GY, Kang K. Implementation of interactive 3D audio using MPEG-4 multimedia standards. InAudio Engineering Society Convention 115 Oct. 1, 2003. Audio Engineering Society, pp. 1-6 (Year: 2003).*
Barbero et al., "Data compression for HDTV transmission and distributio", 1992, In IEE Colloquium on Applications of Video Compression in Broadcasting Oct. 2, 19920 (pp. 10-1-10-5). IET. (Year: 1992).*
Cominetti, "Digital multi-programme TV/HDTV by satellite", 1993, EBU Technical Review Summer. 1993, pp. 30-46 (Year: 1993).*
Daniel et al, "Ambisonics encoding of other audio formats for multiple listening conditions", 1998, InAudio Engineering Society Convention 105 Sep. 1, 1998. Audio Engineering Society, pp. 1-30 (Year: 1998).*
CNNMoney, "NextLevel signs cable deal", Dec. 1997, <https://money.cnn.com/1997/12/17/technology/nextlevel/>, pp. 1-2 (Year: 1997).*
Inguniverse, "History of U.S. Satellite Broadcasting Company, Inc.—FundingUniverse", 2018,<https://www.fundinguniverse.com/company-histories/u-s-satellite-broadcasting-company-inc-history/>, Retrieved Aug. 9, 2018, pp. 1-5 (Year: 2018).*
ISO-IEC 60268-16 International Standard "Sound System Equipment" Third edition, May 2003, pp. 1-6.

* cited by examiner

3200

ADJUSTING AUDIO AND NON-AUDIO FEATURES BASED ON NOISE METRICS AND SPEECH INTELLIGIBILITY METRICS

CROSS-REFERENCE TO RELATED APPLICATIONS

This application claims priority of U.S. Provisional Patent Application No. 62/945,299, filed Dec. 9, 2019, U.S. Provisional Patent Application No. 63/198,158, filed Sep. 30, 2020, and U.S. Provisional Patent Application No. 63/198,160, filed Sep. 30, 2020, all of which are hereby incorporated by reference in their entireties.

TECHNICAL FIELD

This disclosure pertains to systems and methods for adjusting audio and/or non-audio features of a content stream.

BACKGROUND

Audio and video devices, including but not limited to televisions and associated audio devices, are widely deployed. Although existing systems and methods for controlling audio and video devices provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together as a whole. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods, including but not limited to content stream processing methods. In some instances, the method(s) may be implemented, at least in part, by a control system and/or via instructions (e.g., software) stored on one or more non-transitory media. Some such methods involve receiving, by a control system and via an interface system, a content stream that includes video data and audio data corresponding to the video data. Some such methods involve determining, by the control system, a noise metric and/or a speech intelligibility metric. Some such methods involve performing, by the control system, a compensation process in response to the noise metric and/or the speech intelligibility metric. In some examples, performing the compensation process involves one or more of: altering a processing of the audio data, wherein altering the processing of the audio data does not involve applying a broadband gain increase to the audio signals; or applying a non-audio-based compensation method. In some examples, the non-audio-based compensation method may involve controlling a tactile display system and/or controlling a vibratory surface.

Some such methods involve processing, by the control system, the video data and providing, by the control system, processed video data to at least one display device of an environment. Some such methods involve rendering, by the control system, the audio data for reproduction via a set of audio reproduction transducers of the environment, to produce rendered audio signals. Some such methods involve providing, via the interface system, the rendered audio signals to at least some audio reproduction transducers of the set of audio reproduction transducers of the environment.

In some examples, the speech intelligibility metric may be based, at least in part, on one or more of a speech transmission index (STI), a common intelligibility scale (CIS), C50 (the ratio of the sound energy received between 0 and 50 ms after an initial sound and the sound energy that arrives later than 50 ms), reverberance of the environment, a frequency response of the environment, playback characteristics of one or more audio reproduction transducers of the environment, or a level of environmental noise.

According to some implementations, the speech intelligibility metric may be based, at least in part, on one or more user characteristics of a user. The one or more user characteristics may, for example, include the user's native language, the user's accent, the user's position in the environment, the user's age and/or at least one of the user's capabilities. The user's capabilities may, for example, include the user's hearing ability, the user's language proficiency, the user's accent comprehension proficiency, the user's eyesight and/or the user's reading comprehension.

According to some examples, the non-audio-based compensation method may involve controlling a closed captioning system, a surtitling system or a subtitling system. In some such examples, controlling the closed captioning system, the surtitling system or the subtitling system may be based, at least in part, on a user's hearing ability, the user's language proficiency, the user's eyesight and/or the user's reading comprehension. According to some examples, controlling the closed captioning system, the surtitling system or the subtitling system may involve controlling at least one of a font or a font size based, at least in part, on the speech intelligibility metric.

In some instances, controlling the closed captioning system, the surtitling system or the subtitling system may involve determining whether to filter out some speech-based text, based, at least in part, on the speech intelligibility metric. In some implementations, controlling the closed captioning system, the surtitling system or the subtitling system may involve determining whether to simplify or rephrase at least some speech-based text, based, at least in part, on the speech intelligibility metric.

In some examples, controlling the closed captioning system, the surtitling system or the subtitling system may involve determining whether to display text based, at least in part on the noise metric. In some instances, determining whether to display the text may involve applying a first noise threshold to determine that the text will be displayed and applying a second noise threshold to determine that the text will cease to be displayed.

According to some implementations, the audio data may include audio objects. In some such implementations, altering the processing of the audio data may involve determining which audio objects will be rendered based, at least in part, on at least one of the noise metric or the speech intelligibility metric. In some examples, altering the processing of the audio data may involve changing a rendering location of one or more audio objects to improve intelligibility in the presence of noise. According to some implementations, the content stream may include audio object priority metadata. In some examples, altering the processing of the audio data may involve selecting high-priority audio objects based on the priority metadata and rendering the high-priority audio objects, but not rendering at least some other audio objects.

In some examples, altering the processing of the audio data may involve applying one or more speech enhancement methods based, at least in part, on the noise metric and/or the speech intelligibility metric. The one or more speech enhancement methods may, for example, include reducing a gain of non-speech audio and/or increasing a gain of speech frequencies.

According to some implementations, altering the processing of the audio data may involve altering one or more of an upmixing process, a downmixing process, a virtual bass process, a bass distribution process, an equalization process, a crossover filter, a delay filter, a multiband limiter or a virtualization process based, at least in part, on the noise metric and/or the speech intelligibility metric.

Some implementations may involve transmitting the audio data from a first device to a second device. Some such implementations may involve transmitting at least one of the noise metric, the speech intelligibility metric or echo reference data from the first device to the second device or from the second device to the first device. In some instances, the second device may be a hearing aid, a personal sound amplification product, a cochlear implant or a headset.

Some implementations may involve: receiving, by a second device control system, second device microphone signals; receiving, by the second device control system, the audio data and at least one of the noise metric, the speech intelligibility metric or echo reference data; determining, by the second device control system, one or more audio data gain settings and one or more second device microphone signal gain settings; applying, by the second device control system, the audio data gain settings to the audio data to produce gain-adjusted audio data; applying, by the second device control system, the second device microphone signal gain settings to the second device microphone signals to produce gain-adjusted second device microphone signals; mixing, by the second device control system, the gain-adjusted audio data and the gain-adjusted second device microphone signals to produce mixed second device audio data; providing, by the second device control system, the mixed second device audio data to one or more second device transducers; and reproducing the mixed second device audio data by the one or more second device transducers. Some such examples may involve controlling, by the second device control system, the relative levels of the gain-adjusted audio data and the gain-adjusted second device microphone signals in the mixed second device audio data based, at least in part, on the noise metric.

Some examples may involve receiving, by the control system and via the interface system, microphone signals. Some such examples may involve determining, by the control system, the noise metric based at least in part on the microphone signals. In some instances, the microphone signals may be received from a device that includes at least one microphone and at least one audio reproduction transducer of the set of audio reproduction transducers of the environment.

Some disclosed methods involve receiving, by a first control system and via a first interface system, a content stream that includes video data and audio data corresponding to the video data. Some such methods involve determining, by the first control system, a noise metric and/or a speech intelligibility metric. Some such methods involve determining, by the first control system, a compensation process to be performed in response to at least one of the noise metric or the speech intelligibility metric. In some examples, performing the compensation process involves one or more of: altering a processing of the audio data, wherein altering the processing of the audio data does not involve applying a broadband gain increase to the audio signals; or applying a non-audio-based compensation method.

Some such methods involve determining, by the first control system, compensation metadata corresponding to the compensation process. Some such methods involve producing encoded compensation metadata by encoding, by the first control system, the compensation metadata. Some such methods involve producing encoded video data by encoding, by the first control system, the video data. Some such methods involve producing encoded audio data by encoding, by the first control system, the audio data. Some such methods involve transmitting an encoded content stream that includes the encoded compensation metadata, the encoded video data and the encoded audio data from a first device to at least a second device.

In some instances, the audio data may include speech data and music and effects (M&E) data. Some such methods may involve distinguishing, by the first control system, the speech data from the M&E data, determining, by the first control system, speech metadata that allows the speech data to be extracted from the audio data and producing encoded speech metadata by encoding, by the first control system, the speech metadata. In some such examples, transmitting the encoded content stream may involve transmitting the encoded speech metadata to at least the second device.

According to some implementations, the second device may include a second control system configured for decoding the encoded content stream. In some such implementations, the second device may be one of a plurality of devices to which the encoded audio data has been transmitted. In some instances the plurality of devices may have been selected based, at least in part, on speech intelligibility for a class of users. In some examples, the class of users may be defined by a known or estimated hearing ability, a known or estimated language proficiency, a known or estimated accent comprehension proficiency, a known or estimated eyesight acuity and/or a known or estimated reading comprehension.

In some implementations, the compensation metadata may include a plurality of options selectable by the second device and/or by a user of the second device. In some such examples, two or more options of the plurality of options may correspond to a noise level that may occur in an environment in which the second device is located. In some examples, two or more options of the plurality of options may correspond to speech intelligibility metrics. In some such examples, the encoded content stream may include speech intelligibility metadata. Some such examples may involve selecting, by the second control system and based at least in part on the speech intelligibility metadata, one of the two or more options. According to some implementations, each option of the plurality of options may correspond to a known or estimated hearing ability, a known or estimated language proficiency, a known or estimated accent comprehension proficiency, a known or estimated eyesight acuity and/or a known or estimated reading comprehension of the user of the second device. In some examples, each option of the plurality of options may correspond to a level of speech enhancement.

According to some examples, the second device may correspond with a specific playback device. In some such examples, the specific playback device may be a specific television or a specific device associated with a television.

Some implementations may involve receiving, by the first control system and via the first interface system, the noise metric and/or the speech intelligibility metric from the second device. In some such examples, the compensation metadata may correspond the noise metric and/or the speech intelligibility metric.

Some examples may involve determining, by the first control system and based at least in part on the noise metric or the speech intelligibility metric, whether the encoded audio data will correspond to all received audio data or to only a portion of the received audio data. In some examples, the audio data may include audio objects and corresponding priority metadata indicating audio object priority. Some such examples wherein it is determined that the encoded audio data will correspond to only the portion of the received audio data also may involve selecting the portion of the received audio data based, at least in part, on the priority metadata.

In some implementations, the non-audio-based compensation method may involve controlling a closed captioning system, a surtitling system or a subtitling system. In some such examples, controlling the closed captioning system, the surtitling system or the subtitling system may involve controlling a font and/or a font size based, at least in part, on the speech intelligibility metric. In some implementations, controlling the closed captioning system, the surtitling system or the subtitling system may involve determining whether to filter out some speech-based text, determining whether to simplify at least some speech-based text and/or determining whether to rephrase at least some speech-based text, based, at least in part, on the speech intelligibility metric. According to some implementations, the closed captioning system, the surtitling system or the subtitling system may involve determining whether to display text based, at least in part on the noise metric.

In some examples, altering the processing of the audio data may involve applying one or more speech enhancement methods based, at least in part, on the noise metric and/or the speech intelligibility metric. The one or more speech enhancement methods may, for example, include reducing a gain of non-speech audio and/or increasing a gain of speech frequencies.

According to some implementations, altering the processing of the audio data may involve altering one or more of an upmixing process, a downmixing process, a virtual bass process, a bass distribution process, an equalization process, a crossover filter, a delay filter, a multiband limiter or a virtualization process based, at least in part, on the noise metric and/or the speech intelligibility metric.

Some disclosed methods involve receiving, by a first control system and via a first interface system of a first device, a content stream that includes received video data and received audio data corresponding to the video data. Some such methods involve receiving, by the first control system and via the first interface system, a noise metric and/or a speech intelligibility metric from a second device. Some such methods involve determining, by the first control system and based at least in part on the noise metric and/or the speech intelligibility metric, whether to reduce a complexity level of transmitted encoded audio data corresponding to the received audio data and/or text corresponding to the received audio data. Some such methods involve selecting, based on the determining process, encoded audio data and/or text to be transmitted. Some such methods involve transmitting an encoded content stream that includes the encoded video data and the transmitted encoded audio data from the first device to the second device.

According to some implementations, determining whether to reduce the complexity level may involve determining whether transmitted encoded audio data will correspond to all received audio data or to only a portion of the received audio data. In some implementations, the audio data may include audio objects and corresponding priority metadata indicating audio object priority. According to some such implementations it may be determined that the encoded audio data will correspond to only the portion of the received audio data. Some such implementations may involve selecting the portion of the received audio data based, at least in part, on the priority metadata. In some examples, determining whether to reduce the complexity level may involve determining whether to filter out some speech-based text, determining whether to simplify at least some speech-based text and/or determining whether to rephrase at least some speech-based text for a closed captioning system, a surtitling system or a subtitling system.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon. For example, the software may include instructions for controlling one or more devices to perform one or more of the disclosed methods.

At least some aspects of the present disclosure may be implemented via an apparatus and/or via a system that includes multiple devices. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the control system may be configured for performing one or more of the disclosed methods.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Voice assistants are becoming more widespread. In order to enable voice assistants, television (TV) and soundbar manufacturers are starting to add microphones to their devices. The added microphones could potentially provide input regarding background noise, which could potentially be input to noise compensation algorithms. However, applying conventional noise compensation algorithms in the television context involves some technical challenges. For example, the drivers that are typically used in televisions have only a limited amount of capability. Applying conventional noise compensation algorithms via the drivers that are typically used in televisions may not be entirely satisfactory, in part because these drivers may not be able to overcome the noise within a listening environment, e.g., the noise within a room.

The present disclosure describes alternative approaches to improve the experience. Some disclosed implementations involve determining a noise metric and/or a speech intelligibility metric and determining a compensation process in response to at least one of the noise metric or the speech intelligibility metric. According to some implementations, the compensation process may be determined (at least in part) by one or more local devices of an audio environment. Alternatively, or additionally, the compensation process may be determined (at least in part) by one or more remote devices, such as one or more devices implementing a cloud-based service. In some examples, the compensation process may involve altering the processing of received audio data. According to some such examples, altering the processing of the audio data does not involve applying a broadband gain increase to the audio signals. In some examples, the compensation process may involve applying a non-audio-based compensation method, such as controlling a closed captioning system, a surtitling system or a subtitling system. Some disclosed implementations provide satisfactory noise compensation regardless of whether the corresponding audio data is being reproduced via relatively more capable or via relatively less capable audio reproduction transducers, though the type of noise compensation may, in some examples, be different for each case.

Figure 1:
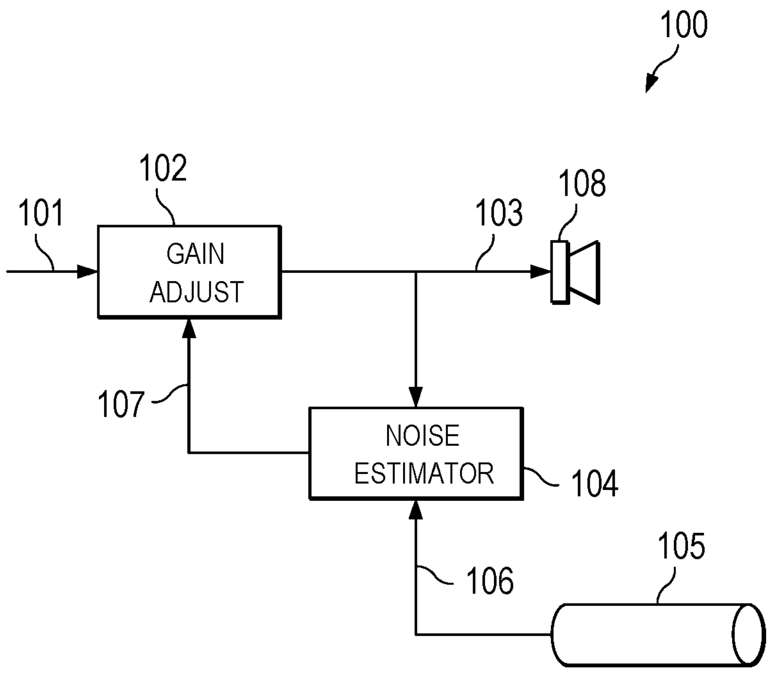
FIG. 1 shows an example of a noise compensation system.

FIG. 1 shows an example of a noise compensation system. The system 100 is configured to adjust the volume of the overall system based upon a noise estimate to ensure that a listener can understand the audio in the presence of noise. In this example, the system 100 includes a loudspeaker 108, a microphone 105, a noise estimator 104 and a gain adjuster 102.

In this example, the gain adjuster 102 is receiving an audio signal 101 from a file, a streaming service, etc. The gain adjuster 102 may, for example, be configured to apply a gain adjustment algorithm, such as a broadband gain adjustment algorithm.

In this example, a signal 103 is sent to the loudspeaker 108. According to this example, the signal 103 is also provided to, and is a reference signal for, the noise estimator 104. In this example, a signal 106 is also sent to the noise estimator 104 from the microphone 105.

According to this example, the noise estimator 104 is a component that is configured to estimate the level of noise in an environment that includes the system 100. The noise estimator 104 may, in some examples, include an echo canceller. However, in some implementations the noise estimator 104 may simply measure the noise when a signal corresponding with silence is sent to the loudspeaker 108. In this example, the noise estimator 104 is providing a noise estimate 107 to the gain adjuster 102. The noise estimate 107 may be a broadband estimate or a spectral estimate of the noise, depending on the particular implementation. In this example, the gain adjuster 102 is configured to adjust the level of the output of the loudspeaker 108 based upon the noise estimate 107.

As noted above, the loudspeakers of a television often have rather limited capabilities. Accordingly, the type of volume adjustment provided by the system 100 will be generally limited by the speaker protection components (e.g., limiters and/or compressors) of such loudspeakers.

The present disclosure provides various methods that can overcome at least some of the potential drawbacks of the system 100, as well as devices and systems for implementing the presently-disclosed methods. Some such methods may be based on one or more noise metrics. Alternatively, or additionally, some such methods may be based on one or more speech intelligibility metrics. Various disclosed methods provide one or more compensation processes responsive to the noise metric(s) and/or the speech intelligibility metric(s). Some such compensation processes involve altering a processing of the audio data. In many disclosed methods, altering the processing of the audio data does not involve applying a broadband gain increase to the audio signals. Alternatively, or additionally, some such compensation processes may involve one or more non-audio-based compensation methods.

Figure 2:
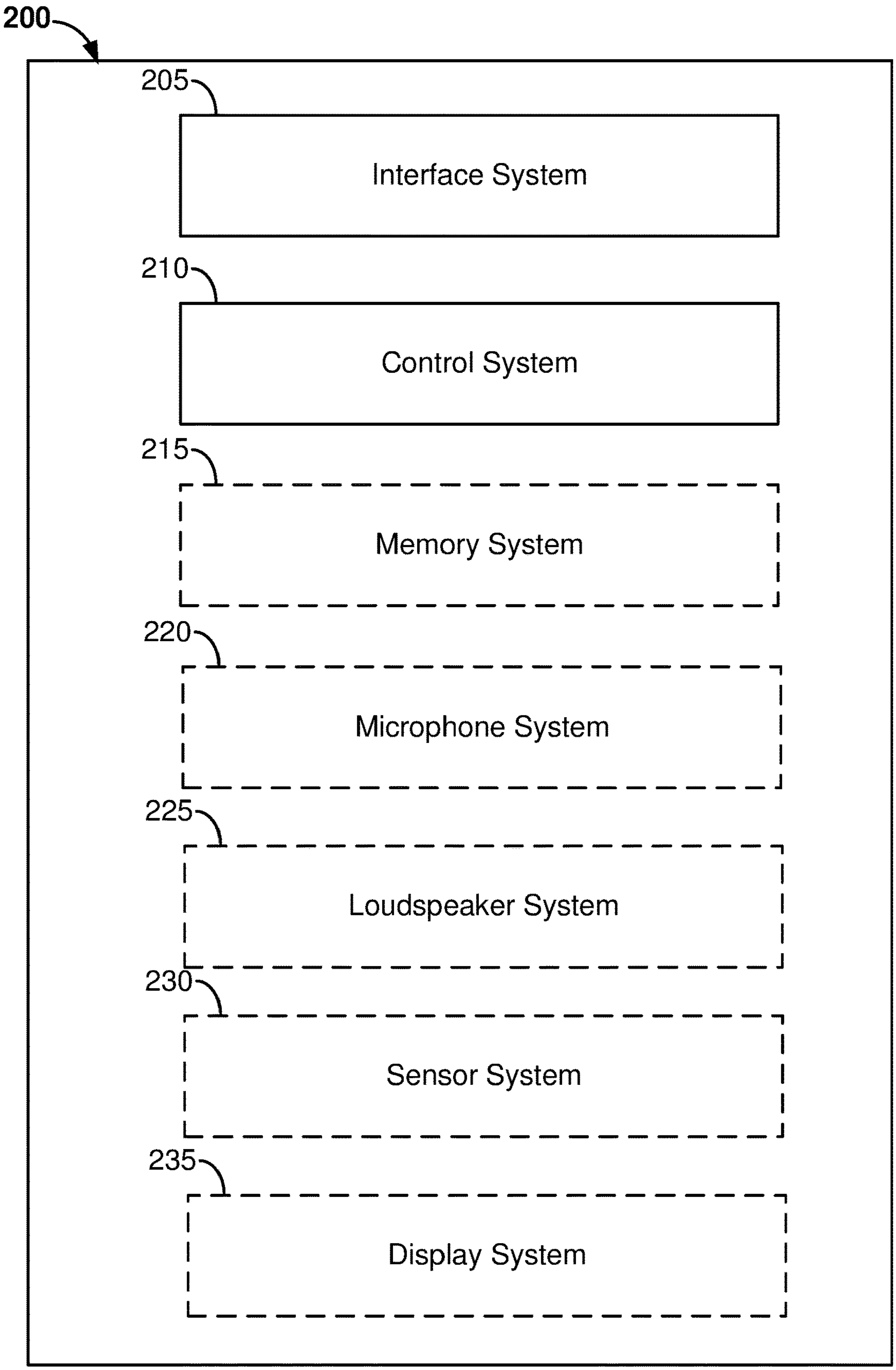
FIG. 2 is a block diagram that shows examples of components of an apparatus capable of implementing various aspects of this disclosure.

FIG. 2 is a block diagram that shows examples of components of an apparatus capable of implementing various aspects of this disclosure. As with other figures provided herein, the types and numbers of elements shown in FIG. 2 are merely provided by way of example. Other implementations may include more, fewer and/or different types and numbers of elements. According to some examples, the apparatus 200 may be, or may include, a television that is configured for performing at least some of the methods disclosed herein. In some implementations, the apparatus 200 may be, or may include, a television control module. The television control module may or may not be integrated into a television, depending on the particular implementation. In some implementations, the television control module may be a separate device from a television and may, in some instances, either be sold separately from a television or as an add-on or optional device that may be included with a purchased television. In some implementations, the television control module may be obtainable from a content provider, such as a provider of television programs, movies, etc. In other implementations, the apparatus 200 may be, or may include, another device that is configured for performing, at least in part, at least some of the methods disclosed herein, such as a laptop computer, a cellular telephone, a tablet device, a smart speaker, etc.

According to some alternative implementations the apparatus 200 may be, or may include, a server. In some such examples, the apparatus 200 may be, or may include, an encoder. Accordingly, in some instances the apparatus 200 may be a device that is configured for use within an audio environment, such as a home audio environment, whereas in other instances the apparatus 200 may be a device that is configured for use in "the cloud," e.g., a server.

In this example, the apparatus 200 includes an interface system 205 and a control system 210. The interface system 205 may, in some implementations, be configured for communication with one or more other devices of an audio environment. The audio environment may, in some examples, be a home audio environment. The interface system 205 may, in some implementations, be configured for exchanging control information and associated data with audio devices of the audio environment. The control information and associated data may, in some examples, pertain to one or more software applications that the apparatus 200 is executing.

The interface system 205 may, in some implementations, be configured for receiving, or for providing, a content stream. The content stream may include audio signals. In some examples, the content stream may include video data and audio data corresponding to the video data. In some instances, the audio data may include spatial data, such as channel data and/or spatial metadata. The interface system 205 may, in some implementations, be configured for receiving input from one or more microphones in an environment.

The interface system 205 may include one or more network interfaces and/or one or more external device interfaces (such as one or more universal serial bus (USB) interfaces). According to some implementations, the interface system 205 may include one or more wireless interfaces. The interface system 205 may include one or more devices for implementing a user interface, such as one or more microphones, one or more speakers, a display system, a touch sensor system and/or a gesture sensor system. In some examples, the interface system 205 may include one or more interfaces between the control system 210 and a memory system, such as the optional memory system 215 shown in FIG. 2. However, the control system 210 may include a memory system in some instances.

The control system 210 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 210 may reside in more than one device. For example, in some implementations a portion of the control system 210 may reside in a device within one of the environments depicted herein and another portion of the control system 210 may reside in a device that is outside the environment, such as a server, a mobile device (e.g., a smartphone or a tablet computer), etc. In other examples, a portion of the control system 210 may reside in a device within one of the environments depicted herein and another portion of the control system 210 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 210 may reside in a device that is implementing a cloud-based service, such as a server, and another portion of the control system 210 may reside in another device that is implementing the cloud-based service, such as another server, a memory device, etc. The interface system 205 also may, in some examples, reside in more than one device.

In some implementations, the control system 210 may be configured for performing, at least in part, the methods disclosed herein. According to some examples, the control system 210 may be configured for implementing methods of content stream processing.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 215 shown in FIG. 2 and/or in the control system 210. Accordingly, various innovative aspects of the subject matter described in this disclosure can be implemented in one or more non-transitory media having software stored thereon. The software may, for example, include instructions for controlling at least one device to process a content stream, to encode a content stream, to decode a content stream, etc. The software may, for example, be executable by one or more components of a control system such as the control system 210 of FIG. 2.

In some examples, the apparatus 200 may include the optional microphone system 220 shown in FIG. 2. The optional microphone system 220 may include one or more microphones. In some implementations, one or more of the microphones may be part of, or associated with, another device, such as a speaker of the speaker system, a smart audio device, etc. In some examples, the apparatus 200 may not include a microphone system 220. However, in some such implementations the apparatus 200 may nonetheless be configured to receive microphone data for one or more microphones in an audio environment via the interface system 210. In some such implementations, a cloud-based implementation of the apparatus 200 may be configured to receive microphone data, or a noise metric corresponding at least in part to the microphone data, from one or more microphones in an audio environment via the interface system 210.

According to some implementations, the apparatus 200 may include the optional loudspeaker system 225 shown in FIG. 2. The optional loudspeaker system 225 may include one or more loudspeakers, which also may be referred to herein as "speakers" or, more generally, as "audio reproduction transducers." In some examples (e.g., cloud-based implementations), the apparatus 200 may not include a loudspeaker system 225.

In some implementations, the apparatus 200 may include the optional sensor system 230 shown in FIG. 2. The optional sensor system 230 may include one or more touch sensors, gesture sensors, motion detectors, etc. According to some implementations, the optional sensor system 230 may include one or more cameras. In some implementations, the cameras may be free-standing cameras. In some examples, one or more cameras of the optional sensor system 230 may reside in a smart audio device, which may be a single purpose audio device or a virtual assistant. In some such examples, one or more cameras of the optional sensor system 230 may reside in a television, a mobile phone or a smart speaker. In some examples, the apparatus 200 may not include a sensor system 230. However, in some such implementations the apparatus 200 may nonetheless be configured to receive sensor data for one or more sensors in an audio environment via the interface system 210.

In some implementations, the apparatus 200 may include the optional display system 235 shown in FIG. 2. The optional display system 235 may include one or more displays, such as one or more light-emitting diode (LED) displays. In some instances, the optional display system 235 may include one or more organic light-emitting diode (OLED) displays. In some examples, the optional display system 235 may include one or more displays of a television. In other examples, the optional display system 235 may include a laptop display, a mobile device display, or another type of display. In some examples wherein the apparatus 200 includes the display system 235, the sensor system 230 may include a touch sensor system and/or a gesture sensor system proximate one or more displays of the display system 235. According to some such implementations, the control system 210 may be configured for controlling the display system 235 to present one or more graphical user interfaces (GUIs).

According to some such examples the apparatus 200 may be, or may include, a smart audio device. In some such implementations the apparatus 200 may be, or may include, a wakeword detector. For example, the apparatus 200 may be, or may include, a virtual assistant.

Figure 3A:
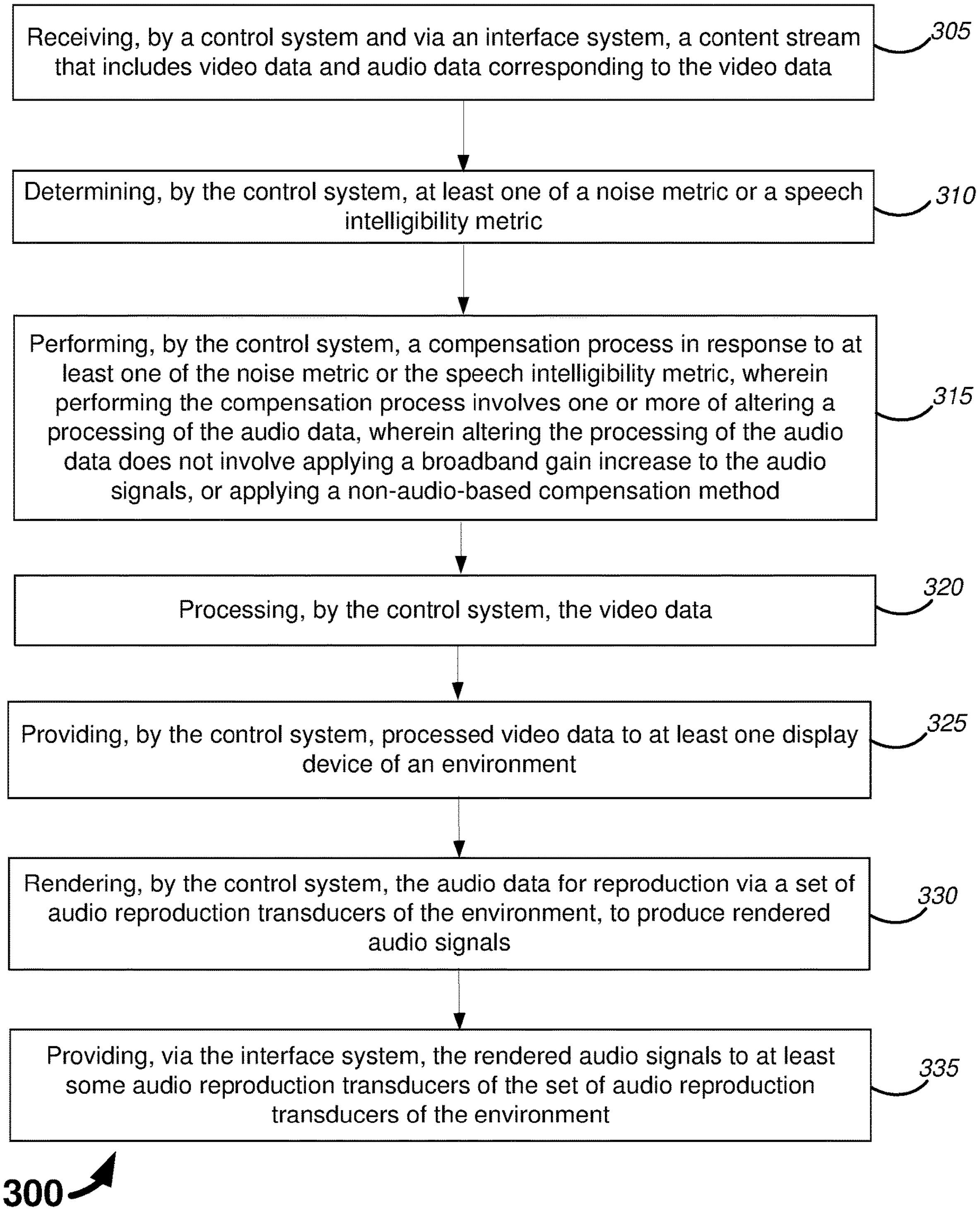
FIG. 3A is a flow diagram that outlines one example of a disclosed method.

FIG. 3A is a flow diagram that outlines one example of a disclosed method. The blocks of method 300, like other methods described herein, are not necessarily performed in the order indicated. Moreover, such methods may include more or fewer blocks than shown and/or described.

The method 300 may be performed by an apparatus or system, such as the apparatus 200 that is shown in FIG. 2 and described above. In some examples, the blocks of method 300 may be performed by one or more devices within an audio environment, e.g., by a television or a television control module. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 300 may be performed by a device that implements a cloud-based service, such as a server.

In this implementation, block 305 involves receiving, by a control system and via an interface system, a content stream that includes video data and audio data corresponding to the video data. In some such implementations, the control system and the interface system may be the control system 210 and the interface system 205 shown in FIG. 2 and described above. According to some implementations, block 305 may involve receiving an encoded content stream. In such implementations, block 305 may involve decoding the encoded content stream. The content stream may, for example, correspond to a movie, a television program, a musical performance, a music video, etc. In some instances, the video data may be relatively less complex than that of a typical movie or television program. For example, in some instances the video data may correspond to song lyrics, a song title, pictures of one of more performers, etc. In some alternative implementations, block 305 may involve receiving a content stream that includes audio data, but no corresponding video data.

In this example, block 310 involves determining, by the control system, at least one of a noise metric or a speech intelligibility metric (SIM). According to some examples, determining the noise metric may involve receiving, by the control system, microphone data from one or more microphones of an audio environment in which the audio data will be rendered and determining, by the control system, the noise metric based, at least in part, on the microphone signals.

Some such examples may involve receiving microphone data from one or more microphones of an audio environment in which the control system resides. In some such implementations, the microphone signals may be received from a device that includes at least one microphone and at least one audio reproduction transducer of the set of audio reproduction transducers of the environment. For example, the device that includes at least one microphone and at least one audio reproduction transducer may be, or may include, a smart speaker. However, some alternative examples may involve receiving microphone data, a noise metric or a speech intelligibility metric from one or more devices of an audio environment that is not in the same location as the control system.

According to some examples, determining the noise metric and/or the SIM may involve identifying environmental noise in received microphone signals and estimating a noise level corresponding to the environmental noise. In some such examples, determining the noise metric may involve determining whether the noise level is above or below one or more thresholds.

In some examples, determining the noise metric and/or the SIM may involve determining one or more metrics corresponding to the reverberance of the environment, the frequency response of the environment, playback characteristics of one or more audio reproduction transducers of the environment, etc. According to some examples, determining the SIM may involve determining one or more metrics corresponding to the speech transmission index (STI), the common intelligibility scale (CIS) or C50, the last of which is measured as the ratio of early-arriving sound energy (arriving between 0 and 50 ms) and late-arriving sound energy (arriving later than 50 ms).

In some examples, speech intelligibility may be measured by reproducing a known signal and measuring the quality of that signal as it reaches each of a plurality of measurement positions in an audio environment. The IEC 60268-16 standard for STI defines how any degradation in the signal is measured.

Figure 3B:
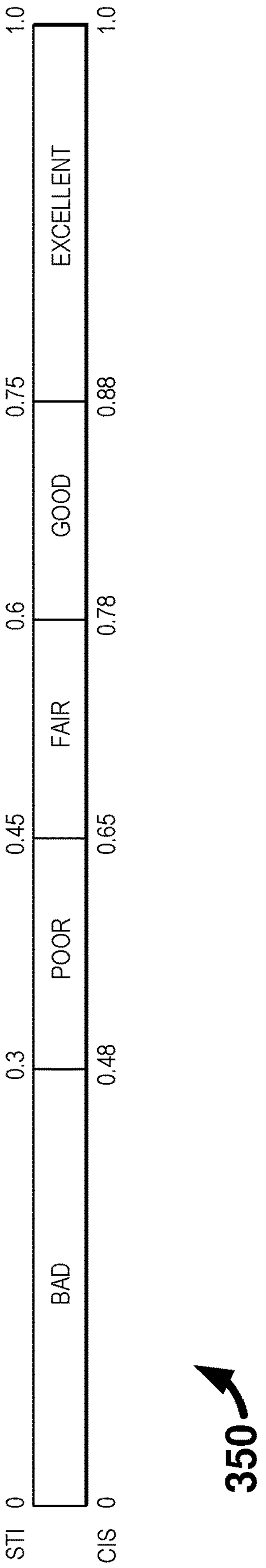
FIG. 3B show examples of the speech transmission index (STI) and common intelligibility scale (CIS) metrics for measuring speech intelligibility.

FIG. 3B show examples of the STI and CIS scales for measuring speech intelligibility. As shown in the bar graph 350, the STI and CIS scales for speech intelligibility can be displayed as a single number from 0 (unintelligible) to 1 (excellent intelligibility).

According to some implementations, the SIM may be based, at least in part, on one or more user characteristics, e.g., characteristics of a person who is a user of a television or other device that will be used to reproduce the received content stream. In some examples, the one or more user characteristics may include the user's native language, the user's accent, the user's age, and/or at least one of the user's capabilities. The user's capabilities may, for example, also include the user's hearing ability, the user's language proficiency, the user's accent comprehension proficiency, the user's eyesight and/or the user's reading comprehension.

In some examples, the one or more user characteristics may include the user's position in the environment, which can have an impact on speech intelligibility. For example, if the user is not positioned on a medial axis relative to the speakers then the speech intelligibility metric may be decreased, because the mix will have more of the left/right channel than the center channel. If they are in the ideal listener position, then in some implementations an intelligibility metric may remain unchanged.

In some such implementations, the user may have previously provided input regarding one or more such user characteristics. According to some such examples, the user may have previously provided input via a graphical user interface (GUI) provided on a display device according to commands from the control system.

Alternatively, or additionally, the control system may have inferred one or more of the user characteristics based on the user's past behavior, such as the language(s) selected by the user for reproduced content, the user's demonstrated ability to comprehend language and/or regional accents (e.g., as evidenced by instances in which the user has selected a closed captioning system, a surtitling system or a subtitling system), the relative complexity of language that is used in content selected by the user (e.g., whether the language corresponds to speech for a television program intended for a pre-school audience, speech for a movie intended for a pre-teen audience, speech for a documentary intended for a college-educated audience, etc.), the playback volume selected by the user (e.g., for portions of reproduced content corresponding to speech), whether the user has previously used a device for the visually impaired (such as a tactile display system), etc.

According to this example, block 315 involves performing, by the control system, a compensation process in response to at least one of the noise metric or the speech intelligibility metric. In this example, performing the compensation process involves altering a processing of the audio data and/or applying a non-audio-based compensation method. According to this implementation, altering the processing of the audio data does not involve applying a broadband gain increase to the audio signals.

In some implementations, a non-audio-based compensation method involves at least one of controlling a tactile display system or controlling a vibratory surface. Some examples are described below.

According to the example shown in FIG. 3A, block 320 involves processing, by the control system, the received video data. In this example, block 325 involves providing, by the control system, processed video data to at least one display device of an environment. In some implementations, block 320 may involve decoding encoded video data. In some examples, block 320 may involve formatting the video data according to the aspect ratio, settings, etc., of a display device of the environment (e.g., a television, a laptop, etc.), on which the video data will be displayed.

In some examples, the non-audio-based compensation method may involve controlling a closed captioning system, a surtitling system or a subtitling system. According to some such examples, block 320 may involve controlling the closed captioning system, the surtitling system or the subtitling system to include text in the displayed video data.

According to some implementations, controlling the closed captioning system, the surtitling system or the subtitling system may involve determining whether to display text based, at least in part on a noise metric. According to some such examples, determining whether to display the text may involve applying a first noise threshold to determine that the text will be displayed and applying a second noise threshold to determine that the text will cease to be displayed. Some examples are described below.

According to some examples, controlling a closed captioning system, the surtitling system or the subtitling system may be based, at least in part, on a user's hearing ability, the user's language proficiency, the user's visual acuity and/or the user's reading comprehension. In some such examples, controlling the closed captioning system, the surtitling system or the subtitling system may involve controlling at least one of a font or a font size based, at least in part, on the speech intelligibility metric and or the user's visual acuity.

According to some implementations, method 300 may involve determining whether to reduce a complexity level of audio data or corresponding text. In some such examples wherein a non-audio-based compensation method involves controlling a closed captioning system, a surtitling system or a subtitling system, method 300 may involve determining whether to filter out, simplify and/or rephrase at least some speech-based text, based, at least in part, on the speech intelligibility metric and/or at least one of the user's capabilities, such as the user's reading comprehension.

In this example, block 330 involves rendering, by the control system, the audio data for reproduction via a set of audio reproduction transducers of the environment, to produce rendered audio signals. According to this implementation, block 335 involves providing, via the interface system, the rendered audio signals to at least some audio reproduction transducers of the set of audio reproduction transducers of the environment.

In some examples wherein the audio data includes audio objects and wherein performing the compensation process involves altering a processing of the audio data, block 330 may involve determining which audio objects will be rendered based, at least in part, on at least one of the noise metric or the speech intelligibility metric. In some such examples wherein the content stream includes audio object priority metadata, altering the processing of the audio data may involve selecting high-priority audio objects based on the priority metadata and rendering the high-priority audio objects, but not rendering other audio objects.

In some examples wherein the audio data includes audio objects and wherein performing the compensation process involves altering a processing of the audio data, block 330 may involve changing a rendering location of one or more audio objects to improve intelligibility in the presence of noise.

According to some examples wherein performing the compensation process involves altering a processing of the audio data, method 300 may involve applying one or more speech enhancement methods based, at least in part, on at least one of the noise metric or the speech intelligibility metric. In some such examples, the one or more speech enhancement methods may include reducing a gain of non-speech audio and/or increasing a gain of speech frequencies, e.g., for example audio frequencies in the range of 50 Hz-2 kHz. Other implementations may be configured to increase a gain of other audio frequency ranges corresponding to speech frequencies, e.g., audio frequencies in the range of 300 Hz-3400 Hz, audio frequencies in the range of 50 Hz-3400 Hz, audio frequencies in the range of 50 Hz to 500 Hz, etc.

Alternatively, or additionally, altering the processing of the audio data may involve altering one or more of an upmixing process, a downmixing process, a virtual bass process, a bass distribution process, an equalization process, a crossover filter, a delay filter, a multiband limiter or a virtualization process based, at least in part, on at least one of the noise metric or the speech intelligibility metric. Some examples are described below.

Some implementations of method 300 may involve transmitting the audio data from a first device to a second device. Some such implementations may involve transmitting at least one of the noise metric, the speech intelligibility metric or echo reference data from the first device to the second device or from the second device to the first device. In some such examples, the second device may be a hearing aid, a personal sound amplification product, a cochlear implant or a headset.

Some examples of method 300 may involve receiving, by a second device control system, second device microphone signals and receiving, by the second device control system, the audio data and at least one of the noise metric, the speech intelligibility metric or echo reference data. Some such implementations may involve determining, by the second device control system, one or more audio data gain settings and one or more second device microphone signal gain settings. Some such implementations may involve applying, by the second device control system, the audio data gain settings to the audio data to produce gain-adjusted audio data. In some such examples, method 300 may involve applying, by the second device control system, the second device microphone signal gain settings to the second device microphone signals to produce gain-adjusted second device microphone signals. Some such implementations may involve mixing, by the second device control system, the gain-adjusted audio data and the gain-adjusted second device microphone signals to produce mixed second device audio data. Some such examples may involve providing, by the second device control system, the mixed second device audio data to one or more second device transducers and reproducing the mixed second device audio data by the one or more second device transducers. Some such implementations may involve controlling, by the second device control system, the relative levels of the gain-adjusted audio data and the gain-adjusted second device microphone signals in the mixed second device audio data based, at least in part, on the noise metric. Some examples are described below.

Figure 4:
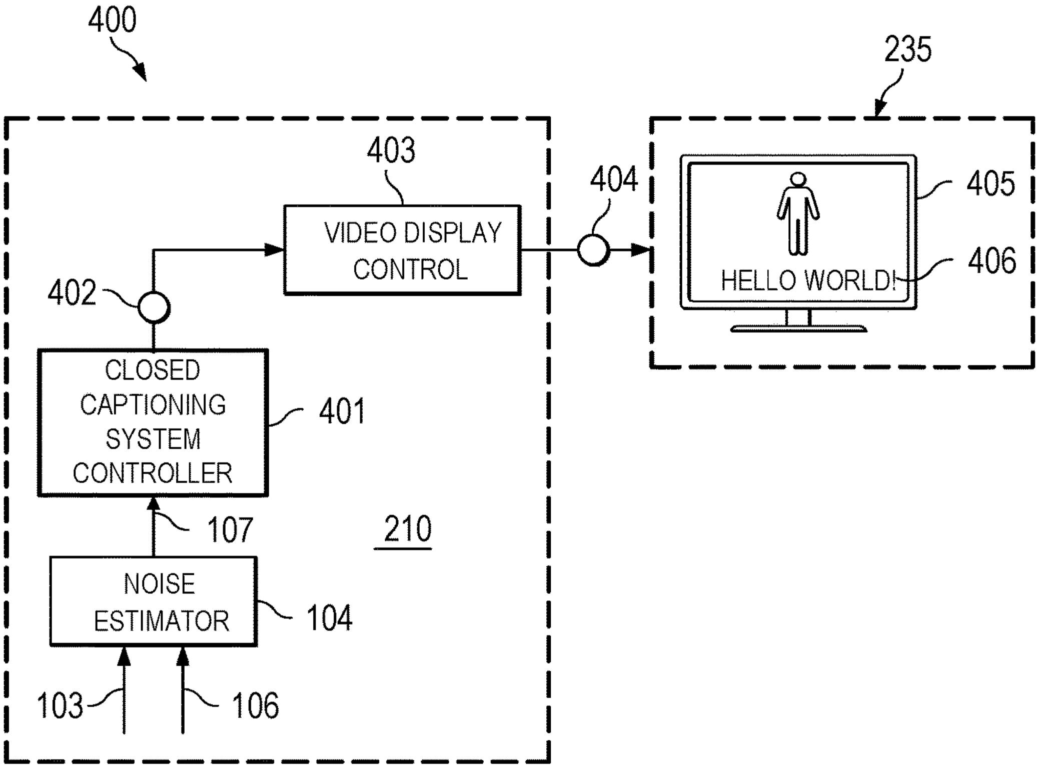
FIG. 4 shows an example of a system in which a closed captioning system is controlled according to a noise estimate.

FIG. 4 shows an example of a system in which a closed captioning system is controlled according to at least one of a noise estimate or an intelligibility estimate. As with other figures provided herein, the types and numbers of elements shown in FIG. 4 are merely provided by way of example. Other implementations may include more, fewer and/or different types and numbers of elements. In this example, the system 400 is configured to turn the closed captioning system (which may be configured to provide closed captions, surtitles or subtitles, depending on the particular implementation) on and off based upon a noise estimate. In this example, if the estimated noise level is too high, then closed captions are displayed. If estimated noise level is too low, then in this example the closed captions are not displayed. This allows the system 400 to respond in loud environments, where in some examples the loudspeakers used to reproduce speech may be too limited to overcome the noise. Such implementations also may be advantageous in other instances, such as when content is being provided to hearing-impaired users.

In this example, the control system 210, which is an instance of the control system 210 that is described above with reference to FIG. 2, includes a noise estimator 104, a closed captioning system controller 401 and a video display control 403. According to this implementation, the closed captioning system controller 401 is configured to receive a multiband signal and to determine, based upon the noise in the frequency bands corresponding to speech, whether the closed captioning will be turned on. In order to stop the closed captioning from turning on and off too frequently, the closed captioning system controller 401 may, in some implementations, implement an amount of hysteresis whereby the threshold for turning on the closed captioning and turning off the closed captioning may be different. This may be advantageous in various contexts, e.g., in the case of a cyclical noise source such as a fan which is hovering around the noise threshold which, in a single-threshold system, would cause flickering of the text. In some implementations, the threshold for the turning on the closed captioning is lower than the threshold for turning off the closed captioning. According to some implementations, the closed captioning system controller 401 may be configured to only allow the turning on and off the text to occur only when new text is due to be displayed on screen.

In the example shown in FIG. 4, the closed captioning system controller 401 is sending an enable control signal 402 to the video display control 403, in order to enable the display of closed captions. If the closed captioning system controller 401 determines that the display of closed captions should stop, in this example the closed captioning system controller 401 will send a disable control signal to the video display control 403.

According to this example, the video display control 403 is configured to overlay closed captions over video frames of content displayed on the television 405, responsive to having received an enable control signal 402. In this implementation, the television 405 is an instance of the optional display system 235 that is described above with reference to FIG. 2. In this example, the video display control 403 is sending video frames 404, which have closed captions overlaid, to the television 405. The closed captions 406 are shown being displayed on the television 405. In this example the video display control 403 is configured to stop overlaying closed captions in video frames of the content responsive to having received a disable control signal.

Figure 5:
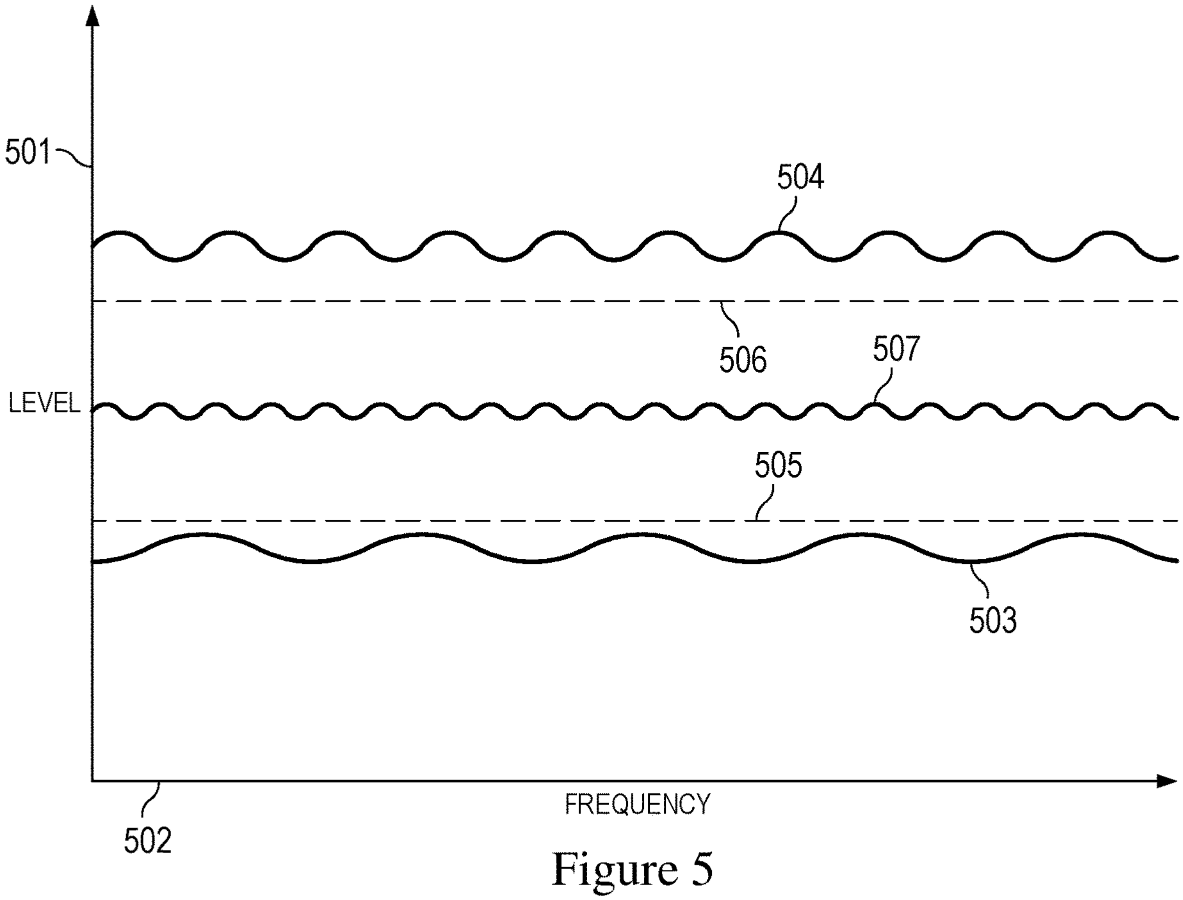
FIG. 5 shows an example of a graph that relates to the control of a closed captioning system.

FIG. 5 shows an example of a graph that relates to the control of a closed captioning system. In this implementation, the graph 500 shows an example of behavior for the closed captioning system for a set of noise estimates to demonstrate how the closed captioning is turned on and off. According to this example, when the average noise level is above a first threshold (in this example, the threshold 506) the closed captioning is turned on and if the average noise level is below a second threshold (in this example, the threshold 505) the closed captioning is turned off. According to some examples, the average may be measured during a time interval in the range of 1 or 2 seconds. However, in other implementations the average may be measured over a longer or shorter time interval. In some alternative implementations, thresholds may be based, on a maximum noise level, a minimum noise level or a median noise level.

In this example, the vertical axis 501 indicates sound pressure level (SPL) and the horizontal axis 502 indicates frequency. According to this example, the threshold 506 is the average level that the noise has to be above for a control system or a portion thereof (in this example, the closed captioning system controller 401 of FIG. 4) to turn the closed captioning on. In this example, the threshold 505 is the average level that the noise has to be below for the closed captioning system controller 401 to turn the closed captioning off.

In some examples, the threshold 506 and/or the threshold 505 may be adjustable according to user input. Alternatively, or additionally, the threshold 506 and/or the threshold 505 may be automatically adjusted by a control system (such as the control system 210 of FIG. 2 or FIG. 4), based on previously-obtained information regarding one or more capabilities of a user, e.g., according to a user's hearing acuity. For example, the threshold 506 may be made relatively lower if a user is hearing-impaired.

According to some examples, the threshold 506 and/or the threshold 505 may correspond to the capability of one or more audio reproduction transducers of the environment and/or limitations placed on playback volume. In some such examples, the closed captioning system controller 401 may to turn the closed captioning on because a playback volume ceiling is imposed, in which the playback volume may not be compensated beyond this ceiling. In some such instances, the noise level may reach a point at which the playback level may not be increased further to compensate for the environmental noise, resulting in the environmental noise masking (at least in part) the playback content. In such cases, closed captions, subtitles or surtitles may be desirable or even necessary in order to enable a user to comprehend dialogue or other speech.

The curve 503 shows an example of a noise level that is on average below the threshold 505, which is the turn-off threshold of the closed captions in this example. In this implementation, regardless of the previous state, the closed captioning system controller 401 will cause the close captioning to be off. The curve 504 shows an example of a noise level that is on average above the threshold 506, which is the turn-on threshold of the closed captions in this example. In this implementation, regardless of the previous state the closed captioning system controller 401 will cause the closed captioning to be on. According to this example, the curve 507 shows an example of a noise level that is on average between the turn on and turn off thresholds for closed captioning. In this implementation, if the closed captioning was previously on before the noise estimate entered this region then the closed captioning system controller 401 will cause the closed captioning to remain on. Otherwise, the closed captioning system controller 401 will cause the closed captioning to be off. Such hysteresis-based implementations have the potential advantage of preventing flickering of the closed captioning in cases wherein the noise estimate is hovering around a single threshold for switching the closed captioning on or off.

Figure 6:
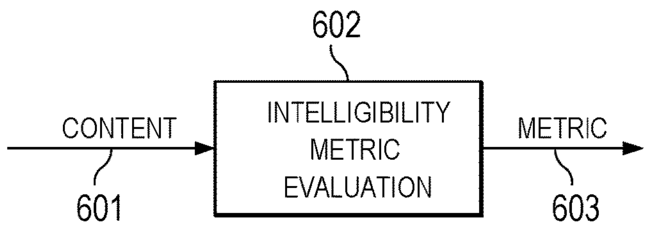
FIG. 6 shows an example of an intelligibility metric evaluation module.

FIG. 6 shows an example of an intelligibility metric evaluation module. FIG. 6 shows an example of a subsystem that receives an incoming audio stream and then derives a measure of the intelligibility of speech present in the stream. According to this implementation, the intelligibility metric evaluation module 602 is configured to estimate speech intelligibility. The intelligibility metric evaluation module 602 may be implemented via a control system, such as the control system 210 that is described with reference to FIG. 2. In this example, the intelligibility metric evaluation module 602 is receiving content stream 601. Here the content stream 601 includes audio data, which may in some instances be, or include, audio data corresponding to speech. According to this implementation, the intelligibility metric evaluation module 602 is configured to output speech intelligibility metrics (SIMs) 603. In this example, the intelligibility metric evaluation module 602 is configured to output a time varying information stream indicating speech intelligibility.

The intelligibility metric evaluation module 602 may estimate speech intelligibility in various ways, depending on the particular implementation. There are a number of current approaches to estimating speech intelligibility and it is expected that in the future there will be more such methods.

According to some implementations, the intelligibility metric evaluation module 602 may estimate speech intelligibility by analysis of the audio data according to one or more methods for determining speech intelligibility in young children and/or persons with speech or hearing impediments. In some such examples, the intelligibility of each word of a speech sample may be evaluated and an overall score for the speech sample may be determined. According to some such examples, the overall score for the speech sample may be a ratio I/T, determined by the number of intelligible words I divided by the number of total words T. In some such examples, a determination of whether a word is intelligible or unintelligible may be made according to an automatic speech recognition (ASR) confidence score. For example, a word that has an ASR confidence score that is at or above a threshold may be considered intelligible, whereas a word that has an ASR confidence score that is below the threshold may be considered unintelligible. According to some examples, text corresponding to the speech may be provided to the control system as a "ground truth" as to the actual words of the speech. In some such examples, the overall speech intelligibility score for the speech sample may be a ratio C/T, determined by the number of words C that are correctly identified by an ASR process, divided by the number of total words T.

In some implementations, the intelligibility metric evaluation module 602 may estimate speech intelligibility by analysis of the audio data according to a published metric such as the speech transmission index (STI), the common intelligibility scale (CIS) or C50, the last of which is measured as the ratio of early-arriving sound energy (arriving between 0 and 50 ms) and late-arriving sound energy (arriving later than 50 ms).

According to some implementations, the SIM may be based, at least in part, on one or more user characteristics, e.g., characteristics of a person who is a user of a television or other device that will be used to reproduce the received content stream. In some examples, the one or more user characteristics may include the user's native language, the user's accent, the user's position in the environment, the user's age, and/or at least one of the user's capabilities. The user's capabilities may, for example, include the user's hearing ability, the user's language proficiency, the user's accent comprehension proficiency, the user's eyesight and/or the user's reading comprehension.

In some such implementations, the user may have previously provided input regarding one or more such user characteristics. According to some such examples, the user may have previously provided input via a graphical user interface (GUI) provided on a display device according to commands from the control system.

Alternatively, or additionally, the control system may have inferred one or more of the user characteristics based on the user's past behavior, such as the language(s) selected by the user for reproduced content, the user's demonstrated ability to comprehend language and/or regional accents (e.g., as evidenced by instances in which the user has selected a closed captioning system, a surtitling system or a subtitling system), the relative complexity of language that is used in content selected by the user, the playback volume selected by the user (e.g., for portions of reproduced content corresponding to speech), whether the user has previously used a device for the visually impaired (such as a tactile display system), etc.

According to some alternative implementations, the intelligibility metric evaluation module 602 may estimate speech intelligibility via a machine learning based approach. In some such examples, the intelligibility metric evaluation module 602 may estimate the speech intelligibility of the input audio data via a neural network that has been trained on a set of content for which the intelligibility is known.

Figure 7A:
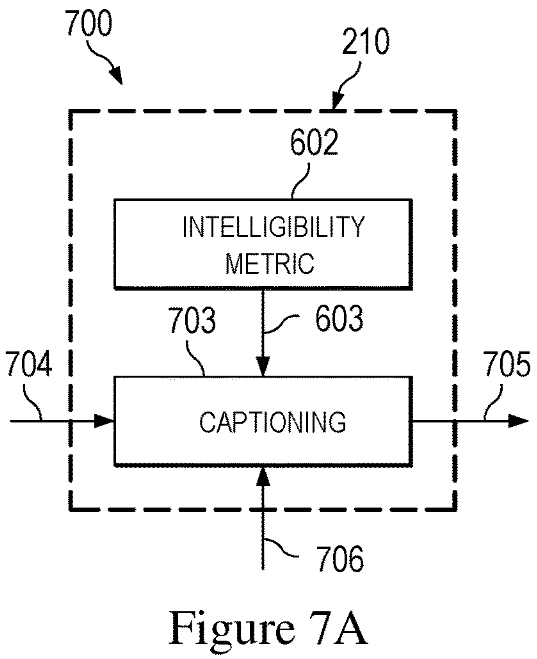
FIG. 7A shows an example of a closed captioning system that is controlled by an intelligibility metric.

FIG. 7A shows an example of a closed captioning system that is controlled by an intelligibility metric. As with other figures provided herein, the types and numbers of elements shown in FIG. 7A are merely provided by way of example. Other implementations may include more, fewer and/or different types and numbers of elements. For example, in this and other disclosed examples, functionality of a closed captioning system, a surtitling system or a subtitling system may be described. The examples provided for any one such system are intended to apply to all such systems, unless the present disclosure states otherwise.

According to this example, FIG. 7A shows a system 700 wherein an intelligibility metric is used for changing displayed captions. In this example, the system 700 includes an intelligibility metric evaluation module 602 and a captioning display renderer 703, both of which are implemented via the control system 210 that is described with reference to FIG. 2. In some implementations, the system 700 may use display sensors or knowledge of user capabilities (e.g., eyesight) to change the rendering of the fonts used in a closed captioning system According to this implementation, the intelligibility metric evaluation module 602 is configured to output speech intelligibility metrics (SIMs) 603. In this example, the intelligibility metric evaluation module 602 is configured to output a time varying information stream that includes speech intelligibility metrics 603, as described above with reference to FIG. 6.

In the example shown in FIG. 7A, the captioning display renderer 703 is receiving a video stream 704 that includes frames of video. In some implementations, the video stream 704 may include metadata that describes the closed captions and/or descriptive text (such as "[music playing]")." In this example, the captioning display renderer 703 is configured to takes in a frame of video from the video stream 704, to overlay closed captions on the frame and to output a modified video frame 705, which has the closed captioning and/or descriptive text overlaid. According to this implementation, the input captioning text is embedded as metadata within the video stream 704.

In some implementations, the captioning display renderer 703 may be configured to change what is displayed based upon numerous factors. These factors may, for example, include user capabilities and/or display capabilities. User capabilities may, for example, include visual acuity, language proficiency, accent comprehension proficiency, reading ability and/or mental state. In order to make the text easier to read for a particular user, the captioning display renderer 703 may change the font and/or font size, (e.g., increase the font size) based on one of more factors.

According to some examples, the factors may include external input. In some instances, the captioning display renderer 703 may change the font and/or font size to ensure that it is readable in a lighting environment with a particular light intensity or color spectrum. In some such examples, the environment may be measured via a light sensor, color sensor or camera and the corresponding sensor data may be provided to the control system 210, e.g., to the captioning display renderer 703. One such example is shown in FIG. 7A, wherein the captioning display renderer 703 is shown receiving imaging-based information 706 that can be used for changing the closed captioning. Imaging-based information 706 may, for example, include user eyesight information, the lighting conditions within the room, the capability of the display on which the closed captions will be shown, etc.

According to some examples, the captioning display renderer 703 may respond to changing lighting conditions of the environment in a hysteresis-based manner, analogous to the hysteresis-based responses to noise conditions in the environment that is described above with reference to FIG. 5. For example, some implementations may involve a first light intensity threshold that will trigger a change from a normal state of the closed captioning (such as enlarged text and/or a bold letters) and a second light intensity threshold that will cause a resumption of the normal state of the closed captioning. In some examples, the first light intensity threshold may correspond with a lower light intensity than that of the second light intensity threshold.

If a user has a low language capability and/or a low reading ability, and corresponding imaging-based information 706 has been provided to the captioning display renderer 703, in some implementations the captioning display renderer 703 may modify the text to simplify the meaning and to make the text easier to understand than a word-for-word transcript of audio data corresponding to speech.

Figure 7B:
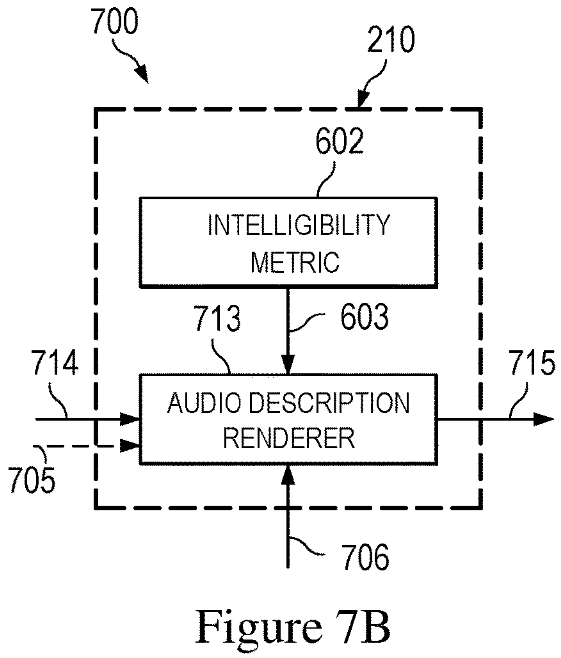
FIG. 7B shows an example of an audio description renderer that is controlled by an intelligibility metric.

FIG. 7B shows an example of an audio description renderer that is controlled by an intelligibility metric. In this implementation, control system 210 is configured to provide the functionality of an audio description renderer 713. According to this example, the speech intelligibility metrics 603 are used by the audio description renderer 713 to optionally mix an audio-based description of the content (herein referred to as audio description) into the input audio stream 714, to produce an output audio stream 715 that includes audio descriptions.

According to some implementations, modified video frames 705 that are output from the captioning display renderer 703 are optionally input to the audio description renderer 713. In some such instances, the modified video frames 705 may include closed captioning and/or descriptive text. In some such examples, audio descriptions in the output audio stream 715 may be synthesized by the audio description renderer 713 from the closed captions and/or by analysis of the video and/or audio content input to the audio description renderer 713. In some implementations, audio descriptions may be included in the input to the audio description renderer 713. According to some implementations, input audio descriptions may be mixed with audio descriptions synthesized by the audio description renderer 713. In some examples, the proportions of the mix may be based, at least in part, on the speech intelligibility metrics 603.

In some implementations, the audio description renderer 713 may be configured to change what is mixed based upon numerous factors. These factors may, for example, include user capabilities and/or display capabilities. User capabilities may, for example, include visual acuity, language proficiency, accent comprehension proficiency, reading ability and/or mental state. In some implementations, output from the closed captioning renderer 703 and the audio description renderer 713 may be used together to improve comprehension by the user.

Figure 8:
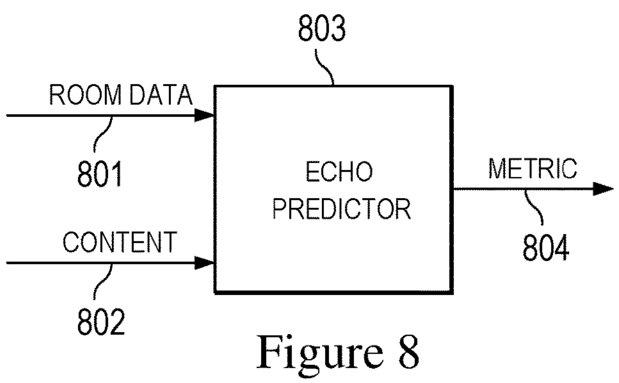
FIG. 8 shows an example of an echo predictor module.

FIG. 8 shows an example of an echo predictor module. The reverberance of an audio environment can have a significant impact on speech intelligibility. In some implementations, a control system's determination of whether to turn closed captioning on or off may be based, at least on part, on one or more metrics corresponding to audio environment reverberance. According to some examples, a control system's determination of whether to turn closed captioning on or off may be based entirely upon one or more metrics corresponding to audio environment reverberance, e.g., in cases of extreme reverberance. In some alternative implementations, a control system's determination of whether to turn closed captioning on or off may be based partially on one or more metrics corresponding to audio environment reverberance, but also may be based on a content-based speech intelligibility metric, environmental noise and/or other speech intelligibility metrics.

In the example shown in FIG. 8, data 801 is provided to the echo predictor module 803. In this example, data 801 includes information about the characteristics of the audio environment. The data 801 may, for example, be obtained from sensors in the audio environment (such as microphones). In some instances, at least a portion of the data 801 may include direct user input.

In this example, a content stream 802 is also provided to the echo predictor module 803. The content stream 802 includes the content that is to be presented in the audio environment, e.g., via one or more display devices and audio reproduction transducers of the environment. The content stream 802 may, for example, correspond to the content stream 601 that is described above with reference to FIG. 6. According to some implementations, the content stream 802 may include rendered audio signals.

According to this example, the echo predictor module 803 is configured to calculate the impact on intelligibility that the room echo and reverberance will have on the given content. In this example, the echo predictor module 803 is configured to output a metric 804 for speech intelligibility, which may in some instances be a time-varying metric. If, for example, the audio environment is highly reverberant then the speech will be hard to understand and the metric 804 for intelligibility will generally be low. If the room is highly anechoic then the metric 804 for intelligibility will generally be high.

Figure 9:
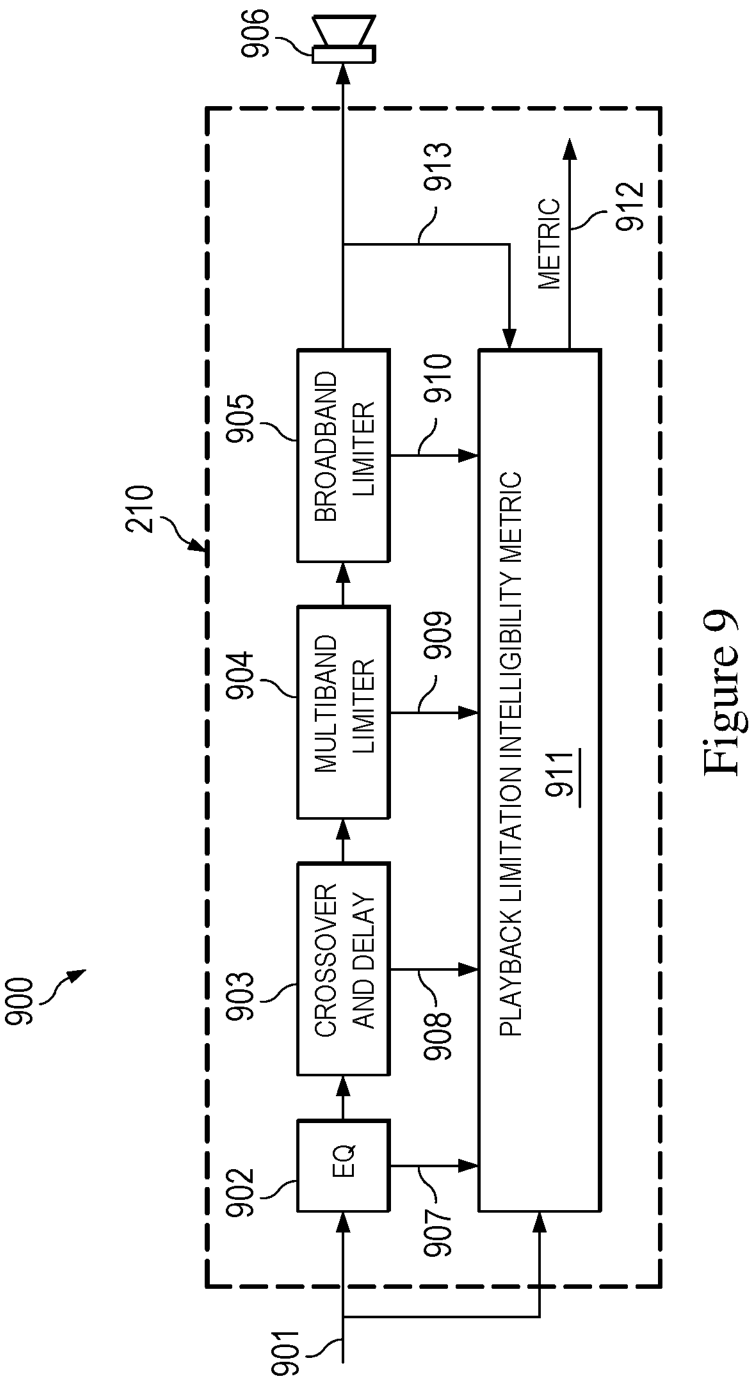
FIG. 9 shows an example of a system that is configured for determining an intelligibility metric that is based, at least in part, on playback processing.

FIG. 9 shows an example of a system that is configured for determining an intelligibility metric that is based, at least in part, on playback processing. As with other figures provided herein, the types and numbers of elements shown in FIG. 9 are merely provided by way of example. Other implementations may include more, fewer and/or different types and numbers of elements.

In this example, FIG. 9 includes the following elements:

901: Input audio data;

902: An equalization (EQ) filter to flatten the audio reproduction transducer response (optional);

903: Crossover and/or delay filters (optional);

904: A multiband limiter that avoids non-linear behavior in a loudspeaker (optional);

905: A broadband limiter;

906: An audio reproduction transducer (e.g., a loudspeaker);

907: The characteristics of the EQ filter (e.g., the frequency response, delay, ringing, etc.);

908: The characteristics of the crossovers and delays;

909: The current state of the multiband limiter (e.g., the amount of limiting the multiband limiter is applying);

910: The current state of the limiter (e.g. the amount of limiting the limiter is applying);

911: An environmental intelligibility metric module that takes into account the playback characteristics of the device with the current content;

912: An intelligibility metric; and

913: A reference of the audio reproduction transducer feed signal which may optionally be used for determining the intelligibility metric.

In some devices it may not be possible to reproduce the audio at the user-requested volume. This may be due to capabilities of the audio reproduction transducers, amplifiers or some other implementation details that cause a limited amount of headroom within the system.

For example, the frequency response of the system may not be flat (e.g., due to the audio reproduction transducers itself or, in a multi-driver case, due to crossovers and/or audio reproduction transducers placement). A non-flat frequency response may cause the intelligibility of the speech to decrease. This condition can be mitigated by flattening out the frequency response using an equalization filter 902. However, in some instances a device may still have a non-flat response even after the equalization filter is applied. By measuring the speech intelligibility after the equalization filter is applied, the true speech intelligibility can be realized and then used for turning the closed captioning on and off.

Some implementations may incorporate one or more multiband limiters 904 and/or broadband limiters 905 to ensure that components of the system are protected from going outside their linear range.

In some multiband systems the closed captioning may only turn on when the limiting is occurring for audio data within speech frequencies, for example audio data between 50 Hz-2 kHz or audio data within other disclosed speech frequency ranges. In some alternative examples, the system 900 may determine the intelligibility metric(s) based on the audio data 913, after the limiters are applied and just before the audio is sent to the loudspeaker 906.

In some instances, a loudspeaker may be driven to its non-linear region to obtain increased volume. Driving a loudspeaker to its non-linear region causes distortion, for example intermodulation or harmonic distortion. According to some examples, the closed captioning may be turned on in these cases whenever there is any non-linear behavior (either as estimated via a model or as determined via a direct microphone-based measurement, such as a linear echo canceller). Alternatively, or additionally, the measured or modelled non-linear behavior may be analyzed to determine the intelligibility of the speech in the presence of the distortion.

Figure 10:
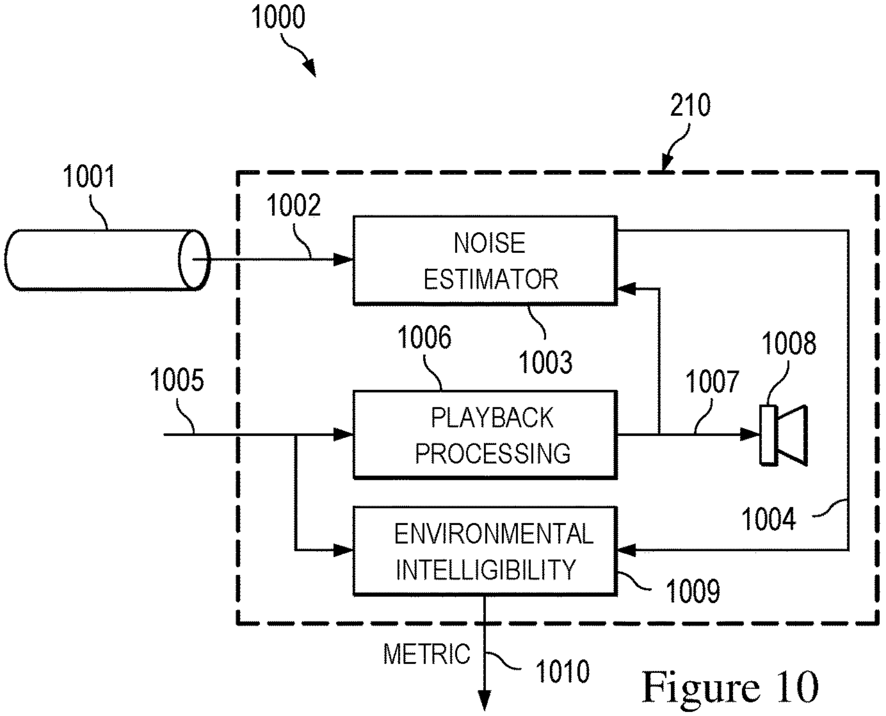
FIG. 10 shows an example of a system that is configured for determining an intelligibility metric that is based, at least in part, on environmental noise levels.

FIG. 10 shows an example of a system that is configured for determining an intelligibility metric that is based, at least in part, on environmental noise levels. As with other figures provided herein, the types and numbers of elements shown in FIG. 10 are merely provided by way of example. Other implementations may include more, fewer and/or different types and numbers of elements.

In this example, FIG. 10 includes the following elements:

1001: A microphone that is configured to measure environmental noise;

1002: The microphone signal;

1003: A background noise estimator;

1004: The background noise estimate;

1005: Input content, including audio data and/or input metadata;

1006: A playback processing module, which may be configured for decoding, rendering and/or post-processing;

1007: The audio reproduction transducer feed and echo reference;

1008: The audio reproduction transducer that is playing back the content;

1009: A environmental intelligibility metric module that is configured to determine an intelligibility metric that is based, at least in part, on the background environmental noise; and

1010: An intelligibility metric.

In some examples, environmental noise levels, relative to the level of input audio signals corresponding to speech, may be used as an alternative to a pure speech intelligibility metric. In some such implementations, the environmental intelligibility metric module 1009 may be configured to combine the environmental noise level with a speech intelligibility metric, or level, to create a combined intelligibility metric.

According to some implementations, if the intelligibility level of the speech is low but the environmental noise level is high, the environmental intelligibility metric module 1009 may be configured to output an intelligibility metric 1010 indicating that a compensation process will be enabled. According to some implementations, the compensation process may involve altering a processing of the audio data in one or more of the ways disclosed herein. Alternatively, or additionally, in some implementations, the compensation process may involve applying a non-audio-based compensation method, such as enabling closed captioning. In some such examples, if the environmental noise level is low but the speech intelligibility is high, the environmental intelligibility metric module 1009 may be configured to output an intelligibility metric 1010 indicating that closed captions will be kept off. In some implementations, if the speech intelligibility is high and the environmental noise level is high, depending on the combined intelligibility of the speech the environmental intelligibility metric module 1009 may be configured to output an intelligibility metric 1010 indicating that closed captions will be on or off.

Figure 11:
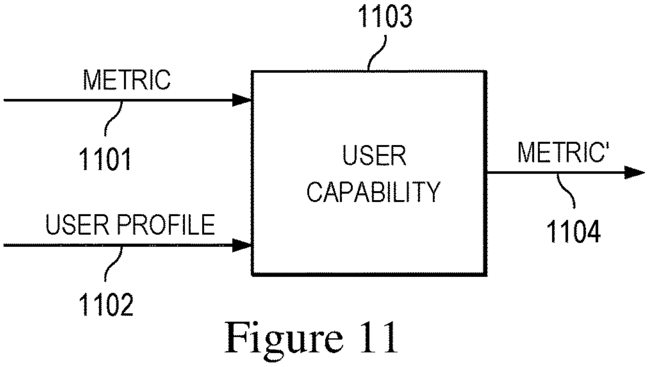
FIG. 11 shows an example of a system that is configured for modifying an intelligibility metric based, at least in part, on one or more user capabilities.

FIG. 11 shows an example of a system that is configured for modifying an intelligibility metric based, at least in part, on one or more user capabilities. As with other figures provided herein, the types and numbers of elements shown in FIG. 11 are merely provided by way of example. Other implementations may include more, fewer and/or different types and numbers of elements.

In this example, FIG. 11 includes the following elements:

1101: An input intelligibility metric, or stream of intelligibility metrics, as calculated by another process, such as one of the other disclosed methods for determining an intelligibility metric. In some examples, the input intelligibility metric may correspond to the output speech intelligibility metrics (SIMs) 603 that are output by the intelligibility metric evaluation module 602 that is described above with reference to FIG. 6;

1102: A user profile. Examples of user profiles may include profiles such as "hearing impaired," "no adjustment" (e.g., having average hearing ability) or "superhuman" (e.g., having unusually good hearing ability);

1103: The intelligibility metric modifier that is configured for modifying the input intelligibility metric 1101 based, at least in part, on one or more user capabilities; and

1104: An adjusted intelligibility metric that takes into account the user profile.

The intelligibility metric modifier 1103 may, for example, be implemented via a control system such as the control system 210 of FIG. 2. There are a variety of methods that the intelligibility metric modifier 1103 may use to modify the input intelligibility metric 1101. In some examples, if the user profile indicates that the user is hearing-impaired, the intelligibility metric modifier 1103 may be configured to decrease the input intelligibility metric 1101. The amount of the decrease may correspond to the degree of hearing impairment. For example, if the input intelligibility metric 1101 is 0.7 on a scale from 0 to 1.0 and the user profile indicates that the degree of hearing impairment is slight, in one example the intelligibility metric modifier 1103 may be configured to decrease the input intelligibility metric 1101 to 0.6. In another example, if the input intelligibility metric 1101 is 0.8 on a scale from 0 to 1.0 and the user profile indicates that the degree of hearing impairment is moderate, in one example the intelligibility metric modifier 1103 may be configured to decrease the input intelligibility metric 1101 to 0.6 or to 0.5.

In some implementations, if the user profile indicates that the user is "superhuman" (having unusually good hearing ability, unusually good language proficiency, unusually good accent comprehension proficiency, etc.) the intelligibility metric modifier 1103 may be configured to increase the input intelligibility metric 1101. For example, if the input intelligibility metric 1101 is 0.5 on a scale from 0 to 1.0 and the user profile indicates that the user has an unusually good hearing ability, in one example the intelligibility metric modifier 1103 may be configured to increase the input intelligibility metric 1101 to 0.6.

In some examples, the user profile may include a frequency-based hearing profile of a user. According to some such examples, the intelligibility metric modifier 1103 may be configured to determine whether to alter the input intelligibility metric 1101 based, at least in part, on the frequency-based hearing profile. For example, if the frequency-based hearing profile indicates that the user has a normal hearing ability in a frequency range corresponding to speech, the intelligibility metric modifier 1103 may determine that the input intelligibility metric 1101 will not be changed. In another example, if the input intelligibility metric 1101 is 0.8 on a scale from 0 to 1.0 and the frequency-based hearing profile indicates that the user has a moderate level of hearing impairment in a frequency range corresponding to speech, the intelligibility metric modifier 1103 may be configured to decrease the input intelligibility metric 1101 to 0.6 or to 0.5.

In some alternative implementations, the user frequency response profile may be applied directly to the input audio. For example, referring to FIG. 6, in some such implementations a control system may be configured for multiplying, in the frequency domain, the hearing response of the user to the frequency domain representation of the audio portion of the content 601 before the result is input to the intelligibility metric evaluation 602.

Referring again to FIG. 11, examples of some other methods that the intelligibility metric modifier 1103 may use to modify the input intelligibility metric 1101 are described below.

User Characteristics

Language

The speech intelligibility and the need for closed captioning can be related to whether or not the user is a native speaker of the language of speech to which the user is listening. Therefore, in some implementations, user input regarding language comprehension ability and/or regional accent comprehension ability (and/or data acquired during a user's previous viewing/listening events, such as instances of the user manually switching on subtitles) may be used as a modifier to the speech intelligibility metric. For example, if a user appears to be fluent in a language and the content will be presented in that language, the intelligibility metric modifier 1103 may determine that no change will be made to the input intelligibility metric 1101.

However, if the user appears to have limited abilities in the language, the intelligibility metric modifier 1103 may determine that the input intelligibility metric 1101 will be decreased in proportion to the limitations of the user's language proficiency. For example, if the user appears to have little or no comprehension of the language, the intelligibility metric modifier 1103 may determine that the input intelligibility metric 1101 will be decreased to zero. In some instances, the intelligibility metric modifier 1103 may include metadata with the adjusted intelligibility metric 1104 indicating that subtitles should be presented and indicating a language in which subtitles will be presented. For example, if the content speech is in English, the user profile indicates that the user has little or no comprehension of English and that the user is fluent in French, the metadata may indicate that French subtitles should be presented.

In another example, if the user appears to have a moderate level of language listening comprehension, the intelligibility metric modifier 1103 may determine that the input intelligibility metric 1101 will be reduced by half. In some such examples, the user profile may indicate that the user's reading comprehension in the same language is sufficient to understand text corresponding to the content's speech. In some such examples, the intelligibility metric modifier 1103 may be configured to include metadata with the adjusted intelligibility metric 1104 indicating that subtitles should be presented and indicating a language in which subtitles will be presented. For example, if the content speech is in English, the user profile indicates that the user's reading comprehension in English is sufficient to understand text corresponding to the content's speech in English, the metadata may indicate that English subtitles should be presented.

In some instances, a user may have verbal proficiency in a language without also having reading proficiency and vice versa. Some listeners may prefer closed captioning and/or subtitles, whereas others may not. For example, some users may prefer dubbing to subtitles. Therefore, in some implementations user input and/or observed user behavior regarding such preferences may be used to automatically accommodate such differences. In some implementations, user preference data may indicate a user's primary preferred language, secondary preferred language, etc., as well as a user's preference for subtitles or dubbing.

In one example, a user may have 100% proficiency in French, 50% proficiency in English and 25% proficiency in German. If the received broadcast video content has a native English-language soundtrack with options for French and German dubbed language tracks along with subtitle options for all three languages, then according to some implementations the intelligibility metric may be used to select (1) the audio playback track (2) the subtitle track or (3) a combination of both. In this example, 50% proficiency may be good enough to default to the English soundtrack, with French subtitles for assistance. In some instances, the user may have expressly indicated a preference for hearing the English soundtrack if the received broadcast has a native English-language soundtrack. In other instances, the user's selection of the English soundtrack may be recorded and/or used to update the user preference data. The user may prefer hearing the English soundtrack and seeing French subtitles to perceiving a dubbed French soundtrack, so that the content can be experienced as created, with better lip synchronization, original actors' voices, etc. Each country has regional preferences for subtitles vs. dubbing (most Americans prefer subtitles, whereas most Germans prefer dubbing). In some implementations, a country-based or region-based default may be used to determine whether to present subtitles or dubbing if no specific user preference data is available.

In some implementations, a control system may be configured to choose a combination of audio playback and subtitle tracks that lead to an estimated maximum level of user intelligibility. Alternatively, or additionally, some implementations may involve selecting at least a minimum acceptable intelligibility level, e.g., as determined by an intelligibility metric threshold.

Accent

The accent of the content in conjunction on whether the user is accustomed to that accent can have an impact on speech intelligibility for the user. There are a variety of methods for determining whether the user will be accustomed to that accent. For example, express user input regarding the user's preference may be provided to the intelligibility metric modifier 1103 in some implementations. In other cases, the location of one or more devices used for playback (e.g., the location of a television) may be compared with a data structure that includes one or more known sets of regional accents and corresponding locations. If the user is likely to be unaccustomed to the accent (e.g., a listener located in Canada) watching an Australian television show), then the intelligibility metric modifier 1103 may be configured to decrease an input intelligibility metric 1101 that corresponds to a Canadian listener watching a Canadian show.

User Capabilities

In some cases a user may suffer from a condition such as dyslexia or ADHD that makes the text hard to read or reduces attention span. In some such examples, the intelligibility metric modifier 1103 may be configured to include metadata with the adjusted intelligibility metric 1104 indicating that closed captioning should be turned off, because the user would not benefit from the closed captioning. In other implementations, the intelligibility metric modifier 1103 may be configured to include metadata with the adjusted intelligibility metric 1104 indicating that the text for the closed captioning should be simplified and/or that the font size of the text should be increased in response to the user's condition. In some implementations, subtitles may include less text (a simplified version of speech) and closed captioning may include more text (a complete or substantially complete version of speech). According to some such implementations, simplifying the text may involve presenting subtitles instead of closed captioning.

Age and Reading Comprehension

The age and/or reading comprehension of a listener can affect a determination as to whether the speech intelligibility metric should be modified and/or whether closed captioning should be used. For example, a control system may determine not to turn on closed captions for a television show being watched only by a person who cannot read, such as a young child.

If the viewer has difficulty comprehending fast conversation, which is a common characteristic of elderly people, according to some examples the intelligibility metric modifier 1103 may be configured to decrease an input intelligibility metric 1101, based at least in part on the speech rate of the content, e.g., the pace of a conversation in the speech. The speech rate of the content may, for example, be determined according to the number of words per unit of time. In some such implementations, if speech rate of the content is at or above a threshold level, a control system may cause the closed captioning to be turned on.

Hearing Profile

In some cases, a listener may have lost some of the ability to hear certain frequencies. According to some implementations, this condition may be used as a basis for changing the speech intelligibility (e.g., if the listener has lost some of the ability to hear speech frequencies). For example, a control system may be configured to apply a mathematical representation of the person's hearing profile (e.g., a representation of the frequency response of the person's ears, including the hearing loss) to the input audio before calculating the speech intelligibility metric. Such implementations may increase the probability that the closed captioning will be turned on and off at the appropriate times. The hearing profile may be provided to the control system by the user (e.g., via an interactive testing process or via user input) or from one or more other devices, such as the user's hearing aid or cochlear implant.

Figure 12:
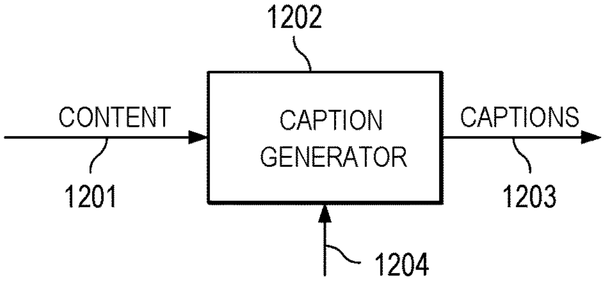
FIG. 12 shows an example of a caption generator.

FIG. 12 shows an example of a caption generator. The caption generator 1202 may be implemented via a control system, e.g., the control system 210 of FIG. 2. In this example, the caption generator 1202 is configured to automatically synthesize closed captions 1202 that correspond to speech in an input audio stream 1201, based at least in part on an ASR process. According to this example, the caption generator 1202 is also configured to modify the content of the closed captions 1202 based upon an input intelligibility metric 1204. The type of intelligibility metric 1204 may vary, depending on the particular implementation. In some examples, the intelligibility metric 1204 may be an adjusted intelligibility metric that takes into account a user profile, such as the adjusted intelligibility metric 1104 that is described above with reference to FIG. 11. Alternatively, or additionally, in some examples the intelligibility metric 1204 may be an adjusted intelligibility metric that takes into account characteristics of the audio environment, such as environmental noise and/or reverberation. The intelligibility metric 1010 that is described above with reference to FIG. 10 is one such example.

In some implementations, if the intelligibility metric 1204 indicates that the intelligibility is medium, then captions indicating descriptive text such as "[music playing]" may be omitted and only the speech captions may be included. In some such examples, as the intelligibility decreases more descriptive text may be included.

Figure 13:
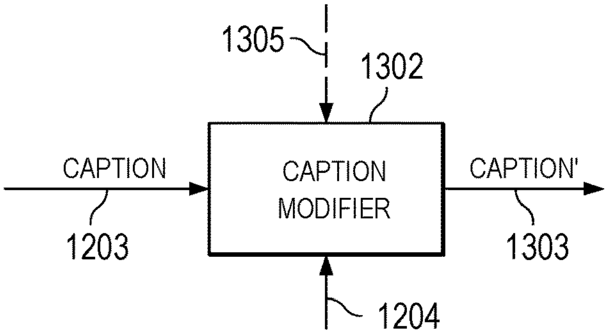
FIG. 13 shows an example of a caption modifier module that is configured to change the closed captioning based upon an intelligibility metric.

FIG. 13 shows an example of a caption modifier module that is configured to change the closed captioning based upon an intelligibility metric. According to this example, the caption modifier module 1302 is configured to receive the captions 1202 that are output from the caption generator 1202 of FIG. 12. In this example, the captions 1202 are contained within a video stream. According to this example, the caption modifier module 1302 is also configured to receive the intelligibility metric 1204 and to determine whether and how to modify the captions based on the intelligibility metric 1204.

In some implementations, the caption modifier module 1302 may be configured to increase the font size to improve text intelligibility if the intelligibility metric 1204 is low. In some such examples, the caption modifier module 1302 also may be configured to change the font type to improve text intelligibility if the intelligibility metric 1204 is low.

According to some examples, the caption modifier module 1302 may be configured to apply a caption "filter" that may potentially reduce the number of captions in the modified caption stream 1303, depending on the intelligibility metric 1204. For example, if the intelligibility metric 1204 is low, the caption modifier module 1302 may not filter out many (and in some instances may not filter out any) of the captions. If the intelligibility metric 1204 is high, then the caption modifier module 1302 may determine that the number of required captions has decreased. For example, the caption modifier module 1302 may determine that descriptive captions such as "[music playing]" are not required but that the speech captions are required. Therefore, the descriptive captions will be filtered out, but the speech captions will still remain in the modified caption stream 1303.

In some implementations, the caption modifier module 1302 may be configured to receive user data 1305. According to some such implementations, the user data 1305 may indicate the user's native language, the user's accent, the user's position in the environment, the user's age and/or one or more of the user's capabilities. Data relating to one or more of the user's capabilities may include data relating to the user's hearing ability, the user's language proficiency, the user's accent comprehension proficiency, the user's eyesight and/or the user's reading comprehension.

According to some examples, if the user data 1305 indicates that the user's capabilities are low and/or if the intelligibility metric 1204 is low, the caption modifier module 1302 may be configured to cause the text of closed captions to be simplified or rephased (e.g., using a language engine) to increase the likelihood that the user can understand the captions that are being shown on the display. In some examples, the caption modifier module 1302 may be configured to simplify speech-based text for non-native speakers and/or to present text in a relatively larger font size for those with vision issues. According to some examples, if the user data 1305 indicates that the user's capabilities are high and/or if the intelligibility metric 1204 is high, the caption modifier module 1302 may be configured to cause the text of closed captions to remain unchanged.

In some examples, the caption modifier module 1302 may be configured to cause the text of closed captions to be filtered in order to remove specific phrases due to the user's preferences, age, etc. For example, the caption modifier module 1302 may be configured to filter out text corresponding to foul language and/or slang.

Figure 14:
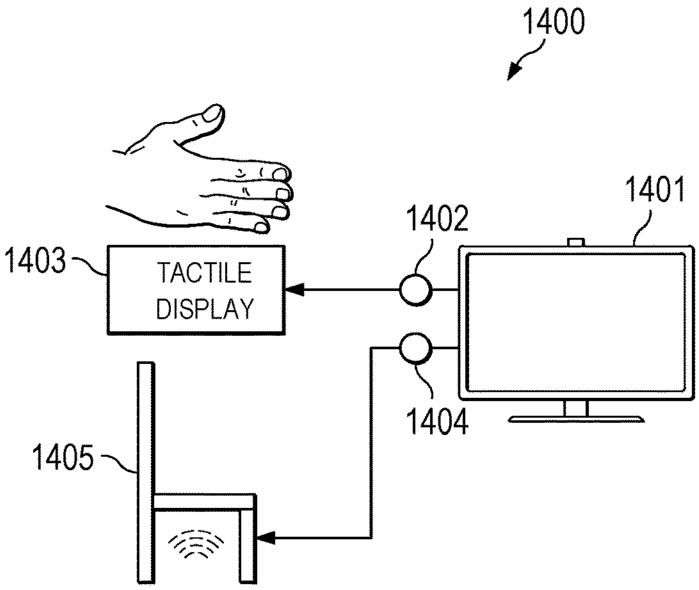
FIG. 14 shows further examples of non-audio compensation processes. systems that can be controlled based upon the noise estimator.

FIG. 14 shows further examples of non-audio compensation processes. systems that can be controlled based upon the noise estimator. These systems may be turned on and off in a similar manner to the closed captioning system control described above.

In this example, a control system of a television 1401 incorporates a noise estimation system and/or a speech intelligibility system. The control system is configured to make an estimate of environmental noise and/or speech intelligibility based on microphone signals received from one or more microphones of the environment 1400. In alternative examples, a control system for one or more elements of an audio system (e.g., a smart speaker that includes one or more microphones) may incorporate the noise estimation system. The control systems may be instances of the control system 210 of FIG. 2.

According to this example, the tactile display system 1403 is an electrically controlled braille display system, which is configured to produce braille text. In this example, a signal 1402 has been transmitted from the control system indicating that the tactile display system 1403 should be turned on or the braille text simplified. The signal 1402 may have been transmitted from the control system after the noise estimate reaches or exceeds a threshold (e.g., as described elsewhere herein). Such implementations can allow blind or vision-impaired users to understand speech when the environmental noise becomes too high for such users to readily understand an audio version of the speech.

In this example, the seat vibrator 1405 is configured to vibrate a seat. For example, the seat vibrator 1405 may be used to compensate, at least in part, for the absence of low-frequency performance of the speakers within the television 1401. In this example, a signal 1404 has been sent from the control system indicating that the seat vibrator should start being used. The control system may, for example, send the signal 1404 responsive to a determination the noise estimate has reached or exceeded a threshold in a certain band (e.g., a low frequency band). According to some examples, if the noise estimation system determines that the environmental noise continues to increase, the control system will cause low frequency audio to be progressively routed to the seat vibrator 1405.

As noted elsewhere in this disclosure, some disclosed compensation processes that may be invoked by a control system in response to a noise metric or a speech intelligibility metric involve audio-based processing methods. In some such examples, an audio-based processing method also may compensate, at least in part, for the limitations of one or more audio reproduction transducers, e.g., for the limitations of a television audio reproduction transducer system. Some such audio processing may involve audio simplification (such as audio scene simplification) and/or audio enhancement. The audio simplification may, in some examples, involve removing one or more components of audio data (e.g., to leave only the more important parts). Some audio enhancement methods may involve adding audio to the overall audio reproduction system, e.g., to audio reproduction transducers of the environment that are relatively more capable.

Figure 15:
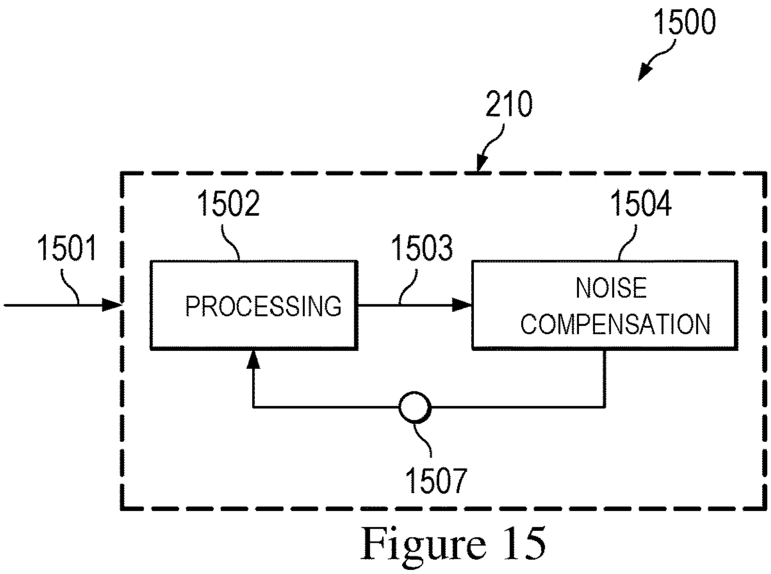
FIG. 15 shows an example of a noise compensation system.

FIG. 15 shows an example of a noise compensation system. In this example, the system 1500 includes a noise compensation module 1504 and a processing module 1502, both of which are implemented via the control system 210 in this instance. The processing module 1502 is configured to process input audio data 1501, which may in some examples be an audio signal from a file or audio signals from streaming service. The processing module 1502 may, for example, include an audio decoder, an equalizer, a multiband limiter, a broadband limiter, a renderer, an upmixer, a speech enhancer and/or a bass distribution module.

In this example, the noise compensation module 1504 is configured to determine a level of environmental noise and to send control signals 1507 to the processing module 1502 if the noise compensation module 1504 determines that a level of environmental noise is at or above a threshold. For example, if the processing module 1502 includes a decoder, in some examples the control signals 1507 may instruct the decoder to decode a relatively lower-quality audio stream in order to save power. In some examples, if the processing module 1502 includes a renderer, in some examples the control signals 1507 may instruct the renderer to render only high-priority audio objects when the noise level is high. In some examples, if the processing module 1502 includes an upmixer, in some examples the control signals 1507 may instruct the upmixer to discard diffuse audio content so that only the direct content will be reproduced.

In some implementations, the processing module 1502 and the noise compensation module 1504 may reside in more than one device. For example, some audio may be upmixed to other devices based upon the noise estimate. Alternatively, or additionally, in some implementations (e.g., implementations for blind or visually impaired people) the control system 210 may request a high noise level audio description or a low noise level audio description from the source of the input audio data 1501. The high noise level audio description may correspond with relatively less content within the input audio data 1501, whereas the low noise level audio description may correspond with relatively more content within the input audio data 1501. In some implementations, these audio streams may be contained within a multi-stream audio codec, such as Dolby TrueHD. In alternative implementations, these audio streams may be deciphered and then resynthesized (e.g., for closed captioning) by the control system 210.

Figure 16:
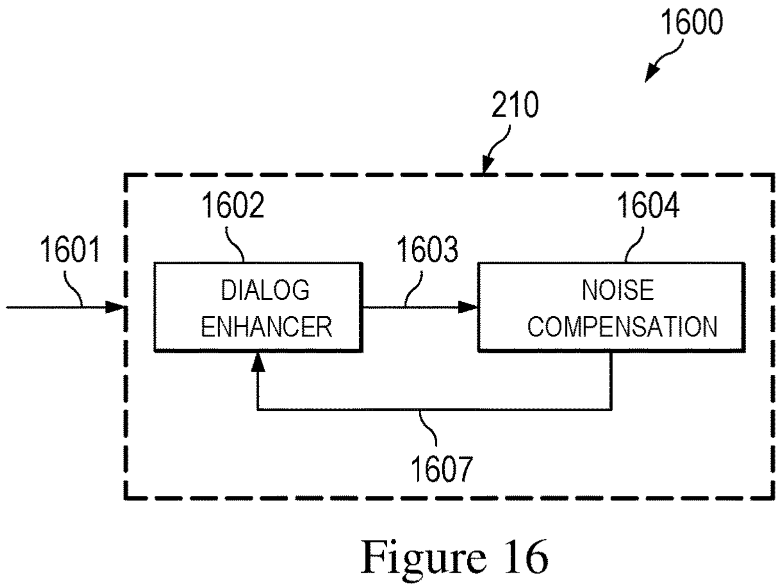
FIG. 16 shows an example of a system that is configured for speech enhancement in response to detected environmental noise.

FIG. 16 shows an example of a system that is configured for speech enhancement in response to detected environmental noise. In this example, the system 1600 includes a speech enhancement module 1602 and a noise compensation module 1604, both of which are implemented via the control system 210. According to this implementation, the noise compensation module 1604 is configured to determine a level of environmental noise and to send signals 1607 to the speech enhancement module 1602 if the noise compensation module 1604 determines that a level of environmental noise is at or above a threshold. In some implementations, the noise compensation module 1604 may be configured to determine a level of environmental noise and to send signals 1607 corresponding to the level of environmental noise to the speech enhancement module 1602, regardless of whether a level of environmental noise is at or above a threshold.

According to this example, the speech enhancement module 1602 is configured to process input audio data 1601, which may in some examples be an audio signal from a file or audio signals from a streaming service. The audio data 1601 may, for example, correspond to video data, e.g., of a movie or a television program. In some implementations, the speech enhancement module 1602 may be configured to receive an environmental noise estimate from the noise compensation module 1604 and to adjust the amount of speech enhancement that is applied based upon the environmental noise estimate. For example, if a signal 1607 indicates that the environmental noise is high, in some implementations the speech enhancement module 1602 will cause an amount of speech enhancement to increase, because speech intelligibility becomes more challenging in the presence of a high environmental noise level.

The type and degree of speech enhancement that the speech enhancement module 1602 is configured to cause depends on the particular implementation. In some examples, the speech enhancement module 1602 may be configured for reducing a gain of non-speech audio data. Alternatively, or additionally, the speech enhancement module 1602 may be configured for increasing a gain of speech frequencies.

In some implementations, the speech enhancement module 1602 and the noise compensation module 1604 may be implemented in more than one device. For example, a hearing aid's speech enhancement feature may, in some implementations, be controlled (at least in part) according to another device's (e.g., a television's) noise estimate.

According to some examples, the speech enhancement module 1602 may be used when one or more audio reproduction transducers of the environment are reaching their limit, in order to remove audio from the system and thus enhance clarity. When the audio reproduction transducers are not reaching the limit of their linear range, a speech frequency emphasis type of speech enhancement may be used.

Figure 17:
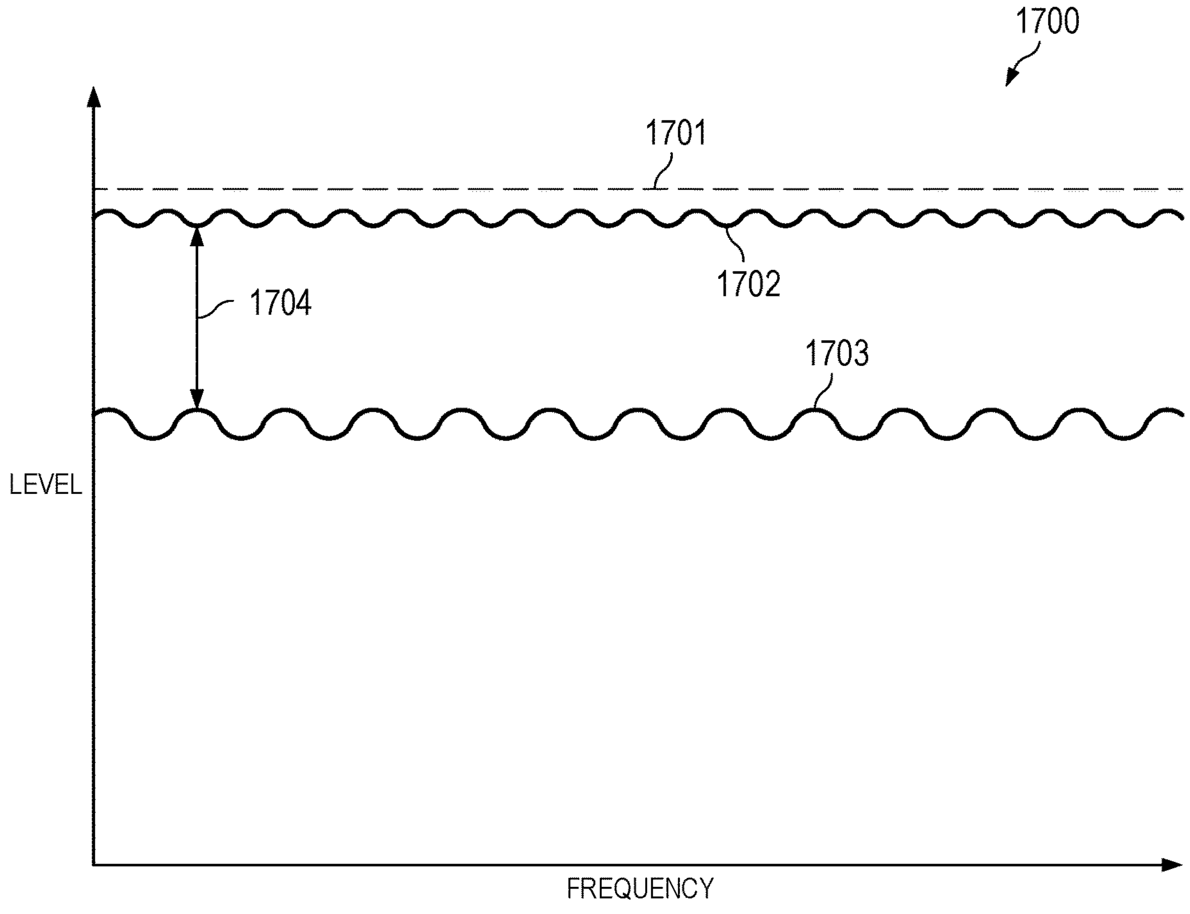
FIG. 17 shows an example of a graph corresponding to elements of a system that is limited by loudspeaker characteristics.

FIG. 17 shows an example of a graph corresponding to elements of a system that is limited by audio reproduction transducer characteristics. The elements shown on the graph 1700 are as follows:

The limit line 1701 represents an upper limit for an audio reproduction transducer before limiting occurs. The limit line 1701 may, for example, represent a limit that is determined by a loudspeaker model (e.g., a multiband limiter tuning). In this simple example, the limit line 1701 is the same for all frequencies indicated, but in other examples the limit line 1701 may have different levels corresponding to different frequencies.

According to this example, the curve 1702 represents the output sound pressure level (SPL) that an audio reproduction transducer (the audio reproduction transducer corresponding to the limit line 1701) is producing at a microphone. In this example, the curve 1703 represents a noise estimate at the microphone.

In this example, the difference value 1704 represents the difference between the noise estimate and the output sound pressure level, which may in some instances be a frequency-dependent difference. As difference value 1704 gets smaller, in some implementations one or more features will be progressively enabled, in order to increase the likelihood that the user can continue to understand and enjoy the content despite the environmental noise of the audio environment. According to some implementations, the features may be progressively turned on in a band by band basis.

The following paragraphs describe examples of how a control system may control various components of a system based, at least in part, on the difference value 1704.

Speech Enhancement

As the size of the difference value 1704 decreases, a control system may cause the amount of speech enhancement to increase. There are at least two forms of speech enhancement that can be controlled in this manner:

- Ducking-style speech enhancers, in which the gains of non-speech channels/audio objects are ducked (reduced in volume or level) as the size of the difference value 1704 decreases. In some such examples, a control system may cause the ducking gain to be inversely related to the difference of the difference value 1704 (e.g., in an inverse linear relationship).
- Enhancement speech enhancers, which emphasize (e.g., increase the level of) speech frequencies. In some such examples, as the size of the difference value 1704 decreases, a control system may cause more gain to be applied to the speech frequencies (e.g., in an inverse linear relationship). Some implementations may be configured to concurrently enable a ducking-style speech enhancer and an enhancement speech enhancer.

Audio Object Rendering

As the size of the difference value 1704 decreases, in some implementations a control system may cause the number of rendered audio objects to decrease. In some such examples, the audio objects may be chosen to be rendered or discarded based upon an audio object priority field within the object audio metadata. According to some implementations, audio objects of interest (e.g., audio objects corresponding to speech) may be rendered relatively closer to a listener and/or relatively further from a source of noise within the environment.

Upmixing

As the size of the difference value 1704 decreases, in some implementations a control system may cause a change in the total energy within the mix. For example, as the difference value 1704 decreases, a control system may cause the upmixing matrix to copy the same audio to all the audio channels, in order to make all of the audio channels act as one common mode. As the difference value 1704 decreases, the control system may cause the spatial fidelity to be preserved (e.g., no upmixing occurs). Some implementations may involve discarding diffuse audio. Some such examples may involve rendering non-diffuse content to all the audio channels.

Downmixing

As the size of the difference value 1704 decreases, in some implementations the control system may cause the less important channels to be discarded within the mix. According to some alternative implementations, the control system may cause the less important channels to be deemphasized, e.g., by applying a negative gain to the less important channels.

Virtual Bass

As the size of the difference value 1704 decreases within the bass bands, in some implementations the control system may cause a virtual bass algorithm that relies on the missing harmonic effect to be turned on and off, to try and overcome the loudness of the noise source.

Bass Distribution

In some bass spreading/distribution methods, the bass in all channels may be extracted by a lowpass filter, summed into one channel and then remixed as a common mode back into all the channels. According to some such methods, the non-bass frequencies may be passed through, using a high-pass filter. In some implementations, the control system may cause the cutoff frequency of the low pass/high pass combination to be increased as the size of the difference value 1704 decreases. As the size of the difference value 1704 increases, the control system may cause the cutoff frequency to approach zero and therefore no bass will be spread.

Virtualizer

As the size of the difference value 1704 decreases, in some examples the control system may cause the virtualization to be decreased until it is turned completely off. In some implementations, the control system may be configured for calculating the virtualized and not virtualized versions of the audio stream and cross fading between them, with the weighting of each component corresponding to the size of the difference value 1704.

Figure 18:
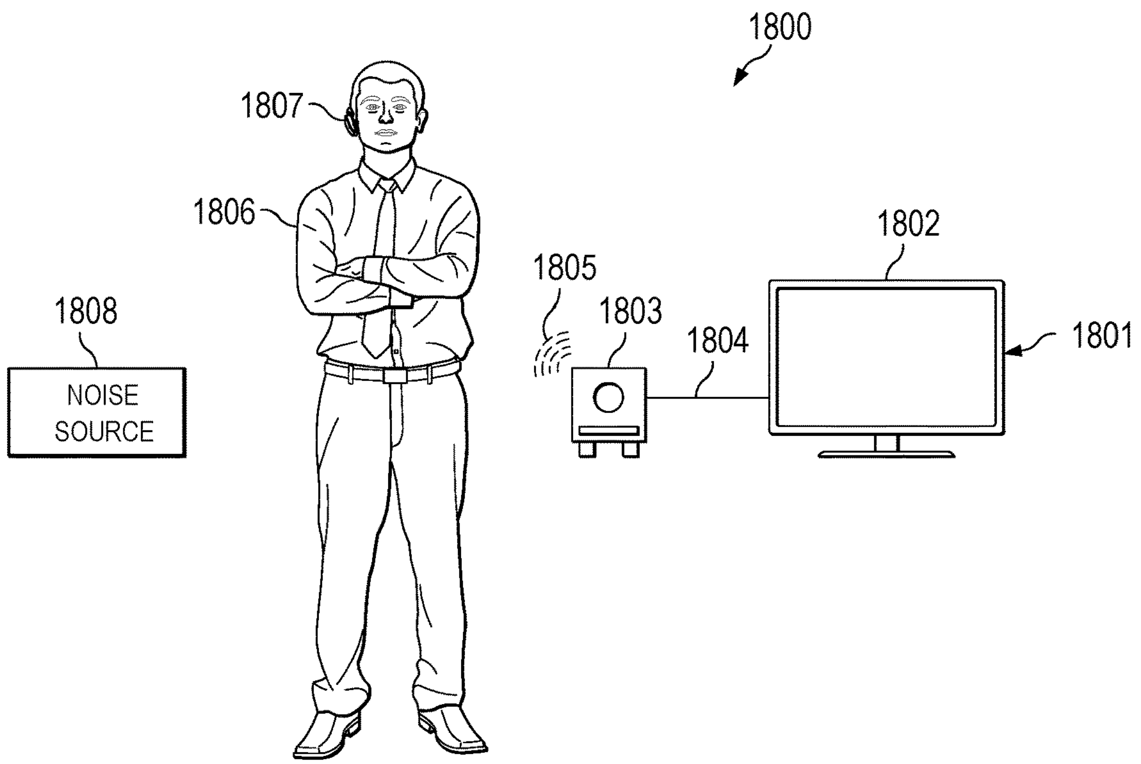
FIG. 18 shows an example of a system in which a hearing aid is configured for communication with a television.

FIG. 18 shows an example of a system in which a hearing aid is configured for communication with a television. In this example, the system 1800 includes the following elements:

- 1801: A television, which incorporates a noise compensation system;
- 1802: A microphone that measures the ambient noise;
- 1803: A wireless transmitter that is configured to convert digital or analog audio into a wireless stream that is accepted by the hearing aid 1807;
- 1804: A digital or analog audio stream. In some examples, the digital or analog audio stream may incorporate metadata to assist the hearing aid to change the mixing of the real world audio and the wireless stream, change the amount of speech enhancement or to apply some other noise compensation method;
- 1805: The wireless streamed audio;
- 1806: A hearing impaired user;
- 1807: The hearing aid. In this example, the hearing aid 1807 is configured for communication with the television 1801 via a wireless protocol, e.g., Bluetooth;
- 1808: A noise source.

As with other figures provided herein, the types and numbers of elements shown in FIG. 18 are merely provided by way of example. Other implementations may include more, fewer and/or different types and numbers of elements. For example, in some alternative implementations, a personal sound amplification product, a cochlear implant or other hearing assistance device, or a headset may be configured for communication with the television 1801 and also may be configured to perform some or all of the operations disclosed herein with reference to the hearing aid 1807.

According to this example, the audio 1805 from the television 1801 is sent via the wireless protocol. The hearing aid 1807 is configured to mix the wireless audio with the ambient noise in the room to ensure the user can listen to the television audio while still being able to interact with the real world. The television 1801 incorporates a noise compensation system, which may be one of the types of noise compensation systems disclosed herein. In this instance, a noise source 1808 is present within the audio environment. The noise compensation system incorporated into the television 1801 is configured to measure the environmental noise and to transmit information and/or control signals to the hearing aid 1807 indicating the amount of mixing that is required. For example, in some implementations, the higher the environmental noise level the more the television audio signal is mixed with the signals from the hearing aid microphones. In some alternative implementations, the hearing aid 1807 may incorporate some or all of the noise estimation system. In some such implementations, the hearing aid 1807 may be configured to implement a volume control within the hearing aid. In some such implementations, the hearing aid 1807 may be configured to adjust the volume of the television.

Figure 19:
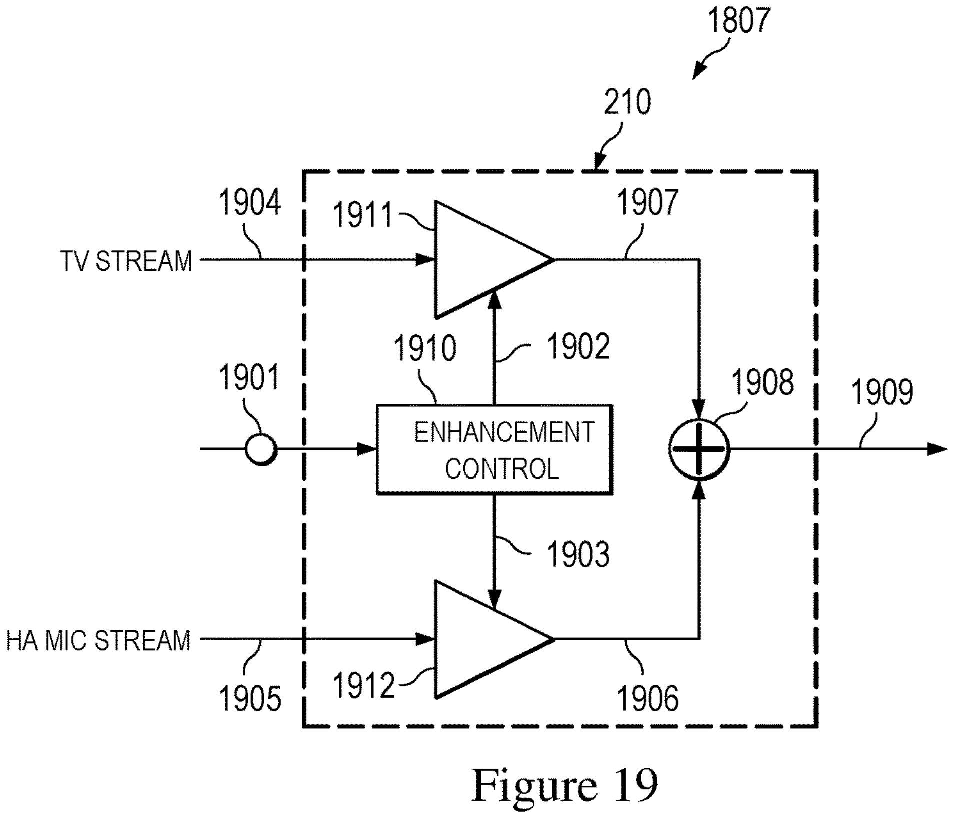
FIG. 19 shows examples of mixing and speech enhancement components of a hearing aid.

FIG. 19 shows examples of mixing and speech enhancement components of a hearing aid. In this example, the hearing aid 1807 includes the following elements:

- 1901: A noise estimate of the audio environment. In this example, the noise estimate is provided by a noise compensation system of a television. In alternative implementations, the noise estimate is provided by a noise compensation system of another device, e.g., the hearing aid 1807;
- 1902: A gain setting for the television audio stream;
- 1903: A gain setting for the hearing aid microphone stream;
- 1904: The audio in the television stream;
- 1905: The audio in the hearing aid stream, which is provided by one or more hearing aid microphones in this example;
- 1906: Gain-adjusted audio (may be frequency-dependent gain in the case of a speech enhancer) in the hearing aid audio stream before being summed;
- 1907: Gain-adjusted audio (may be frequency-dependent gain in the case of a speech enhancer) in the television audio stream before being summed;
- 1908: A summation block that creates a mixed audio stream;
- 1909: The mixed audio stream that is to be played out to the hearing aid's speaker (or, in other examples, via cochlear implant electrodes);
- 1910: An enhancement control module, which is configured to adjust the gains (which may in some instances be frequency-dependent gains) based upon the noise estimate 1901 sent by the television. In some implementations, the enhancement control module may be configured to keep the volume level the same, or within a range of volume levels, and change the proportions of the hearing aid microphone and the television audio stream based upon the noise estimate 1901, e.g., by making the sum of the gains equal to a predetermined value, such as one;
- 1911: A gain application block for the television stream. The gain may, for example, be a broadband gain some implementations (e.g., in the case of a simple mixer). In some alternative implementations, (e.g., in the case of a speech enhancement module) the gains may be a set of frequency-dependent gains for each level of speech enhancement. In some such implementations, the control system 210 may be configured to access the set of frequency-dependent gains from a stored data structure, e.g., a lookup table;

1912: A gain application block for the television stream. The gain may, for example, be a broadband gain some implementations (e.g., in the case of a simple mixer). In some alternative implementations, (e.g., in the case of a speech enhancement module) the gains may be a set of frequency-dependent gains for each level of speech enhancement. In some such implementations, the control system 210 may be configured to access the set of frequency-dependent gains from a stored data structure, e.g., a lookup table.

As with other figures provided herein, the types and numbers of elements shown in FIG. 19 are merely provided by way of example. Other implementations may include more, fewer and/or different types and numbers of elements. For example, in some alternative implementations, the noise estimate may be calculated in the hearing aid 1807, e.g., based upon an echo reference sent by the television to the hearing aid 1807. Some alternative examples may involve a personal sound amplification product, a cochlear implant, a headset or a partner microphone device, such as a partner microphone device having directional microphone and configured to allow the user to focus on a conversation with their partner. Some such partner microphone devices also may be configured to transmit the sound of multimedia devices, e.g., audio corresponding to video data to be reproduced via a television.

Figure 20:
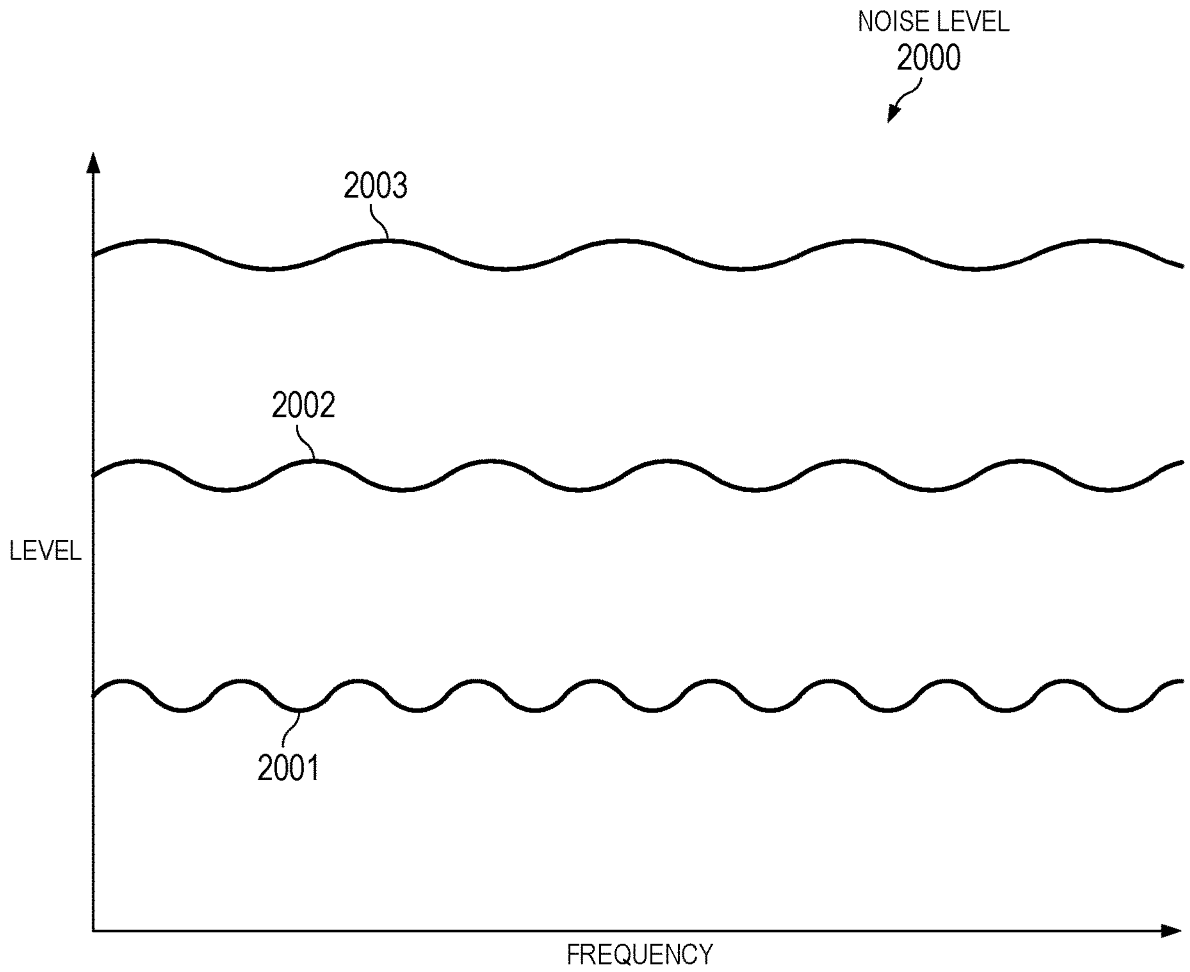
FIG. 20 is a graph that shows examples of environmental noise levels.

FIG. 20 is a graph that shows examples of environmental noise levels. In this example, the graph 2000 shows examples of environmental noise levels that may be used as input to the hearing aid 1807 of FIGS. 18 and 19.

In this example, the curve 2001 represents a low environmental noise level estimate. According to some implementations, at this level the control system 210 may cause the amount of mixing that occurs to be dominated by audio from the outside world, e.g., audio signals from one or more hearing aid microphones, with the television audio level being relatively low. Such implementations may be configured to increase the likelihood that a hearing impaired user will be able to converse with other people in quiet environments.

According to this example, the curve 2002 represents a medium environmental noise level estimate. According to some implementations, at this level the control system 210 may cause the amount of television audio within the mix to be relatively more than the scenario discussed with reference to the curve 2001. In some examples, at this level the control system 210 may cause the amount of television audio within the mix to be the same as, or approximately the same as, the level of the audio signals from the one or more hearing aid microphones.

In this example, the curve 2003 represents a high environmental noise level estimate. According to some implementations, at this level the control system 210 may cause the amount of television audio within the mix to be maximized. In some implementations, there may be an upper limit (e.g., a user-settable upper limit) to the proportion of the television audio in the mix. Such implementations may increase the likelihood that the hearing aid still allows high level acoustic signals of hearing aid microphone feed (such as shouting) to be detected by the user, in order to enhance user safety.

Some disclosed implementations may involve the operation of what will be referred to herein as an "encoder." Although an encoder may be illustrated by a single block, an encoder may be implemented via one or more devices. In some implementations, an encoder may be implemented by one or more devices of a cloud-based service, such as one or more servers, data storage devices, etc., of a data center. In some examples, the encoder may be configured to determine a compensation process to be performed in response to a noise metric and/or a speech intelligibility metric. In some implementations, the encoder may be configured to determine the speech intelligibility metric. Some such implementations may involve interactions between an encoder and a downstream "decoder," e.g., wherein the decoder provides an environmental noise metric to the encoder. Implementations in which the encoder performs at least some of the disclosed methods (e.g., determining the compensation process, or determining a plurality of selectable compensation processes) may be potentially advantageous because the encoder will generally have substantially more processing capabilities than the decoder.

Figure 21:
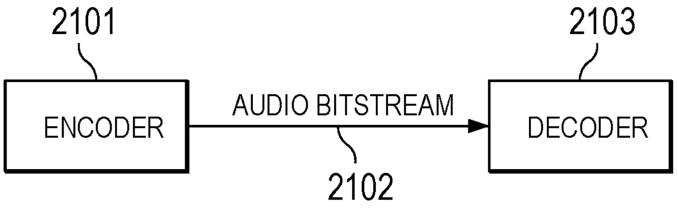
FIG. 21 shows examples of encoder and decoder blocks according to one implementation.

FIG. 21 shows examples of encoder and decoder blocks according to one implementation. In this example, an encoder 2101 is shown transmitting an encoded audio bitstream 2102 to a decoder 2103. In some such examples, the encoder 2101 may be configured for transmitting encoded audio bitstreams to a plurality of decoders.

According to some implementations, the encoder 2101 and the decoder 2103 may be implemented by separate instances of the control system 210, whereas in other examples the encoder 2101 and the decoder 2103 may be considered as portions of a single instance of the control system 210, e.g., as components of a single system. Although the encoder 2101 and the decoder 2103 are shown as single blocks in FIG. 21, in some implementations the encoder 2101 and/or the decoder 2103 may include more than one component, such as modules and/or sub-modules that are configured to perform various tasks.

In some implementations, the decoder 2103 may be implemented via one or more devices of an audio environment, such as a home audio environment. Some tasks that the decoder 2103 may perform are described in the paragraphs above with reference to FIGS. 2-20. In some such examples, the decoder 2103 may be implemented via a television of an audio environment, via a television control module of an audio environment, etc. However, in some examples at least some of the functionality of the decoder 2103 may be implemented via one or more other devices of an audio environment, such as by a hearing aid, a personal sound amplification product, a cochlear implant, a headset, a laptop, a mobile device, a smart speaker, a smart home hub that is configured for communication with the decoder 2103 (e.g., via the Internet) and a television of the audio environment, etc.

Some tasks that the encoder 2101 may perform are described in the following paragraphs. In some implementations, the encoder 2101 may be implemented via one or more devices of a cloud-based service, such as one or more servers, data storage devices, etc., of a data center. In the example shown in FIG. 21, the encoder 2101 has received or obtained an audio bitstream, has encoded the received audio bitstream and is in the process of transmitting the encoded audio bitstream 2102 to the decoder 2103. In some such examples, the encoded audio bitstream 2102 may be part of an encoded content stream that includes encoded video data, e.g., corresponding to a television program, a movie, a musical performance, etc. The encoded audio bitstream 2102 may correspond to the encoded video data. For example, the encoded audio bitstream 2102 may include speech (e.g., dialogue) corresponding to the encoded video data. In some implementations, the encoded audio bitstream 2102 may include music and audio effects (M&E) corresponding to the encoded video data.

In some disclosed implementations, the encoder 2101 may be configured for determining a noise metric and/or a speech intelligibility metric. In some examples, the encoder 2101 may be configured for determining a compensation process to be performed in response to the noise metric and/or the speech intelligibility metric, e.g., as disclosed elsewhere herein. In some implementations, the encoder 2101 may be configured to determine a compensation process for one or more types of ambient noise profiles. Each of the ambient noise profiles may, in some examples, correspond to a category of ambient noise, such as traffic noise, train noise, rain, etc. In some such examples, the encoder 2101 may be configured for determining a plurality of compensation processes for each category of ambient noise. Each compensation process of the plurality of compensation processes may, for example, correspond to a different level of ambient noise. For example, one compensation process may correspond to a low level of ambient noise, another compensation process may correspond to a medium level of ambient noise and another compensation process may correspond to a high level of ambient noise. According to some such examples, the encoder 2101 may be configured for determining compensation metadata corresponding to the compensation process and for providing the compensation metadata to the decoder 2103. In some such implementations, the encoder 2101 may be configured for determining compensation metadata corresponding to each compensation process of a plurality of compensation processes. In some such examples, the decoder 2103 (or another downstream device) may be configured to determine a category and/or a level of ambient noise in an audio environment and to select a corresponding compensation process according to compensation metadata received from the encoder 2101. Alternatively, or additionally, the decoder 2103 may be configured to determine an audio environment location and to select a corresponding compensation process according to compensation metadata received from the encoder 2101. In some examples, the encoder 2101 may be configured for determining speech metadata that allows the speech data to be extracted from the audio data and for providing the speech metadata to the decoder 2103.

However, in the example shown in FIG. 21, the encoder 2101 does not provide speech metadata or compensation metadata to the decoder 2103 or to other downstream devices. The example shown in FIG. 21 may sometimes be referred to herein as "single-ended post-processing" or "use case 1."

Figure 22:
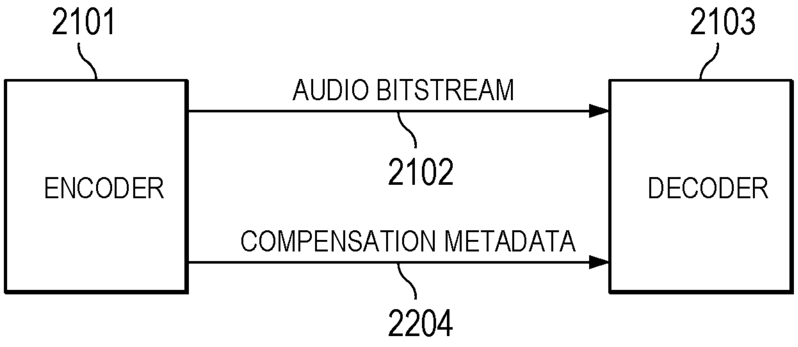
FIG. 22 shows examples of encoder and decoder blocks according to another implementation.

FIG. 22 shows examples of encoder and decoder blocks according to another implementation. In the example shown in FIG. 22, the encoder 2101 provides compensation metadata 2204 to the decoder 2103. The example shown in FIG. 22 may sometimes be referred to herein as "dual-ended post-processing" or "use case 2."

In some examples, the compensation metadata 2204 may correspond to a process for altering a processing of the audio data, e.g., as described above. According to some such examples, altering the processing of the audio data may involve applying one or more speech enhancement methods, such as reducing a gain of non-speech audio or increasing a gain of speech frequencies. In some such examples, altering the processing of the audio data does not involve applying a broadband gain increase to the audio signals. Alternatively, or additionally, the compensation metadata 2204 may correspond to a process for applying a non-audio-based compensation method, such as a closed captioning system, a surtitling system or a subtitling system.

Figure 23:
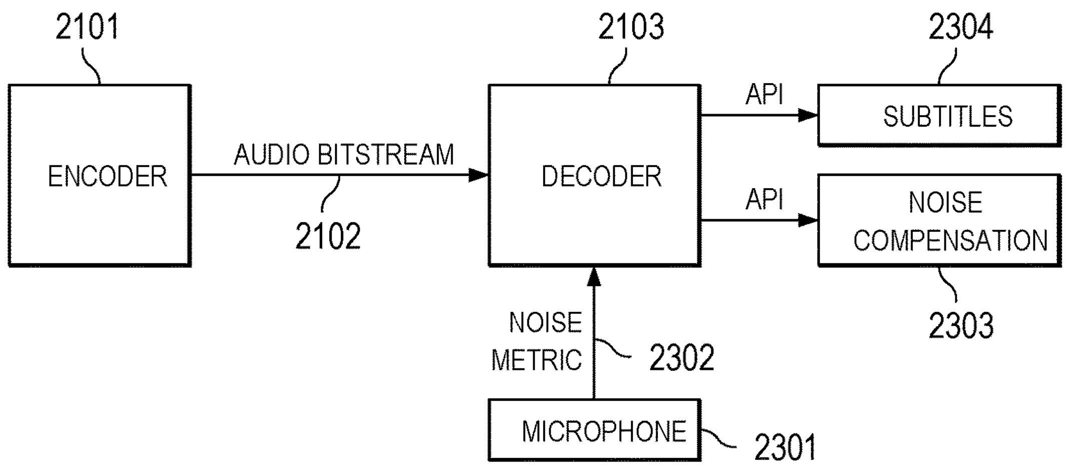
FIG. 23 shows some examples of decoder-side operations that may be performed responsive to receiving the encoded audio bitstream shown in FIG. 21.

FIG. 23 shows some examples of decoder-side operations that may be performed responsive to receiving the encoded audio bitstream shown in FIG. 21. In this example, the single-ended post-processing-noise compensation (use case 1) is enhanced by local noise determination and compensation. The example shown in FIG. 23 may sometimes be referred to herein as "single-ended post-processing-noise compensation" or "use case 3."

In this example, the audio environment in which the decoder 2103 is located includes one or more microphones 2301 configured to detect environmental noise. According to this example, either the decoder 2103 or the microphone(s) 2301 are configured to calculate a noise metric 2302 based on the environmental noise measurements by the microphone(s) 2301. In this implementation, the decoder 2103 is configured to use the noise metric 2302 to determine and apply appropriate noise compensation 2303 for local playback. If the noise compensation is not sufficient (in this example, as determined according to the noise metric 2302), the decoder 2103 is configured to enable a non-audio-based compensation method. In the example shown in FIG. 23, the non-audio-based compensation method involves enabling a closed captioning system, a surtitling system or a subtitling system, which is represented by the "subtitles" block 2304.

Figure 24:
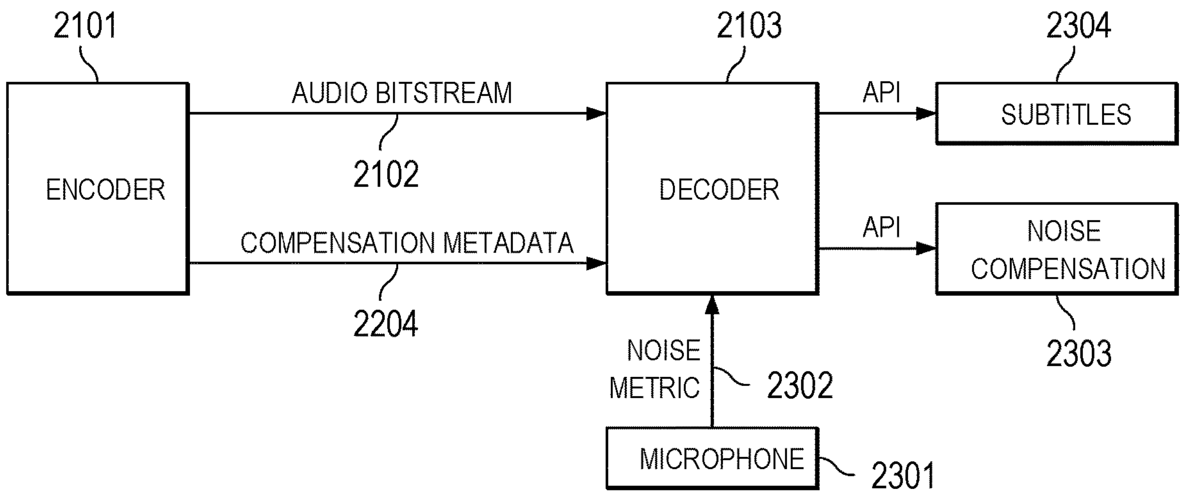
FIG. 24 shows some examples of decoder-side operations that may be performed responsive to receiving the encoded audio bitstream shown in FIG. 22.

FIG. 24 shows some examples of decoder-side operations that may be performed responsive to receiving the encoded audio bitstream shown in FIG. 22. In this example, the dual-ended post-processing-noise compensation (use case 2) is enhanced by local noise determination and compensation. The example shown in FIG. 24 may sometimes be referred to herein as "use case 4."

In this example, the audio environment in which the decoder 2103 is located includes one or more microphones 2301 configured to detect environmental noise. According to this example, either the decoder 2103 or the microphone(s) 2301 are configured to calculate a noise metric 2302 based on the environmental noise measurements by the microphone(s) 2301.

According to some examples, the compensation metadata 2204 may include a plurality of selectable options. At least some of the selectable options may, in some examples, correspond to a noise metric or to a range of noise metrics. In some implementations, the decoder 2103 may be configured to use the noise metric 2302 to automatically select the appropriate compensation metadata 2204 received from the encoder 2101. Based on this automatic selection, in some examples the decoder 2103 may be configured to determine and apply appropriate audio-based noise compensation 2303 for local playback.

If the noise compensation 2303 is not sufficient (in this example, as determined according to the noise metric 2302), the decoder 2103 is configured to enable a non-audio-based compensation method. In the example shown in FIG. 24, the non-audio-based compensation method involves enabling a closed captioning system, a surtitling system or a subtitling system, which is represented by the "subtitles" block 2304.

Figure 25:
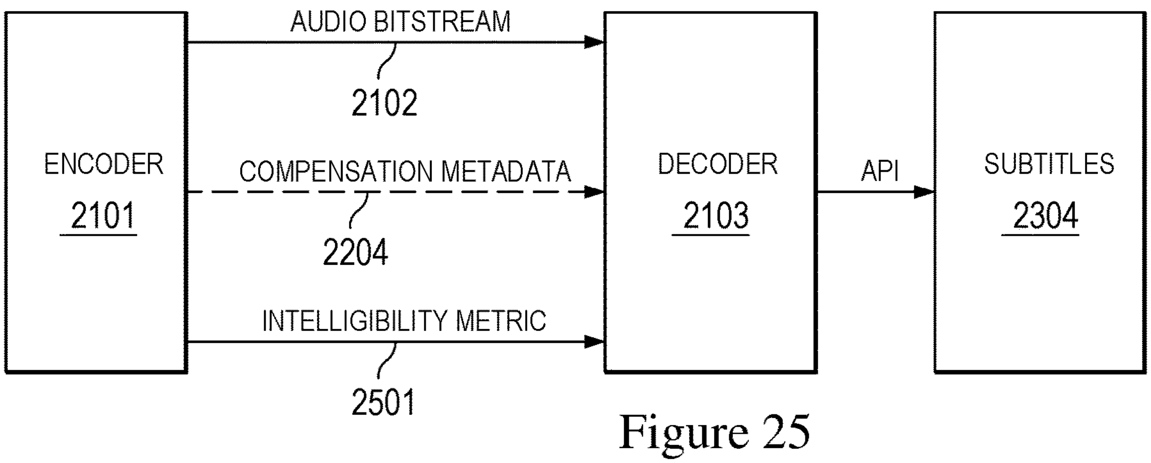
FIG. 25 shows examples of encoder and decoder blocks according to another implementation.

FIG. 25 shows examples of encoder and decoder blocks according to another implementation. In the example shown in FIG. 25, the encoder 2101 is configured to determine intelligibility metrics 2501 based on analysis of the speech in the audio bitstream. In this example, the encoder 2101 is configured to provide the intelligibility metrics 2501 to the decoder 2103. The example shown in FIG. 25 may sometimes be referred to herein as "dual-ended post-processing-intelligibility metric" or "use case 5."

In the example shown in FIG. 25, the decoder 2103 is configured to determine, based at least in part on one or more intelligibility metrics 2501 received from the encoder 2101, whether a user in the local audio environment is likely to understand the speech in the audio bitstream. If the decoder 2103 concludes that the user is unlikely to understand the speech (e.g., if the decoder 2103 determines that an intelligibility metric 2501 is below a threshold) the decoder 2103 is configured to enable a non-audio-based compensation method, which is represented by the "subtitles" block 2304.

Figure 26:
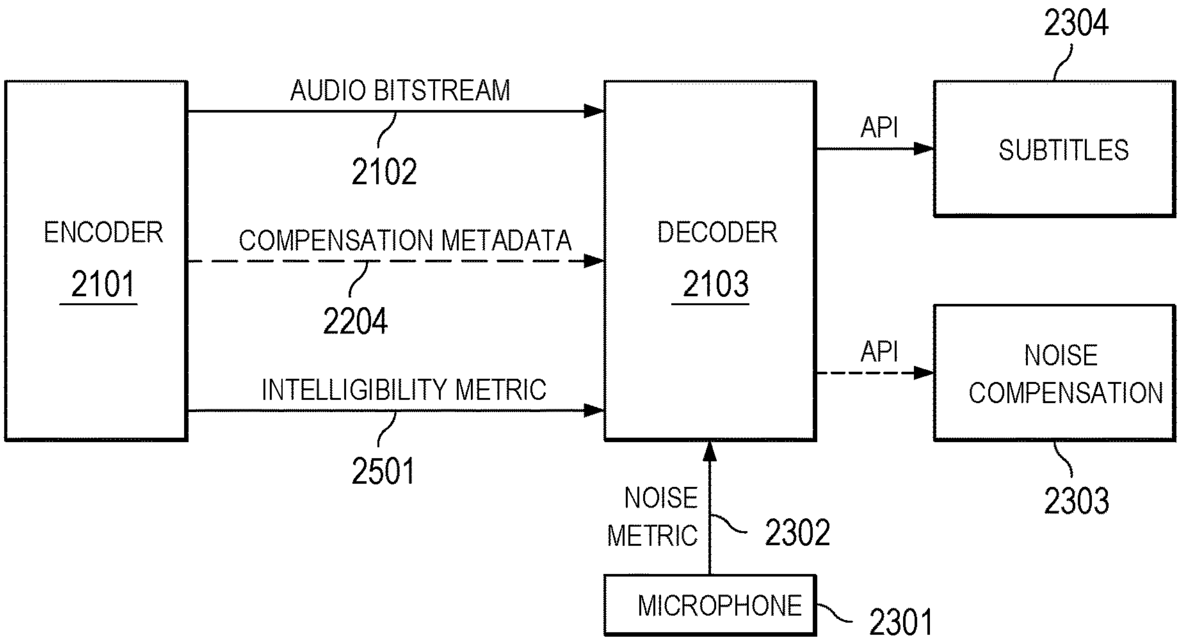
FIG. 26 shows examples of encoder and decoder blocks according to another implementation.

FIG. 26 shows examples of encoder and decoder blocks according to another implementation. In the example shown in FIG. 26, like that of FIG. 25, the encoder 2101 is configured to determine intelligibility metrics 2501 based on analysis of the speech in the audio bitstream. In this example, the encoder 2101 is configured to provide the intelligibility metrics 2501 to the decoder 2103. However, in this example either the decoder 2103 or the microphone(s) 2301 are configured to calculate a noise metric 2302 based on the environmental noise measurements by the microphone(s) 2301. The example shown in FIG. 26 may sometimes be referred to herein as "dual-ended post-processing-noise compensation and intelligibility metric" or "use case 6."

In this implementation, the decoder 2103 is configured to use the noise metric 2302 to automatically select the appropriate compensation metadata 2204 received from the encoder 2101. Based on this automatic selection, in this example the decoder 2103 is configured to determine and apply appropriate noise compensation 2303 for local playback.

In the example shown in FIG. 26, the decoder 2103 is also configured to determine, based at least in part on the intelligibility metrics 2501 received from the encoder 2101 and the noise metric 2302, whether a user in the local audio environment is likely to understand the speech in the audio bitstream after the appropriate noise compensation 2303 has been applied. If the decoder 2103 concludes that the user is unlikely to understand the speech (e.g., if the decoder 2103 determines that an intelligibility metric 2501 is below a threshold corresponding with a particular noise metric 2302, e.g., by querying a data structure of intelligibility metrics and corresponding noise metrics and thresholds) the decoder 2103 is configured to enable a non-audio-based compensation method, which is represented by the "subtitles" block 2304.

Figure 27:
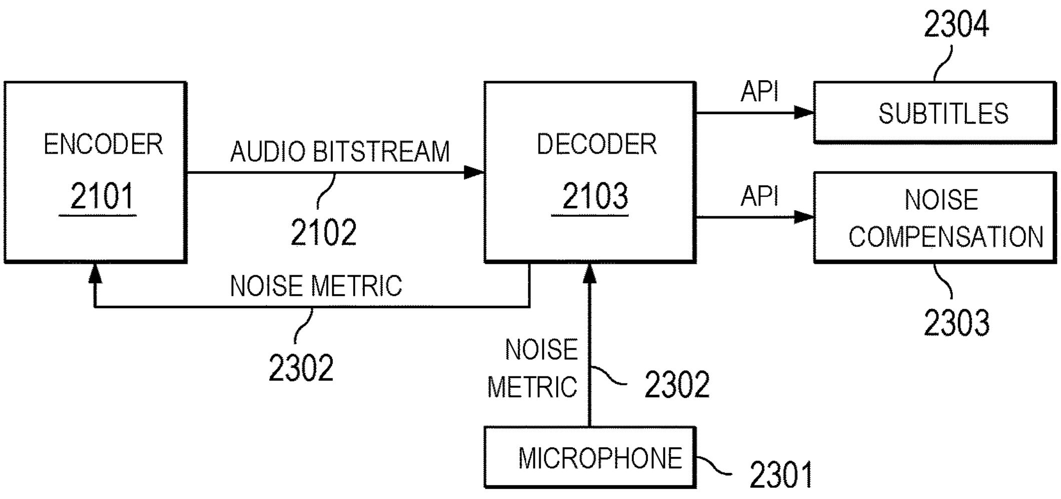
FIG. 27 shows some alternative examples of decoder-side operations that may be performed responsive to receiving the encoded audio bitstream shown in FIG. 21.

FIG. 27 shows some alternative examples of decoder-side operations that may be performed responsive to receiving the encoded audio bitstream shown in FIG. 21. In this example, noise compensation "use case 3" that is described above with reference to FIG. 23 is further enhanced by a feedback loop. The example shown in FIG. 27 may sometimes be referred to herein as "feedback-noise compensation" or "use case 7."

In this example, the audio environment in which the decoder 2103 is located includes one or more microphones 2301 configured to detect environmental noise. According to this example, either the decoder 2103 or the microphone(s) 2301 are configured to calculate a noise metric 2302 based on the environmental noise measurements by the microphone(s) 2301. In this example, the noise metric 2302 is provided to the encoder 2101.

According to this implementation, the encoder 2101 is configured for determining, based at least in part on the noise metric 2302, whether to reduce a complexity level of the encoded audio data 2102 that is transmitted to the decoder 2103. In some examples, if the noise metric 2302 indicates that there is a high level of noise in the audio environment of the decoder 2103, the encoder 2101 may be configured for determining that a less complex version of the encoded audio data 2102 will be transmitted to the decoder 2103. In some such examples, if the noise metric 2302 indicates that there is a high level of noise in the audio environment of the decoder 2103, the encoder 2101 may be configured for transmitting a lower quality, lower data-rate audio bitstream that is more appropriate for playback in a noisy environment.

According to some implementations, the encoder 2101 may have access to a plurality of audio versions, e.g., ranging from a lowest-quality audio version to a highest-quality audio version. In some such examples, the encoder 2101 may have previously encoded the plurality of audio versions. According to some such examples, the encoder 2101 may be configured for receiving a content stream that includes received video data and received audio data corresponding to the video data. In some such examples, the encoder 2101 may be configured for preparing a plurality of encoded audio versions that correspond to the received audio data, ranging from a lowest-quality encoded audio version to a highest-quality encoded audio version.

In some examples, determining, based at least in part on the noise metric 2302, whether to reduce the complexity level of the encoded audio data 2102 may involve determining which encoded audio version to transmit to the decoder 2103.

In some examples, the received audio data may include audio objects. According to some such examples, the highest-quality encoded audio version may include all of the audio objects of the received audio data. In some such examples, lower-quality encoded audio versions may include fewer than all of the audio objects of the received audio data. According to some implementations, lower-quality encoded audio versions may include lossy compressed audio that includes fewer bits than the received audio data and which may be transmitted at a lower bitrate than that of the received audio data. In some instances, the received audio data may include audio object priority metadata indicating audio object priority. In some such examples, the encoder 2101 may be configured for determining which audio objects will be in each of the encoded audio versions based, at least in part, on the audio object priority metadata.

In this implementation, the decoder 2103 is configured to use the noise metric 2302 to determine and apply appropriate noise compensation 2303 for local playback. If the noise compensation is not sufficient (in this example, as determined according to the noise metric 2302), the decoder 2103 is configured to enable a non-audio-based compensation method. In the example shown in FIG. 27, the non-audio-based compensation method involves enabling a closed captioning system, a surtitling system or a subtitling system, which is represented by the "subtitles" block 2304. Audio-based and/or non-audio-based noise compensation may be necessary if the decoder 2103 has received a relatively low-quality audio bitstream. The low-quality audio bitstream may, in some examples, have been previously sent based on feedback from the decoder side regarding noise in the user's audio environment, information regarding the audio capability of the user's system, etc.

Figure 28:
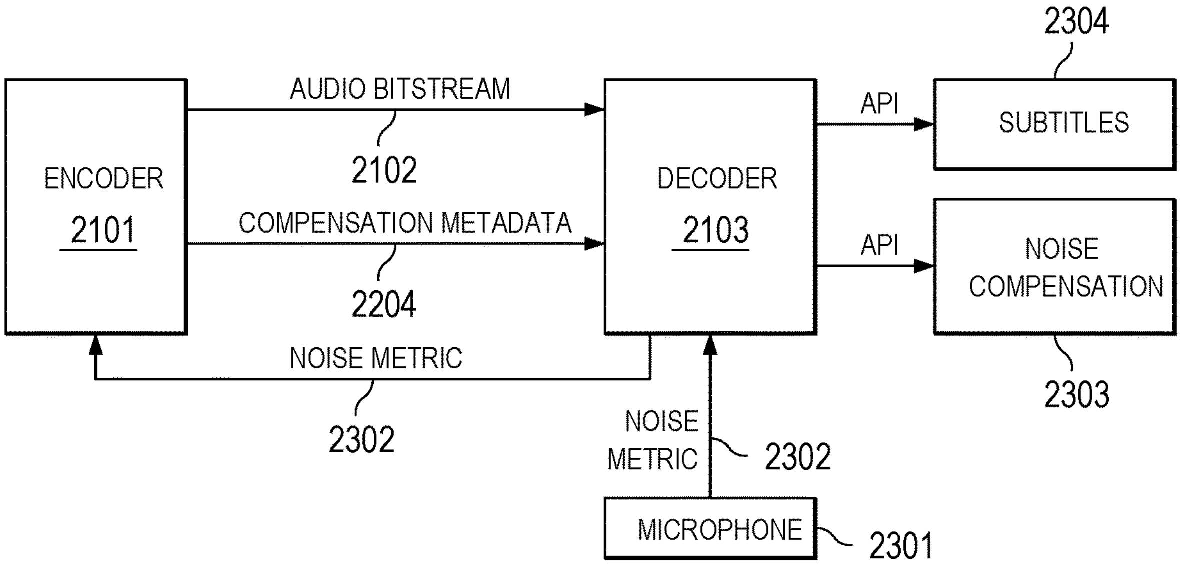
FIG. 28 shows an enhanced version of the systems shown in FIGS. 24 and 27.

FIG. 28 shows an enhanced version of the systems shown in FIGS. 24 and 27. The example shown in FIG. 28 may sometimes be referred to herein as "feedback-dual-ended post processing" or "use case 8." According to this implementation, the encoder 2101 is configured to provide encoded audio data 2102 to the decoder 2103 that is responsive to the noise metric 2302 received from the decoder 2103. In some examples, the encoder 2101 may be configured to select and provide the encoded audio data 2102 as described above with reference to FIG. 27.

In this example, the encoder 2101 is also configured to provide compensation metadata 2204 to the decoder 2103 that is responsive to the noise metric 2302 received from the decoder 2103. In some such examples, the decoder 2103 may be configured to simply apply an audio or non-audio compensation method that corresponds with be compensation metadata 2204 received from the encoder 2101.

According to some alternative examples, the encoder 2101 may be configured to provide compensation metadata 2204 that corresponds to various selectable compensation options, e.g., as described above with reference to FIG. 24. However, in some such implementations, the encoder 2101 may be configured to select all of the compensation options and the corresponding compensation metadata 2204 based, at least in part, on the noise metric 2302 received from the decoder 2103. In some implementations, previously-transmitted compensation metadata 2204 may be adjusted or re-calculated based, at least in part, on the noise metric 2302 received from the decoder 2103. In some such implementations, the decoder 2103 may be configured to use the noise metric 2302 to automatically select the appropriate compensation metadata 2204 received from the encoder 2101. Based on this automatic selection, in this example the decoder 2103 may be configured to determine and apply appropriate noise compensation 2303 for local playback. If the noise compensation 2303 is not sufficient (in this example, as determined according to the noise metric 2302), the decoder 2103 is configured to enable a non-audio-based compensation method. In the example shown in FIG. 24, the non-audio-based compensation method involves enabling a closed captioning system, a surtitling system or a subtitling system, which is represented by the "subtitles" block 2304. According to some examples, the encoder 2101 may be configured to modify the closed captions, surtitles or subtitles based, at least in part, on the noise metric 2302 received from the decoder 2103. For example, the encoder 2101 may be configured to simplify the text if the noise metric 2302 indicates an environmental noise level that is at or above a threshold level.

Figure 29:
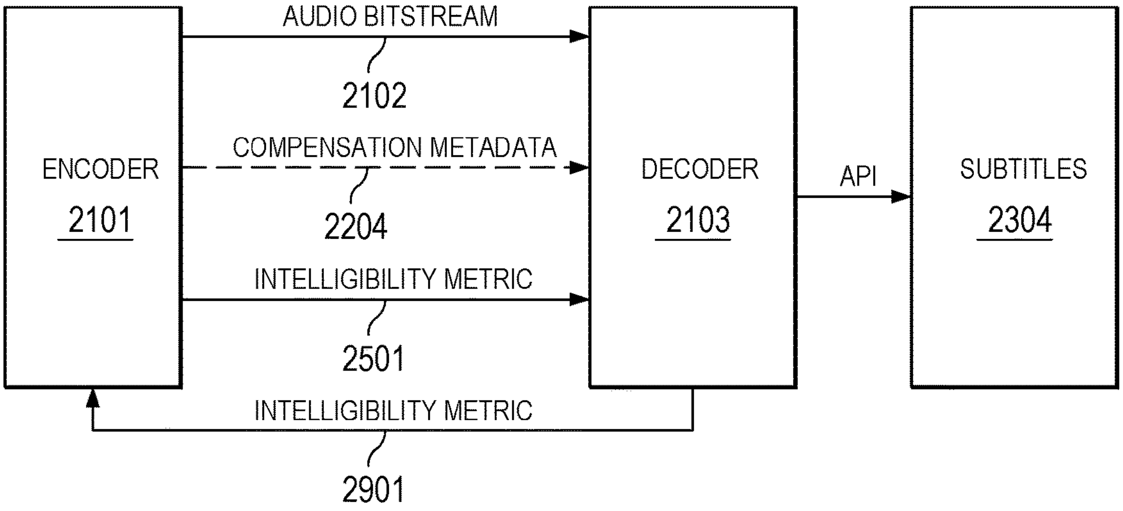
FIG. 29 shows examples of encoder and decoder blocks according to another implementation.

FIG. 29 shows examples of encoder and decoder blocks according to another implementation. FIG. 29 shows an enhanced version of the example that is described above with reference to FIG. 25. As in the example of FIG. 25, the encoder 2101 is configured to determine speech intelligibility metrics 2501 based on analysis of the speech in the audio bitstream. In this example, the encoder 2101 is configured to provide the speech intelligibility metric(s) 2501 and compensation metadata 2204 to the decoder 2103.

However, in the example shown in FIG. 29, the decoder 2103 is also configured to determine speech intelligibility metric(s) 2901 and to provide the speech intelligibility metric(s) 2901 to the encoder 2101. The example shown in FIG. 29 may sometimes be referred to herein as "feedback-intelligibility metric" or "use case 9."

According to some examples, the speech intelligibility metric(s) 2901 may be based, at least in part, on one or more user characteristics corresponding to a viewer and/or listener in the audio environment in which the decoder 2103 resides. The one or more user characteristics may, for example, include the user's native language, the user's accent, the user's position in the environment, the user's age, and/or at least one of the user's capabilities. The user's capabilities may, for example, include the user's hearing ability, the user's language proficiency, the user's accent comprehension proficiency, the user's eyesight and/or the user's reading comprehension.

In some implementations, the encoder 2101 may be configured to select compensation metadata and/or a quality level of the encoded audio data 2102 based, at least in part, on the speech intelligibility metric(s) 2901. In some such examples, if the speech intelligibility metric(s) 2901 were to indicate that the user has a high level of language proficiency but a very slightly diminished hearing ability, the encoder 2101 may be configured to choose and send a high-quality speech channel/object to increase the intelligibility for local playback. According to some examples, if the speech intelligibility metric(s) 2901 were to indicate that the user has a low level of language proficiency and/or accent comprehension, the encoder 2101 may be configured to send compensation metadata 2204 to the decoder 2103 that corresponds with a the non-audio-based compensation method, e.g., a method that involves controlling a closed captioning system, a surtitling system or a subtitling system. According to some examples, the encoder 2101 may be configured to modify the closed captions, surtitles or subtitles based, at least in part, on the noise metric 2302 and/or the intelligibility metric 2901 received from the decoder 2103. For example, the encoder 2101 may be configured to simplify the text if the noise metric 2302 indicates an environmental noise level that is at or above a threshold level and/or if the intelligibility metric 2901 (or an updated intelligibility metric 2501) is below a threshold level.

In the example shown in FIG. 29, the decoder 2103 is configured to determine, based at least in part on the speech intelligibility metric(s) 2901 and/or the intelligibility metrics 2501 received from the encoder 2101, whether a user in the local audio environment is likely to understand the speech in the audio bitstream. If the decoder 2103 concludes that the user is unlikely to understand the speech (e.g., if the decoder 2103 determines that an intelligibility metric 2501 is below a threshold) the decoder 2103 is configured to enable a non-audio-based compensation method, which is represented by the "subtitles" block 2304. In some implementations, if the speech intelligibility metric(s) 2901 were to indicate that the user has a low level of language proficiency and/or accent comprehension, the encoder 2101 may be configured to send an encoded video stream with closed captions, surtitles or subtitles already included in the video stream.

Figure 30:
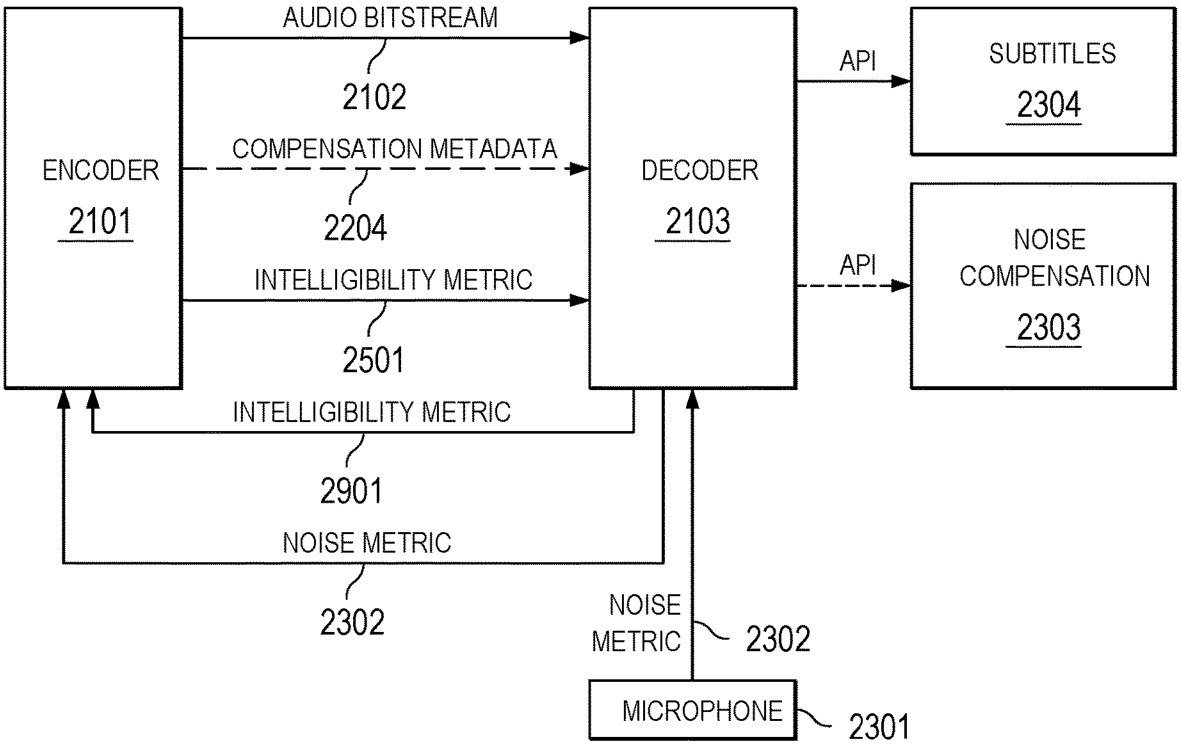
FIG. 30 shows examples of encoder and decoder blocks according to another implementation.

FIG. 30 shows examples of encoder and decoder blocks according to another implementation. FIG. 30 shows an enhanced version of the examples that are described above with reference to FIGS. 28 and 29. As in the example of FIG. 29, the encoder 2101 is configured to determine speech intelligibility metrics 2501 based on analysis of the speech in the audio bitstream. In this example, the encoder 2101 is configured to provide the speech intelligibility metric(s) 2501 and compensation metadata 2204 to the decoder 2103. As in the example shown in FIG. 29, the decoder 2103 is also configured to determine speech intelligibility metric(s) 2901 and to provide the speech intelligibility metric(s) 2901 to the encoder 2101. Moreover, as in the example shown in FIG. 28, the decoder 2103 is also configured to determine a noise metric 2302 and to transmit the noise metric 2302 to the encoder 2101. The example shown in FIG. 30 may sometimes be referred to herein as "dual-ended post-processing-compensation and intelligibility metric" or "use case 10."

According to some examples, the speech intelligibility metric(s) 2901 may be determined as described above with reference to FIG. 29. In some implementations, the encoder 2101 may be configured to select compensation metadata and/or a quality level of the encoded audio data 2102 based, at least in part, on the speech intelligibility metric(s) 2901, e.g., as described above with reference to FIG. 29. According to some examples, the encoder 2101 may be configured to select compensation metadata and/or a quality level of the encoded audio data 2102 based, at least in part, on the noise metric 2302.

In some such examples, the decoder 2103 may be configured to simply apply an audio or non-audio compensation method that corresponds with be compensation metadata 2204 received from the encoder 2101. According to some alternative examples, the encoder 2101 may be configured to provide compensation metadata 2204 that corresponds to various selectable compensation options, e.g., as described above with reference to FIG. 24.

In some implementations, if the decoder 2103 determines that a user is unlikely to understand the speech in the encoded audio signal 2102, the decoder 2103 may be configured to provide feedback to the encoder 2101. In some such examples, the decoder 2103 may be configured to request higher-quality audio from the encoder 2101. In alternative examples, the decoder 2103 may be configured to send a request the encoder 2101 to transmit an encoded video stream with closed captions, surtitles or subtitles already included in the video stream. In some such examples, the encoder 2101 may transmit a lower-quality version of the encoded audio data 2101 if closed captions, surtitles or subtitles are included in a corresponding video stream.

Figure 31:
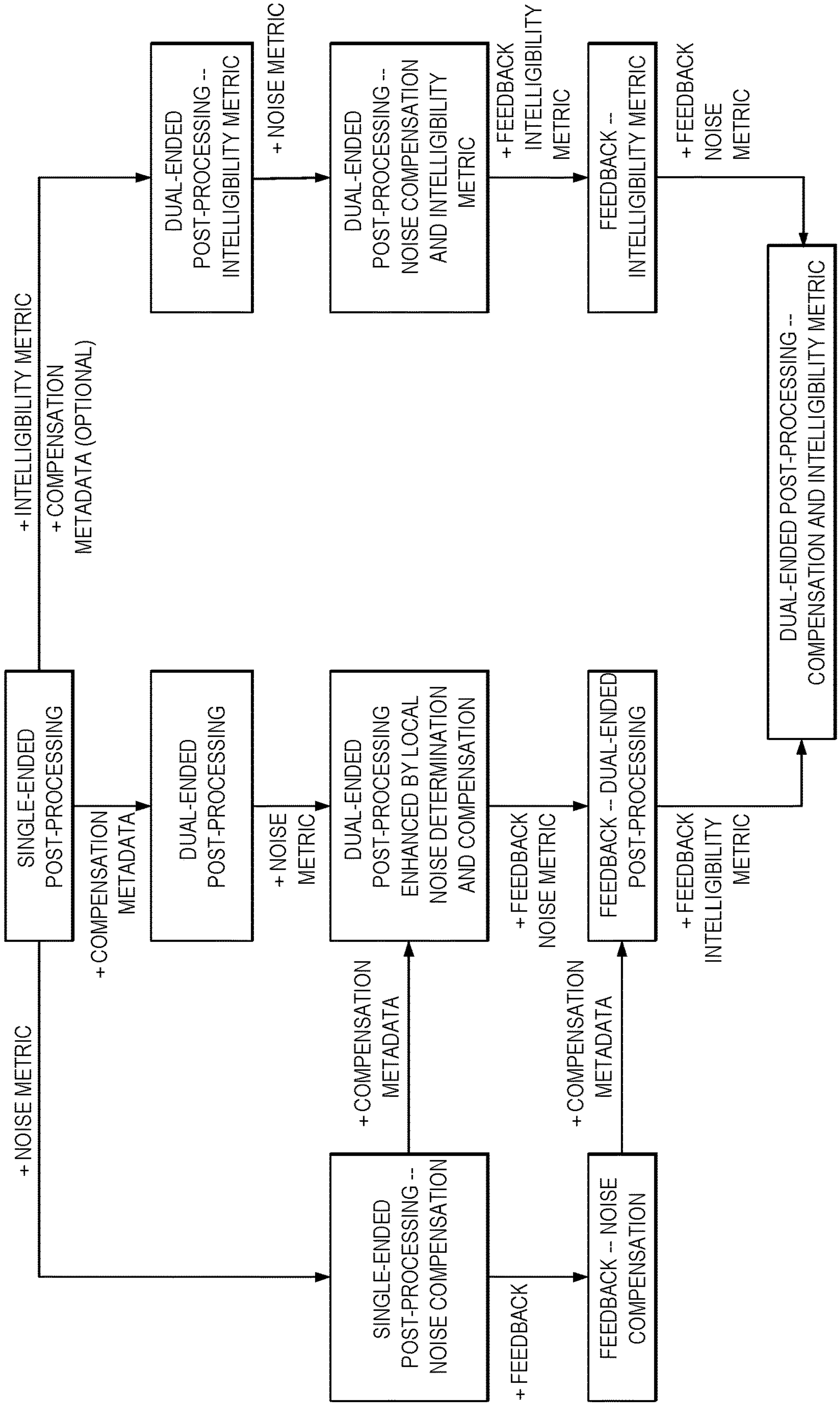
FIG. 31 shows the relationships between various disclosed use cases.

FIG. 31 shows the relationships between various disclosed use cases. FIG. 31 summarizes, in one diagram and on one page, FIGS. 21-30 and many of the foregoing paragraphs of description, including comparisons of various use cases. For example, traversing from Single-Ended Post-Processing ("use case 1") to Dual-Ended Post-Processing ("use case 2"), FIG. 31 indicates the addition of compensation metadata in "use case 2." This also may be seen by comparing FIGS. 21 and 22. Traversing from "use case 2" to Dual-Ended Post-Processing Enhanced by Local Noise Determination and Compensation ("use case 4") FIG. 31 indicates the addition of a noise metric and compensation metadata in "use case 4." This also may be seen by comparing FIGS. 22 and 24.

Figure 32:
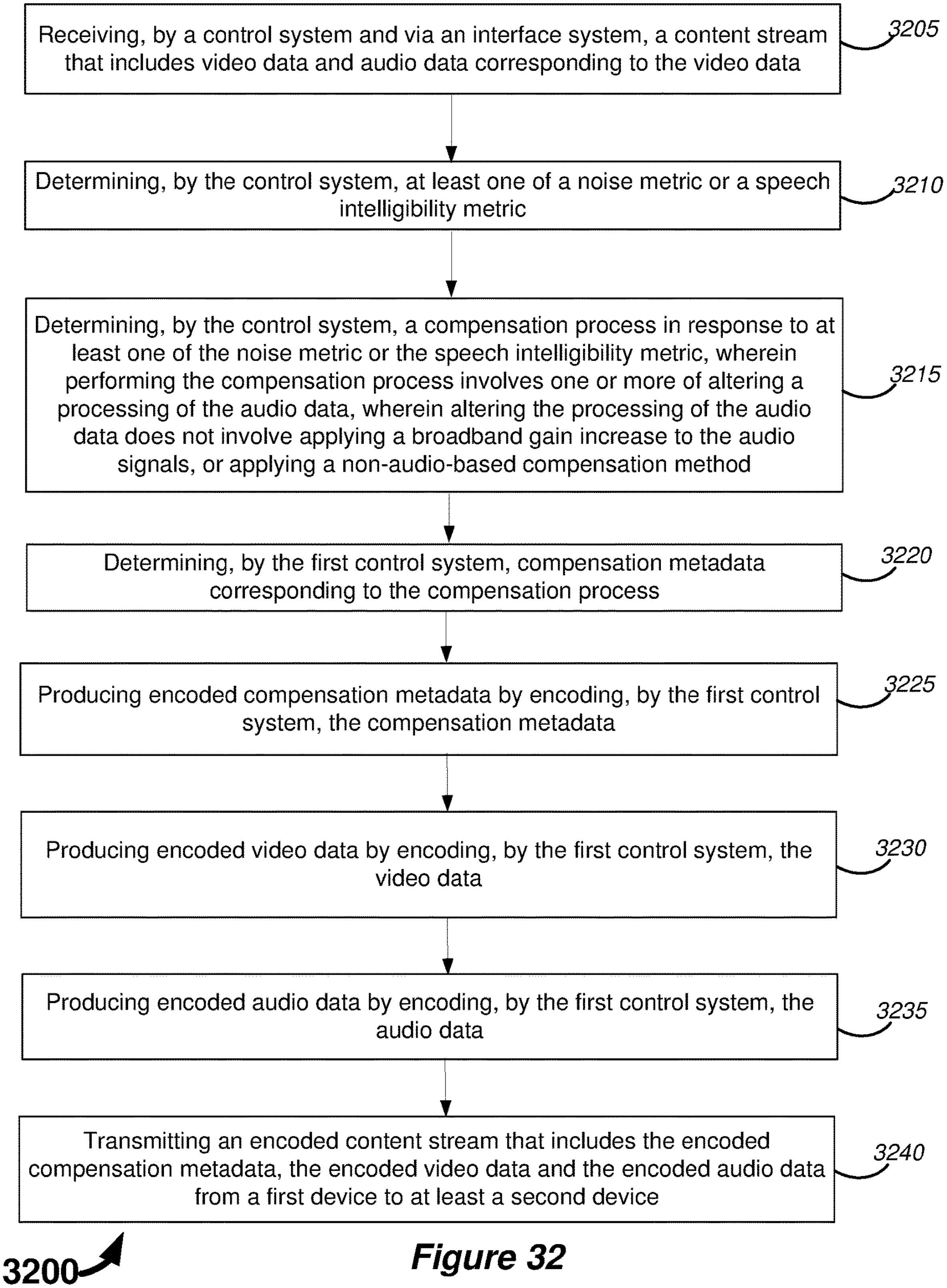
FIG. 32 is a flow diagram that outlines one example of a disclosed method.

FIG. 32 is a flow diagram that outlines one example of a disclosed method. The blocks of method 3200, like other methods described herein, are not necessarily performed in the order indicated. Moreover, such methods may include more or fewer blocks than shown and/or described.

The method 3200 may be performed by an apparatus or system, such as the apparatus 200 that is shown in FIG. 2 and described above. In some examples, the blocks of method 3200 may be performed by a device that implements a cloud-based service, such as a server. According to some examples, the method 3200 may be performed, at least in part, by the encoder 2101 that is described above with reference to FIGS. 21-31. However, in alternative implementations at least some blocks of the method 3200 may be performed by one or more devices within an audio environment, e.g., by the decoder 2103 that is described above with reference to FIGS. 21-31, by a television or by a television control module.

In this implementation, block 3205 involves receiving, by a first control system and via a first interface system, a content stream that includes video data and audio data corresponding to the video data. For example, block 3205 may involve a control system of the encoder 2101 that is described above with reference to FIGS. 21-31, or a control system of a similar encoding system, receiving the content stream from a content provider (e.g., a provider of television programs, movies, etc.)

In this example, block 3210 involves determining, by the first control system, a noise metric and/or a speech intelligibility metric. Block 3210 may involve any of the disclosed methods for determining the noise metric and/or the speech intelligibility metric. In some examples, block 3210 may involve receiving the noise metric and/or the speech intelligibility metric from another device, such as the decoder 2103 that is described above with reference to FIGS. 21-31. In some examples, block 3210 may involve determining the speech intelligibility metric via analysis of audio data of the content stream corresponding to speech.

According to this example, block 3215 involves determining, by the first control system, a compensation process to be performed in response to at least one of the noise metric or the speech intelligibility metric. In this example, the compensation process involves altering a processing of the audio data and/or applying a non-audio-based compensation method. According to this implementation, altering the processing of the audio data does not involve applying a broadband gain increase to the audio signals. Block 3215 may involve determining any of the disclosed compensation processes, including methods for altering the processing of the audio data and/or methods for applying a non-audio-based compensation method.

In some examples, the non-audio-based compensation method may involve controlling a closed captioning system, a surtitling system or a subtitling system. In some such examples, controlling the closed captioning system, the surtitling system or the subtitling system may involve controlling at least one of a font or a font size based, at least in part, on the speech intelligibility metric. In some such examples, controlling the closed captioning system, the surtitling system or the subtitling system may involve one or more of determining whether to filter out some speech-based text, determining whether to simplify at least some speech-based text or determining whether to rephrase at least some speech-based text, based, at least in part, on the speech intelligibility metric. In some instances, controlling the closed captioning system, the surtitling system or the subtitling system may involve determining whether to display text based, at least in part on the noise metric.

According to some examples, altering the processing of the audio data may involve applying one or more speech enhancement methods based, at least in part, on at least one of the noise metric or the speech intelligibility metric. In some such examples, the one or more speech enhancement methods may include reducing a gain of non-speech audio and/or increasing a gain of speech frequencies. In some instances, altering the processing of the audio data may involve altering one or more of an upmixing process, a downmixing process, a virtual bass process, a bass distribution process, an equalization process, a crossover filter, a delay filter, a multiband limiter or a virtualization process based, at least in part, on at least one of the noise metric or the speech intelligibility metric.

In this example, block 3220 involves determining, by the first control system, compensation metadata corresponding to the compensation process. Here, block 3225 involves producing encoded compensation metadata by encoding, by the first control system, the compensation metadata. In this example, block 3230 involves producing encoded video data by encoding, by the first control system, the video data. According to this example, block 3235 involves producing encoded audio data by encoding, by the first control system, the audio data.

In this implementation, block 3240 involves transmitting an encoded content stream that includes the encoded compensation metadata, the encoded video data and the encoded audio data from a first device to at least a second device. The first device may be, for example, the encoder 2101 that is described above with reference to FIGS. 21-31.

In some examples, the second device includes a second control system configured for decoding the encoded content stream. The second device may, for example, be the decoder 2103 that is described above with reference to FIGS. 21-31.

According to some examples, the compensation metadata may include a plurality of options selectable by the second device or by a user of the second device. In some such examples, at least some (e.g., two or more) options of the plurality of options may correspond to a noise level that may occur in an environment in which the second device is located. Some such methods may involve automatically selecting, by the second control system and based at least in part on the noise level, one of the two or more options.

In some examples, at least some (e.g., two or more) options of the plurality of options may correspond to one or more speech intelligibility metrics. In some such examples, the encoded content stream may include speech intelligibility metadata. Some such methods may involve selecting, by the second control system and based at least in part on the speech intelligibility metadata, one of the two or more options. In some such examples, each option of the plurality of options may correspond to one or more of a known or estimated hearing ability, a known or estimated language proficiency, a known or estimated accent comprehension proficiency, a known or estimated eyesight acuity or a known or estimated reading comprehension of the user of the second device. According to some examples, each option of the plurality of options may correspond to a level of speech enhancement.

In some implementations, the second device corresponds with a specific playback device, e.g. a specific television. Some such implementations may involve receiving, by the first control system and via the first interface system, at least one of the noise metric or the speech intelligibility metric from the second device. The compensation metadata may, in some examples, correspond to the noise metric and/or the speech intelligibility metric.

Some examples may involve determining, by the first control system and based at least in part on the noise metric or the speech intelligibility metric, whether the encoded audio data will correspond to all received audio data or to only a portion of the received audio data. In some such examples, the audio data includes audio objects and corresponding priority metadata indicating audio object priority. According to some such examples, wherein it is determined that the encoded audio data will correspond to only the portion of the received audio data, the method may involve selecting the portion of the received audio data based, at least in part, on the priority metadata.

In some implementations, the second device may be one of a plurality of devices to which the encoded audio data has been transmitted. According to some such implementations, the plurality of devices may have been selected based, at least in part, on known or estimated speech intelligibility for a class of users. In some instances, the class of users may have been defined by one or more of a known or estimated hearing ability, a known or estimated language proficiency, a known or estimated accent comprehension proficiency, a known or estimated eyesight acuity or a known or estimated reading comprehension. According to some such some examples, the class of users may have been defined based, at least in part, on one or more assumptions regarding a language proficiency and/or an accent comprehension proficiency for a particular geographical area, e.g., for a particular country or for a particular region of a country.

In some implementations, the audio data may include speech data and music and effects (M&E) data. Some such implementations may involve distinguishing, by the first control system, the speech data from the M&E data. Some such methods may involve determining, by the first control system, speech metadata that allows the speech data to be extracted from the audio data and producing encoded speech metadata by encoding, by the first control system, the speech metadata. In some such implementations, transmitting the encoded content stream may involve transmitting the encoded speech metadata to at least the second device.

Figure 33:
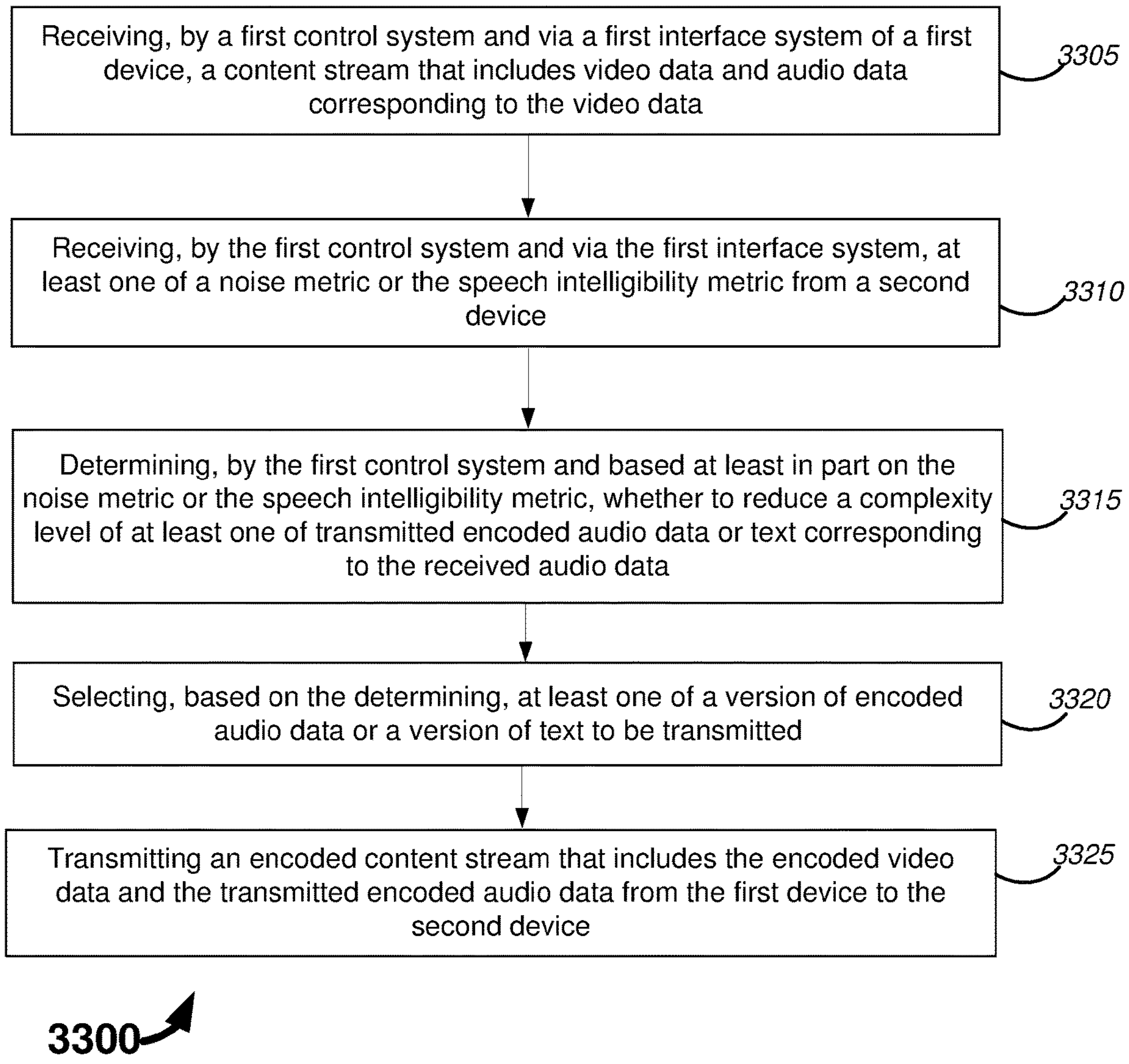
FIG. 33 is a flow diagram that outlines one example of a disclosed method.

FIG. 33 is a flow diagram that outlines one example of a disclosed method. The blocks of method 3300, like other methods described herein, are not necessarily performed in the order indicated. Moreover, such methods may include more or fewer blocks than shown and/or described.

The method 3300 may be performed by an apparatus or system, such as the apparatus 200 that is shown in FIG. 2 and described above. In some examples, the blocks of method 3300 may be performed by a device that implements a cloud-based service, such as a server. According to some examples, the method 3300 may be performed, at least in part, by the encoder 2101 that is described above with reference to FIGS. 21-31. However, in alternative implementations at least some blocks of the method 3300 may be performed by one or more devices within an audio environment, e.g., by the decoder 2103 that is described above with reference to FIGS. 21-31, by a television or by a television control module.

In this implementation, block 3305 involves receiving, by a first control system and via a first interface system of a first device, a content stream that includes video data and audio data corresponding to the video data. For example, block 3305 may involve a control system of the encoder 2101 that is described above with reference to FIGS. 21-31, or a control system of a similar encoding system, receiving the content stream from a content provider.

In this example, block 3310 involves receiving, by the first control system, a noise metric and/or a speech intelligibility metric from a second device. In some examples, block 3310 may involve receiving the noise metric and/or the speech intelligibility metric from the decoder 2103 that is described above with reference to FIGS. 21-31.

According to this example, block 3315 involves determining, by the first control system and based at least in part on the noise metric or the speech intelligibility metric, whether to reduce a complexity level of transmitted encoded audio data and/or text corresponding to the received audio data. In some examples, block 3315 may involve determining whether transmitted encoded audio data will correspond to all received audio data or to only a portion of the received audio data. In some examples, the audio data may include audio objects and corresponding priority metadata indicating audio object priority. In some such examples wherein it is determined that the encoded audio data will correspond to only the portion of the received audio data, block 3315 may involve selecting the portion of the received audio data based, at least in part, on the priority metadata. In some examples, determining whether to reduce the complexity level may involve determining whether to filter out some speech-based text, determining whether to simplify at least some speech-based text and/or determining whether to rephrase at least some speech-based text for a closed captioning system, a surtitling system or a subtitling system.

In this example, block 3320 involves selecting, based on the determining process of block 3315, a version of encoded audio data and/or a version of text to be transmitted. Here, block 3325 involves transmitting an encoded content stream that includes the encoded video data and the transmitted encoded audio data from the first device to the second device. For instances in which block 3320 involves selecting the version of text to be transmitted, some implementations involve transmitting the version of text to the second device.

Figure 34:
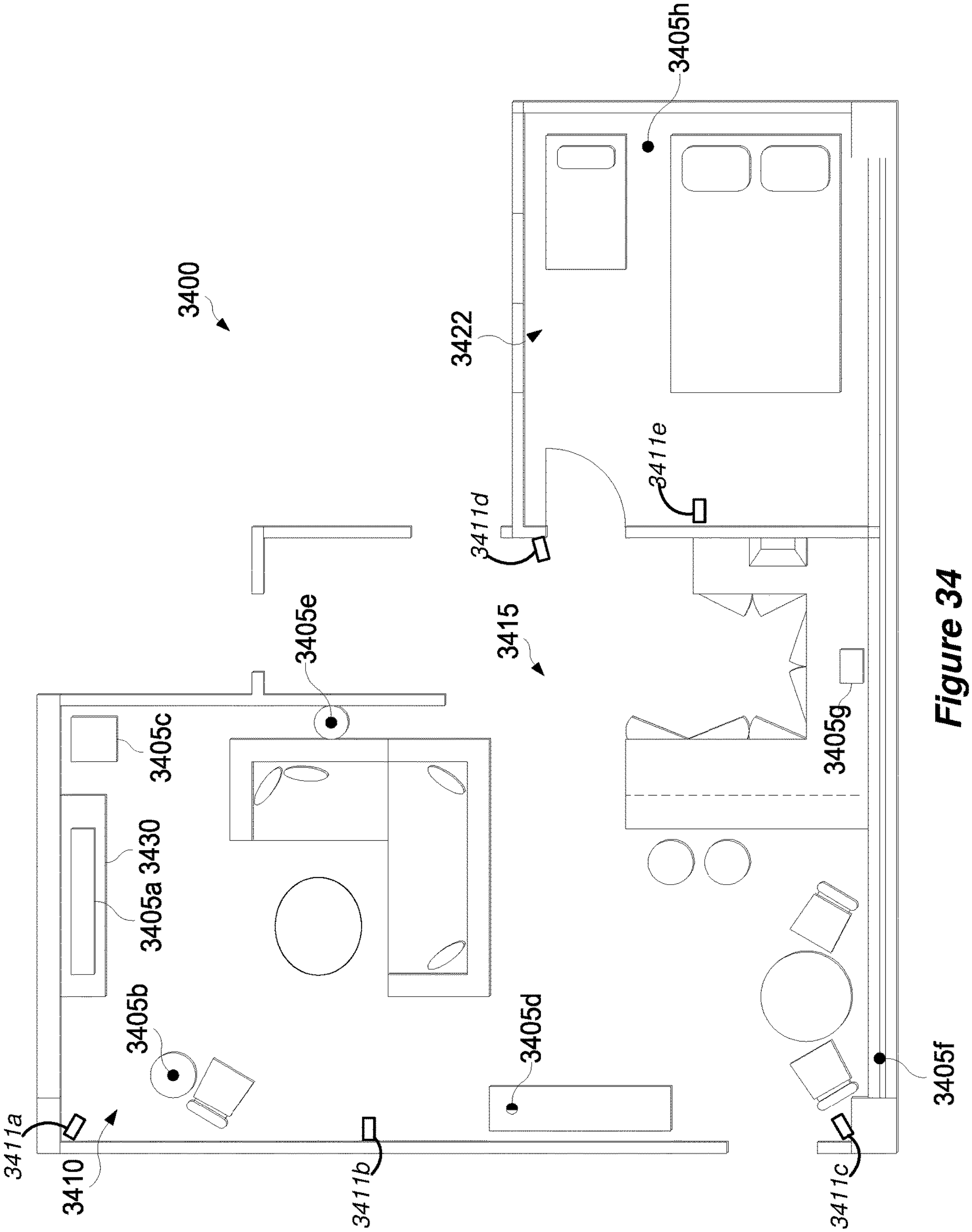
FIG. 34 shows an example of a floor plan of an audio environment, which is a living space in this example.

FIG. 34 shows an example of a floor plan of an audio environment, which is a living space in this example. As with other figures provided herein, the types and numbers of elements shown in FIG. 34 are merely provided by way of example. Other implementations may include more, fewer and/or different types and numbers of elements.

According to this example, the environment 3400 includes a living room 3410 at the upper left, a kitchen 3415 at the lower center, and a bedroom 3422 at the lower right. Boxes and circles distributed across the living space represent a set of loudspeakers 3405*a*-3405*h*, at least some of which may be smart speakers in some implementations, placed in locations convenient to the space, but not adhering to any standard prescribed layout (arbitrarily placed). In some examples, the television 3430 may be configured to implement one or more disclosed embodiments, at least in part. In this example, the environment 3400 includes cameras 3411*a*-3411*e*, which are distributed throughout the environment. In some implementations, one or more smart audio devices in the environment 3400 also may include one or more cameras. The one or more smart audio devices may be single purpose audio devices or virtual assistants. In some such examples, one or more cameras of the optional sensor system 130 may reside in or on the television 3430, in a mobile phone or in a smart speaker, such as one or more of the loudspeakers 3405*b*, 3405*d*, 3405*e* or 3405*h*. Although cameras 3411*a*-3411*e* are not shown in every depiction of the environment 3400 presented in this disclosure, each of the environments 3400 may nonetheless include one or more cameras in some implementations.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. A content stream processing method, comprising:

receiving, by a control system and via an interface system, a content stream that includes video data and audio data corresponding to the video data;

determining, by the control system, at least one of a noise metric or a speech intelligibility metric;

performing, by the control system, a compensation process in response to at least one of the noise metric or the speech intelligibility metric, wherein performing the compensation process involves altering a processing of the audio data based, at least in part, on metadata and at least one of the noise metric or the speech intelligibility metric, wherein the compensation process further comprises controlling a closed captioning system, a surtitling system or a subtitling system and wherein controlling the closed captioning system, the surtitling system or the subtitling system involves determining whether to simplify speech-based text, based, at least in part, on a determination that the speech intelligibility metric or the noise metric is below a threshold level, wherein simplifying the speech-based text includes modifying the speech-based text to include more or less text;

processing, by the control system, the video data;

providing, by the control system, processed video data to at least one display device of an environment;

rendering, by the control system, the audio data for reproduction via a set of audio reproduction transducers of the environment, to produce rendered audio signals;

providing, via the interface system, the rendered audio signals to at least some audio reproduction transducers of the set of audio reproduction transducers of the environment.

2. The method of claim 1, wherein the speech intelligibility metric is based, at least in part, on one or more of a speech transmission index (STI), a common intelligibility scale (CIS), C50, reverberance of the environment, a frequency response of the environment, playback characteristics of one or more audio reproduction transducers of the environment, or a level of environmental noise.

3. The method of claim 1, wherein controlling the closed captioning system, the surtitling system or the subtitling system is based, at least in part, on at least one of a user's hearing ability, the user's language proficiency, the user's eyesight or the user's reading comprehension.

4. The method of claim 1, wherein controlling the closed captioning system, the surtitling system or the subtitling system involves controlling at least one of a font or a font size based, at least in part, on the speech intelligibility metric.

5. The method of claim 1, wherein controlling the closed captioning system, the surtitling system or the subtitling system involves determining whether to display text based, at least in part on the noise metric or speech intelligibility metric.

6. The method of claim 5, wherein determining whether to display the text involves applying a first noise threshold to determine that the text will be displayed and applying a second noise threshold to determine that the text will cease to be displayed.

7. The method of claim 1, wherein the audio data includes audio objects and audio object priority metadata and wherein altering the processing of the audio data involves selecting high-priority audio objects based on the audio object priority metadata and rendering the high-priority audio objects, but not rendering other audio objects.

8. The method of claim 1, wherein the audio data includes audio objects and altering the processing of the audio data involves changing a rendering location of one or more audio objects.

9. The method of claim 1, wherein altering the processing of the audio data involves applying one or more speech enhancement methods based, at least in part, on at least one of the noise metric or the speech intelligibility metric.

10. The method of claim 9, wherein the one or more speech enhancement methods include at least one of reducing a gain of non-speech audio or increasing a gain of speech audio.

11. The method of claim 1, wherein altering the processing of the audio data involves altering one or more of an upmixing process, a downmixing process, a virtual bass process, a bass distribution process, an equalization process, a crossover filter, a delay filter, a multiband limiter or a virtualization process based, at least in part, on at least one of the noise metric or the speech intelligibility metric.

12. The method of claim 1, further comprising transmitting the audio data from a first device to a second device.

13. The method of claim 12, further comprising transmitting at least one of the noise metric, the speech intelligibility metric or echo reference data from the first device to the second device or from the second device to the first device, wherein the second device is a hearing aid, a personal sound amplification product, a cochlear implant or a headset.

14. The method of claim 13, further comprising:

receiving, by a second device control system, second device microphone signals;

receiving, by the second device control system, the audio data and at least one of the noise metric, the speech intelligibility metric or echo reference data;

determining, by the second device control system, one or more audio data gain settings and one or more second device microphone signal gain settings;

applying, by the second device control system, the audio data gain settings to the audio data to produce gain-adjusted audio data;

applying, by the second device control system, the second device microphone signal gain settings to the second device microphone signals to produce gain-adjusted second device microphone signals;

mixing, by the second device control system, the gain-adjusted audio data and the gain-adjusted second device microphone signals to produce mixed second device audio data;

providing, by the second device control system, the mixed second device audio data to one or more second device transducers; and reproducing the mixed second device audio data by the one or more second device transducers.

15. The method of claim 14, further comprising controlling, by the second device control system, the relative levels of the gain-adjusted audio data and the gain-adjusted second device microphone signals in the mixed second device audio data based, at least in part, on the noise metric.

16. The method of claim 1, wherein the audio data includes audio objects and audio object priority metadata.

17. The method of claim 16, wherein altering the processing of the audio data involves selecting high-priority audio objects based on the audio object priority metadata and rendering the high-priority audio objects, but not rendering other audio objects.

18. The method of claim 1, wherein the intelligibility metric is determined based on machine learning.

19. The method of claim 18, wherein the machine learning includes a neural network that was trained on a set of speech content for which speech intelligibility is known.

20. An apparatus, comprising:

an interface system; and a control system configured to:

receive, via the interface system, a content stream that includes video data and audio data corresponding to the video data;

determine at least one of a noise metric or a speech intelligibility metric;

perform a compensation process in response to at least one of the noise metric or the speech intelligibility metric, wherein performing the compensation process involves altering a processing of the audio data based, at least in part, on metadata and at least one of the noise metric or the speech intelligibility metric, wherein the compensation process further comprises controlling a closed captioning system, a surtitling system or a subtitling system and wherein controlling the closed captioning system, the surtitling system or the subtitling system involves determining whether to simplify speech-based text, based, at least in part, on a determination that the speech intelligibility metric or the noise metric is below a threshold level, wherein simplifying the speech-based text includes modifying the speech-based text to include more or less text;

process the video data;

provide processed video data to at least one display device of an environment;

render the audio data for reproduction via a set of audio reproduction transducers of the environment, to produce rendered audio signals;

provide, via the interface system, the rendered audio signals to at least some audio reproduction transducers of the set of audio reproduction transducers of the environment.

21. A system that includes the apparatus of claim 20, the system further comprising the set of audio reproduction transducers.

22. The apparatus of claim 20, wherein the intelligibility metric is determined based on machine learning.

23. The apparatus of claim 22, wherein the machine learning includes a neural network that was trained on a set of speech content for which speech intelligibility is known.

24. One or more non-transitory media having software stored thereon, the software including instructions for controlling one or more devices to perform a method, the method comprising:

receiving, by a control system and via an interface system, a content stream that includes video data and audio data corresponding to the video data, the audio data including audio objects and metadata corresponding to the audio objects, wherein an audio object is a discrete sound element with associated metadata;

determining, by the control system, at least one of a noise metric or a speech intelligibility metric;

performing, by the control system, a compensation process in response to at least one of the noise metric or the speech intelligibility metric, wherein performing the compensation process involves altering a processing of the audio data based, at least in part, on metadata and at least one of the noise metric or the speech intelligibility metric, wherein the compensation process further comprises controlling a closed captioning system, a surtitling system or a subtitling system and wherein controlling the closed captioning system, the surtitling system or the subtitling system involves determining whether to simplify speech-based text, based, at least in part, on a determination that the speech intelligibility metric or the noise metric is below a threshold level, wherein simplifying the speech-based text includes modifying the speech-based text to include more or less text;

processing, by the control system, the video data;

providing, by the control system, processed video data to at least one display device of an environment;

rendering, by the control system, the audio data for reproduction via a set of audio reproduction transducers of the environment, to produce rendered audio signals;

providing, via the interface system, the rendered audio signals to at least some audio reproduction transducers of the set of audio reproduction transducers of the environment.

25. The one or more non-transitory media of claim 24, wherein the intelligibility metric is determined based on machine learning.

26. The one or more non-transitory media of claim 25, wherein the machine learning includes a neural network that was trained on a set of speech content for which speech intelligibility is known.

* * * * *